United States Patent
Poole et al.

(10) Patent No.: US 8,220,505 B2
(45) Date of Patent: *Jul. 17, 2012

(54) POWDER TRANSPORT SYSTEMS AND METHODS

(75) Inventors: Trent A. Poole, Amherst, MA (US); David F. Bonneau, West Boylston, MA (US); Per B. Fog, Bedford Hills, NY (US)

(73) Assignee: MannKind Corporation, Valencia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/968,715

(22) Filed: Dec. 15, 2010

(65) Prior Publication Data

US 2011/0079318 A1 Apr. 7, 2011

Related U.S. Application Data

(62) Division of application No. 11/602,170, filed on Nov. 20, 2006, now Pat. No. 7,950,423.

(60) Provisional application No. 60/738,474, filed on Nov. 21, 2005.

(51) Int. Cl.
*B65B 1/04* (2006.01)
*B65B 31/00* (2006.01)

(52) U.S. Cl. ............... 141/67; 141/18; 141/44; 141/70; 141/237; 141/244

(58) Field of Classification Search .................. 141/18, 141/44–45, 67, 70, 236, 237, 242–244
See application file for complete search history.

(56) References Cited

U.S. PATENT DOCUMENTS

| | | |
|---|---|---|
| 3,353,208 A | 11/1967 | Fergus |
| 3,593,371 A | 7/1971 | Driscoll |
| 4,127,054 A | 11/1978 | Gully |
| 4,145,197 A | 3/1979 | Strahsner et al. |
| 4,164,244 A | 8/1979 | Meier |
| 4,185,669 A | 1/1980 | Jevakohoff |
| 4,371,295 A | 2/1983 | Hart |
| 4,374,540 A | 2/1983 | Massey et al. |
| 4,629,093 A | 12/1986 | Le Molaire |
| 4,956,271 A | 9/1990 | Milone |

(Continued)

FOREIGN PATENT DOCUMENTS

DE  40 37 459 C2  5/1992

(Continued)

OTHER PUBLICATIONS

Search Report dated Jul. 1, 2008 for European Patent Application No. 08006350.6.

(Continued)

*Primary Examiner* — Gregory Huson
*Assistant Examiner* — Nicolas A Arnett
(74) *Attorney, Agent, or Firm* — Wolf, Greenfield & Sacks, P.C.

(57) ABSTRACT

Powder dispensing and sensing apparatus and methods are provided. The powder dispensing and sensing apparatus includes a tray support structure to receive a cartridge tray holding cartridges, a powder dispenser assembly including powder dispenser modules to dispense powder into respective cartridges of a batch of cartridges in the cartridge tray, a powder transport system to deliver powder to the powder dispenser modules, a sensor module including sensor cells to sense respective fill states, such as the weights, of each of the cartridges in the batch of cartridges, and a control system to control the powder dispenser modules in response to the respective sensed fill states of each of the cartridges of the batch of cartridges.

7 Claims, 47 Drawing Sheets

U.S. PATENT DOCUMENTS

| | | | |
|---|---|---|---|
| 5,038,839 | A | 8/1991 | Morimoto et al. |
| 5,109,893 | A | 5/1992 | Derby |
| 5,109,894 | A | 5/1992 | McGregor |
| 5,233,916 | A | 8/1993 | Butler et al. |
| 5,327,947 | A | 7/1994 | McGregor |
| 5,352,461 | A | 10/1994 | Feldstein et al. |
| 5,407,079 | A | 4/1995 | Rancourt |
| 5,503,852 | A | 4/1996 | Steiner et al. |
| 5,549,144 | A | 8/1996 | Dworak et al. |
| 5,598,876 | A | 2/1997 | Zanini et al. |
| 5,654,007 | A | 8/1997 | Johnson et al. |
| 5,727,607 | A | 3/1998 | Ichikawa et al. |
| 5,765,607 | A | 6/1998 | Ansaloni |
| 5,826,633 | A | 10/1998 | Parks et al. |
| 5,922,354 | A | 7/1999 | Johnson et al. |
| 6,021,821 | A | 2/2000 | Wegman |
| 6,035,905 | A | 3/2000 | Griffin |
| 6,071,497 | A | 6/2000 | Steiner et al. |
| 6,102,088 | A | 8/2000 | Wegman |
| 6,103,270 | A | 8/2000 | Johnson et al. |
| 6,119,688 | A | 9/2000 | Whaley et al. |
| 6,121,556 | A | 9/2000 | Cole |
| 6,182,712 | B1 | 2/2001 | Stout et al. |
| 6,240,918 | B1 | 6/2001 | Ambrosio et al. |
| 6,267,155 | B1 | 7/2001 | Parks et al. |
| 6,340,036 | B1 | 1/2002 | Toyoizumi et al. |
| 6,347,648 | B1 | 2/2002 | Wegman et al. |
| 6,357,490 | B1 | 3/2002 | Johnston et al. |
| 6,428,771 | B1 | 8/2002 | Steiner et al. |
| 6,444,226 | B1 | 9/2002 | Steiner et al. |
| 6,581,650 | B2 | 6/2003 | Parks et al. |
| 6,652,885 | B2 | 11/2003 | Steiner et al. |
| 6,668,874 | B2 | 12/2003 | Rowland et al. |
| 6,674,022 | B2 | 1/2004 | Fermier et al. |
| 6,679,256 | B2 | 1/2004 | Ingle et al. |
| 6,679,301 | B2 | 1/2004 | Makino et al. |
| 6,715,259 | B2 | 4/2004 | Johnston et al. |
| 6,722,403 | B2 | 4/2004 | Zhou et al. |
| 6,722,406 | B2 | 4/2004 | Wegman et al. |
| 6,772,801 | B1 | 8/2004 | Shojaei et al. |
| 6,871,758 | B2 | 3/2005 | Berenshteyn et al. |
| 6,875,278 | B2 | 4/2005 | Kerbel et al. |
| 6,889,722 | B2 | 5/2005 | Huss |
| 6,923,175 | B2 | 8/2005 | Poole et al. |
| 6,941,980 | B2 | 9/2005 | Rocchio et al. |
| 6,959,522 | B2 | 11/2005 | Johnston et al. |
| 7,004,210 | B1 | 2/2006 | Wegman et al. |
| 7,048,018 | B2 | 5/2006 | Ghizzi et al. |
| 7,069,963 | B2 | 7/2006 | Friberg et al. |
| 7,090,391 | B2 | 8/2006 | Taniguchi |
| 7,134,459 | B2 | 11/2006 | Carlson et al. |
| 7,614,429 | B2 | 11/2009 | Pluvinage et al. |
| 7,621,300 | B2 | 11/2009 | Bonney et al. |
| 7,669,617 | B2 | 3/2010 | Parks et al. |
| 2001/0038018 | A1 | 11/2001 | Bell et al. |
| 2003/0066481 | A1 | 4/2003 | Kerbel et al. |
| 2004/0038865 | A1 | 2/2004 | Gelber et al. |
| 2004/0168400 | A1 | 9/2004 | Johnston et al. |
| 2004/0173281 | A1 | 9/2004 | Bates et al. |
| 2004/0182387 | A1 | 9/2004 | Steiner et al. |
| 2005/0056339 | A1 | 3/2005 | Beane |
| 2005/0173552 | A1 | 8/2005 | Friberg et al. |
| 2005/0211244 | A1 | 9/2005 | Nilsson et al. |
| 2006/0137760 | A1 | 6/2006 | Dubois et al. |
| 2007/0131707 | A1 | 6/2007 | Poole et al. |
| 2007/0131708 | A1 | 6/2007 | Poole et al. |
| 2007/0151623 | A1 | 7/2007 | Poole et al. |
| 2011/0023995 | A1 | 2/2011 | Poole et al. |
| 2011/0173933 | A1 | 7/2011 | Maheshwari |
| 2011/0197990 | A1 | 8/2011 | Poole et al. |

FOREIGN PATENT DOCUMENTS

| | | |
|---|---|---|
| DE | 44 47 051 A1 | 7/1996 |
| DE | 102006018279 A1 | 10/2007 |
| EP | 0 826 386 A2 | 3/1998 |
| EP | 0 874 289 A2 | 10/1998 |
| EP | 0 989 383 A2 | 3/2000 |
| EP | 1 380 501 A2 | 1/2004 |
| EP | 0 831 782 B1 | 12/2005 |
| GB | 369450 | 3/1932 |
| JP | 6-154669 | 6/1994 |
| JP | 2004-115021 | 4/2004 |
| JP | 2004-284620 | 10/2004 |
| JP | 2005-239235 | 9/2005 |
| WO | WO 93/18812 A1 | 9/1993 |
| WO | WO 97/18991 A1 | 5/1997 |
| WO | WO 98/30263 A1 | 7/1998 |
| WO | WO 99/44663 A1 | 9/1999 |
| WO | WO 01/17595 A1 | 3/2001 |
| WO | WO 03/100530 A2 | 12/2003 |
| WO | WO 2007/061987 A2 | 5/2007 |
| WO | WO 2008/082640 A1 | 7/2008 |

OTHER PUBLICATIONS

Search Report dated Jul. 1, 2008 for European Patent Application No. 08006324.1.

Office Action dated Sep. 11, 2008 for European Application No. 06844452.0.

Invitation to Pay Additional Fees and Partial Search Report dated Dec. 14, 2009 for International Application No. PCT/US2009/004500.

Search Report and Examination Report mailed Jan. 11, 2010 for Singapore Application No. 200803358-1.

Search Report and Written Opinion mailed Jul. 7, 2011 for related Singapore Patent Application No. 201100810-9.

Search Report dated Oct. 13, 2011 for related European Application No. 10160429.6.

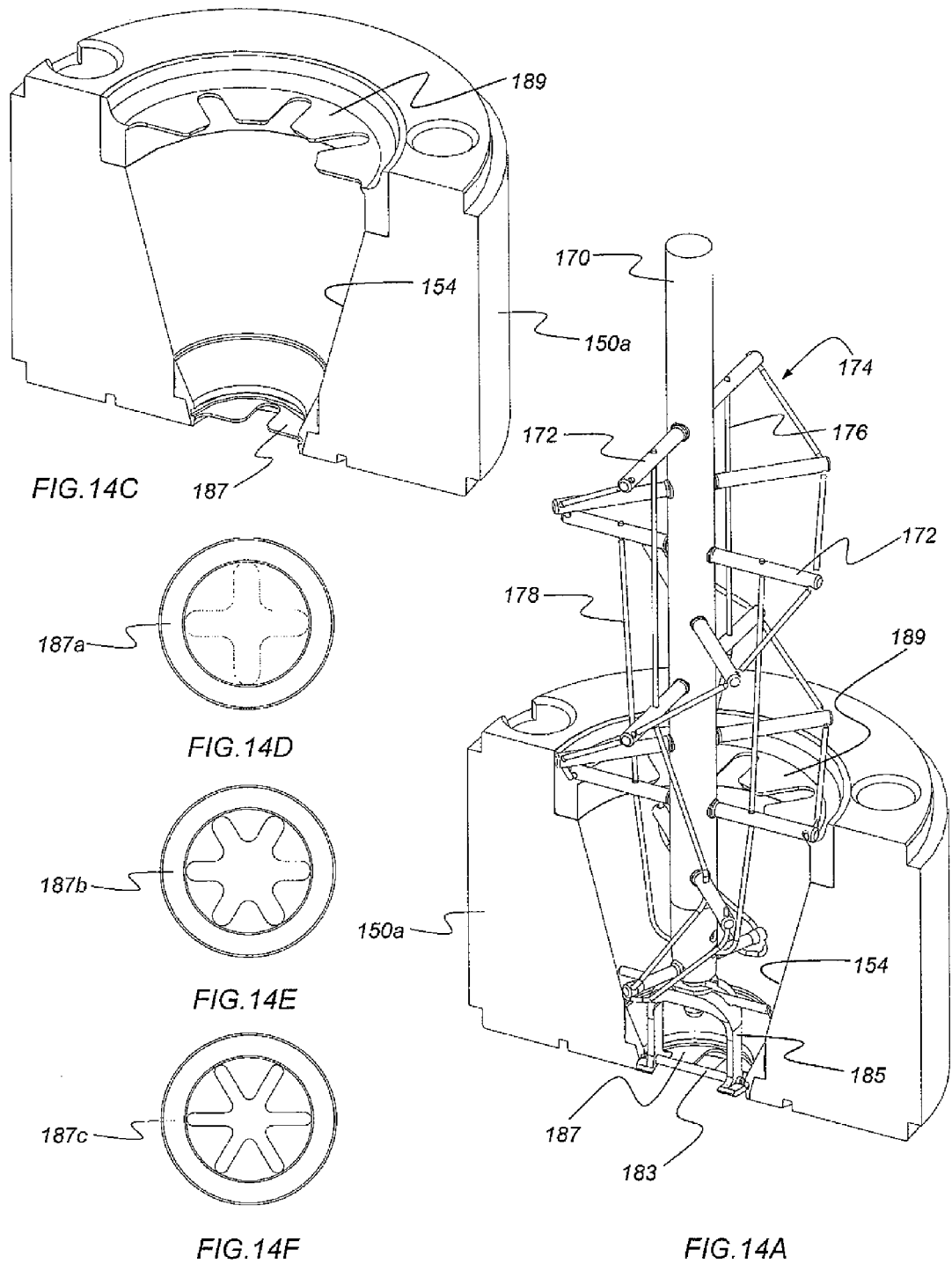

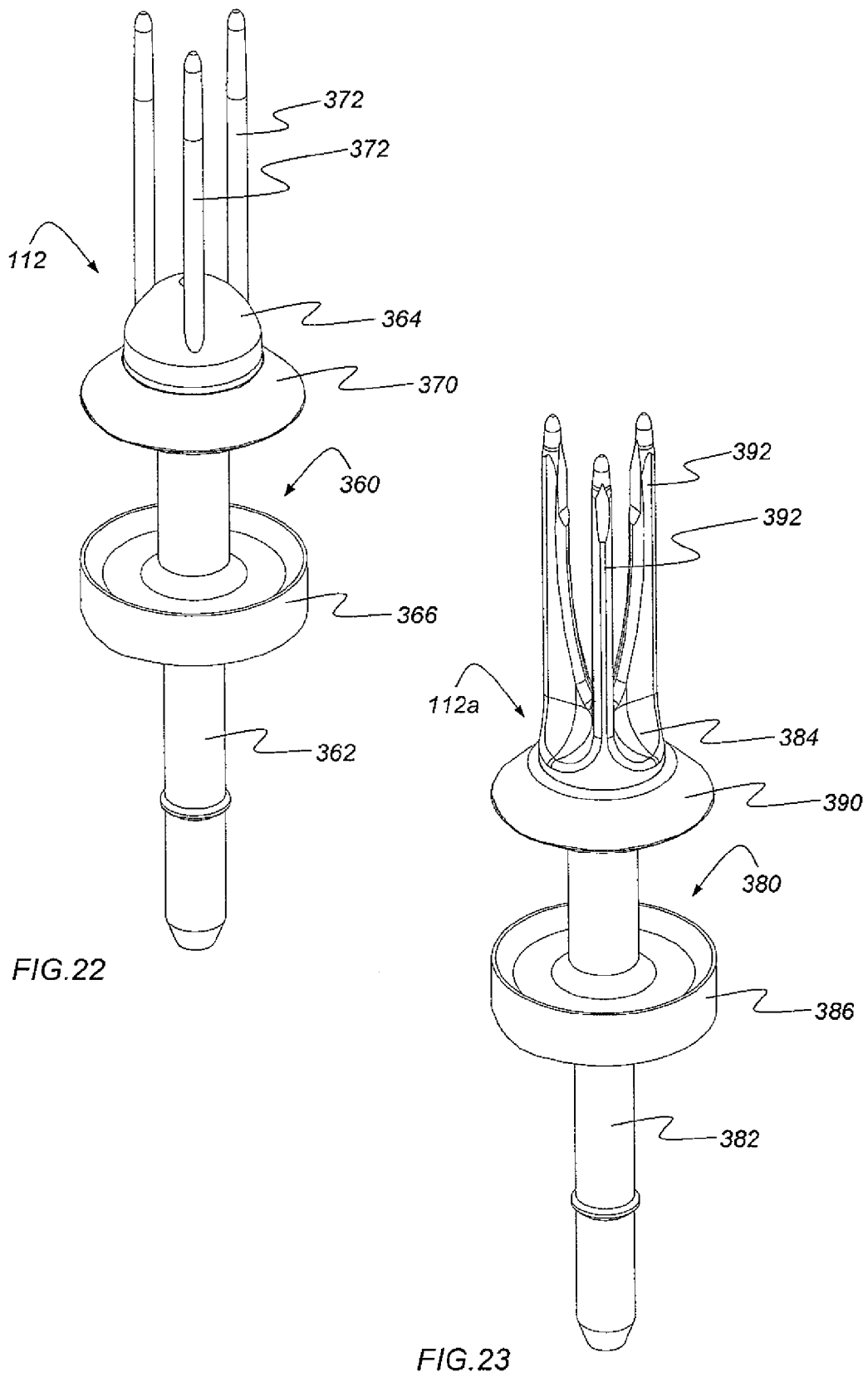

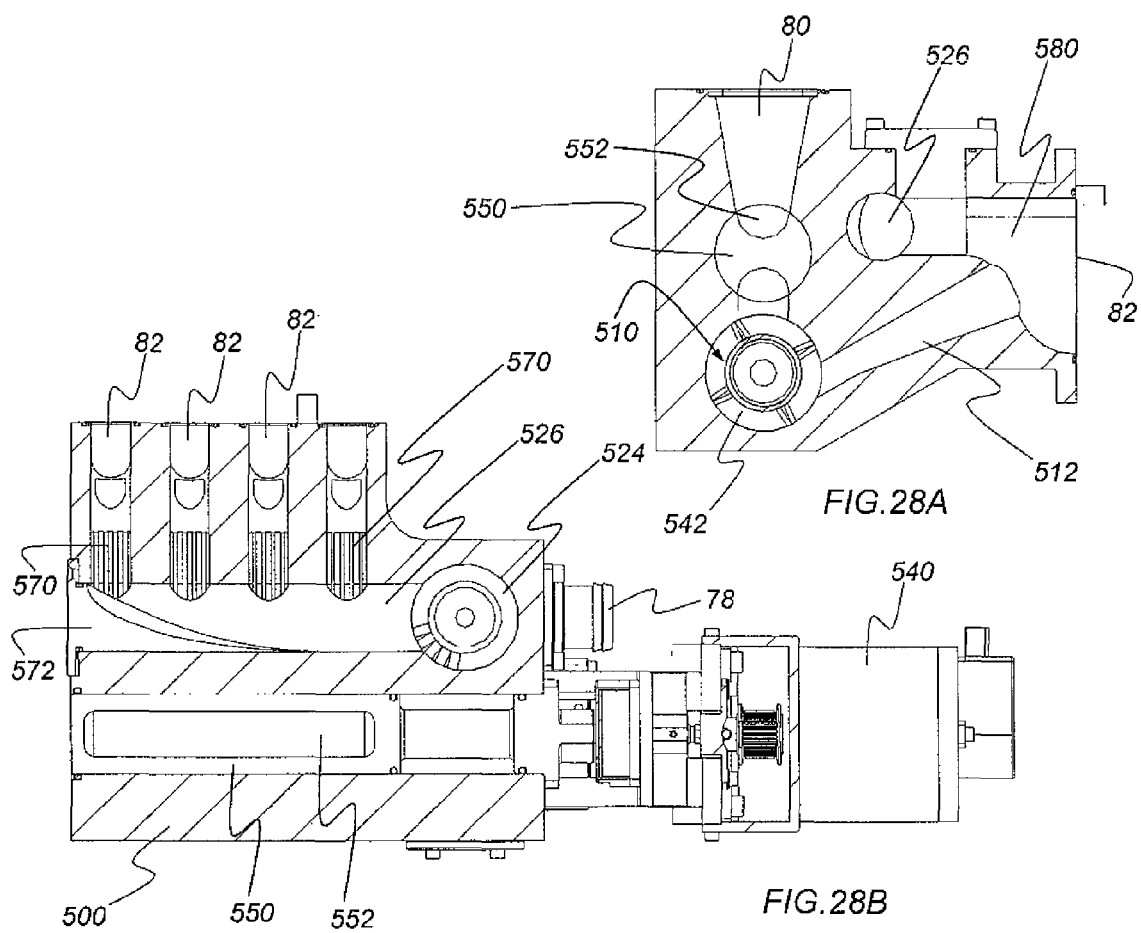
FIG.28A
FIG.28B
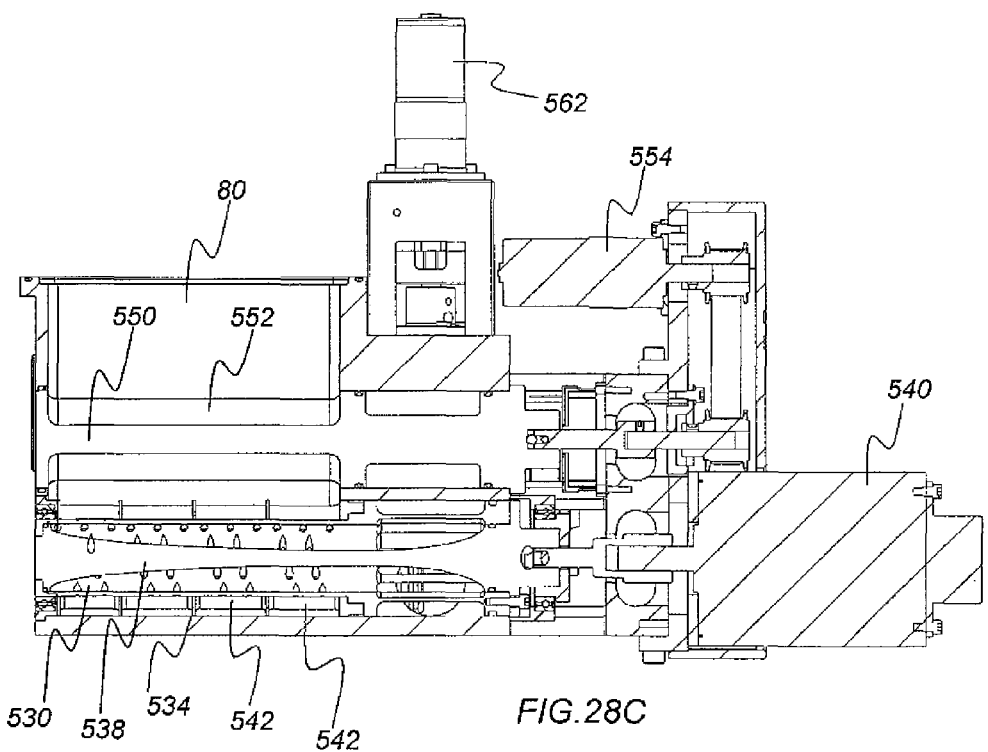
FIG.28C

POWDER TRANSPORT SYSTEMS AND METHODS

CROSS REFERENCE TO RELATED APPLICATION

This application is a division of U.S. patent application Ser. No. 11/602,170, filed Nov. 20, 2006, and entitled "POWDER TRANSPORT SYSTEMS AND METHODS", which claims priority based on Provisional Application Ser. No. 60/738,474, filed Nov. 21, 2005, which are hereby incorporated by reference in their entirety.

FIELD OF THE INVENTION

This invention relates to methods and apparatus for dispensing and sensing powder and, more particularly, to methods and apparatus for dispensing precisely-controlled quantities of powder into multiple cartridges and for individually sensing the fill state of each of the cartridges. The powder can contain a drug, and the cartridges can be used in an inhaler. However, the invention is not limited to this application.

BACKGROUND OF THE INVENTION

It has been proposed to deliver certain types of drugs to patients by inhalation of a powder as a delivery mechanism. One particular example uses diketopiperazine microparticles known as Technosphere® microparticles. The Technosphere microparticles have a platelet surface structure and can be loaded with a drug. See, for example, U.S. Pat. No. 5,352,461, issued Oct. 4, 1994 to Feldstein et al.; U.S. Pat. No. 5,503,852, issued Apr. 2, 1996 to Steiner et al.; U.S. Pat. No. 6,071,497, issued Jun. 6, 2000 to Steiner et al.; U.S. Pat. No. 6,428,771, issued Aug. 6, 2002 to Steiner et al.; U.S. Pat. No. 6,444,226, issued Sep. 3, 2002 to Steiner et al.; and U.S. Pat. No. 6,652,885, issued Nov. 25, 2003 to Steiner et al. One use of these microparticles is the delivery of insulin by inhalation. An inhaler having a replaceable cartridge or capsule containing the drug powder is used for drug delivery.

The administration of drugs by inhalation typically requires a very small quantity of powder in the inhaler cartridge. By way of example, application of insulin using Technosphere microparticles can require a dose of as little as 10 milligrams of the powder. In addition, the drug dose must be highly accurate. A dose lower than specified may not have the desired therapeutic effect, while a larger than specified dose can have an adverse effect on the patient. Furthermore, while Technosphere microparticles are highly effective for drug delivery by inhalation, their platelet surface structure causes Technosphere powders to be cohesive and somewhat difficult to handle.

In the commercialization of drug delivery by inhalation, large numbers of cartridges containing the drug must be produced in an efficient and economical manner. An accurate dose of powder must be delivered to each cartridge, and the drug dose in each cartridge must be verified. Manufacturing techniques and equipment should be capable of high throughput to meet demand and should be capable of handling powders which are cohesive and thus do not flow freely. Existing manufacturing techniques and equipment have not been adequate to meet these demands.

Accordingly, there is a need for novel methods and apparatus for powder dispensing and sensing.

SUMMARY OF THE INVENTION

Systems and methods are provided for simultaneously dispensing precisely-controlled doses of a powder into multiple cartridges. The powder can contain a drug, and the cartridges can be used in inhalers. The fill state of each cartridge, typically the powder weight, is sensed during filling, and powder dispenser modules are individually controlled in response to the sensed weight to ensure accurate dosage. The system operates at high speed and can be very compact to enable production filling operations with minimal floor space requirements.

According to a first aspect of the invention, a powder dispensing and sensing apparatus comprises a tray support structure to receive a cartridge tray holding cartridges, a powder dispenser assembly including powder dispenser modules to dispense powder into respective cartridges of a batch of cartridges in the cartridge tray, a powder transport system to deliver powder to the powder dispenser modules, a sensor module including sensor cells to sense respective fill states of each of the cartridges in the batch of cartridges, and a control system to control the powder dispenser modules in response to the respective sensed fill states of each of the cartridges of the batch of cartridges.

The powder dispenser modules, the powder transport system and the sensor cells can be configured for concurrent dispensing of powder to the batch of cartridges and concurrent sensing of the fill state of each of the cartridges in the batch of cartridges. The sensor cells can comprise weight sensor cells. The cartridge tray can be configured to support the cartridges in a two-dimensional array of rows and columns.

The powder transport system can include a blower assembly to move a transport gas, a powder aerator to deliver powder to the powder dispenser assembly and a hopper assembly to supply powder to the powder aerator. The powder transport system can further include a manifold that couples the transport gas from the powder dispenser assembly to the blower assembly to form a closed-loop recirculating gas transport system. The powder transport system can include a transport gas conditioning system to control the relative humidity, the temperature, or both, of the transport gas.

Each of the powder dispenser modules can include a housing that defines a powder inlet for a receiving powder from the powder transport system, a powder outlet, and a powder delivery conduit connecting the powder inlet and the powder outlet, and a feed mechanism to move powder through the conduit from the powder inlet to the powder outlet.

The feed mechanism can include a feed wand to move powder through the conduit, an actuator to operate the feed wand, a valve to control the outlet, and an actuator to operate the valve. The feed wand can include a shaft and a helical open space frame including spaced-apart spars affixed to the shaft. The spaced-apart spars can have a helical arrangement on the shaft. The feed wand can further comprise an arrangement of one or more wires secured between some or all of the spaced-apart spars. The wires can include one or more helix arrangements secured between the ends of the spars and one or more chevron arrangements secured between spars at selected radial locations. In some embodiments, each wire is slidably secured through holes in intermediate spars and is attached at each end to one of the spars.

The feed wand further includes a discharge element affixed to the shaft below the helical open space frame. In different embodiments, the discharge element can be implemented as a modified spar having a double helix configuration, a roller pin and support element used in combination with an orifice element or auger blades used in combination with an orifice element.

The powder dispenser assembly can include an array block having an array of vertical ports. The powder dispenser modules can be mounted in respective vertical ports of the array block. The array block can include channels to deliver powder to the powder dispenser modules. The powder dispenser modules can be provided with powder inlets aligned with the channels in the array block so that powder is delivered to a row of powder dispenser modules through a channel in the array block. Each channel in the array block can pass through the array block for recirculating transport gas to the blower assembly. The channels in the array block can have sufficient capacity to store powder for one or more powder dispensing cycles of the powder dispenser modules.

The hopper assembly can include a hopper body defining a powder reservoir and a granulator in the lower portion of the powder reservoir. The granulator can comprise first and second agglomerator rollers and first and second motors to actuate the first and second agglomerator rollers, respectively. Each of the agglomerator rollers can be provided with a plurality of pins or a plurality of spaced-apart disks.

The blower assembly can include a blower to move a transport gas through a recirculating transport gas system and a gas-particle separation device to remove powder agglomerates from the recirculating transport gas. In some embodiments, the gas-particle separation device is implemented as a cyclone separator and in other embodiments the gas-particle separation device is implemented as a vane separator. The blower can include an impeller to move the transport gas, an impeller motor to rotate the impeller and a blower housing enclosing the impeller and having a discharge port to supply the transport gas to the powder aerator. The blower assembly can further comprise an induction rod to introduce conditioned transport gas into the flow of transport gas.

The powder aerator can include a manifold block defining a powder inlet, powder output ports coupled to the powder dispenser assembly and a gas inlet coupled to the blower assembly. The powder aerator can further include a pneumatic broom to deliver powder through riser tubes to the powder output ports and a dump valve to supply a quantity of powder from the powder inlet to the pneumatic broom. The dump valve also seals the closed loop transport gas system from the external environment. The powder aerator can further include a bypass manifold coupled to the powder output ports and a crossover valve that directs selected portions of the transport gas from the gas inlet to the pneumatic broom and to the bypass manifold.

According to a second aspect of the invention, a method is provided for dispensing and sensing powder. The method comprises positioning cartridges in a cartridge tray, concurrently dispensing powder into a batch of cartridges in the cartridge tray, and concurrently sensing a fill state of each of the cartridges in the batch of cartridges.

According to a third aspect of the invention, a powder aerator comprises a manifold block defining a powder inlet, powder output ports and a transport gas inlet; a pneumatic broom to deliver powder to the powder output ports; a dump valve to supply a quantity of powder from the powder inlet to the pneumatic broom; a bypass manifold coupled to the powder output ports; and a crossover valve to direct selected portions of the transport gas from the gas inlet to the pneumatic broom and to the bypass manifold.

According to a fourth aspect of the invention, a powder dispenser assembly comprises an array block including an array of vertical ports and horizontal channels intersecting each of the vertical ports; and powder dispenser modules mounted in respective vertical ports of the array block, each of the powder dispenser modules having powder inlets communicating with the channels in the array block, wherein powder delivered to the channels in the array block is dispensed by each of the powder dispenser modules.

According to a fifth aspect of the invention, a powder transport system comprises a powder dispenser assembly to dispense powder into cartridges; a blower assembly to move a transport gas; and a powder aerator to deliver powder entrained in the transport gas to the powder dispenser assembly.

According to a sixth aspect of the invention, a powder dispenser module comprises a housing that defines a powder inlet for receiving powder, a powder outlet, and a powder delivery conduit connecting the powder inlet and the powder outlet; a feed wand to move powder through the powder delivery conduit; an actuator to operate the feed wand; a valve to control the powder outlet; and an actuator to operate the valve.

According to a seventh aspect of the invention, a blower assembly comprises an impeller to move a transport gas; an impeller motor to rotate the impeller; a blower housing enclosing the impeller and having a discharge port for the transport gas; a manifold to receive transport gas; and a gas-particle separation device affixed to the manifold to accumulate agglomerates entrained in the transport gas.

According to an eighth aspect of the invention, a powder handling apparatus comprises a tray support structure to receive a cartridge tray holding at least a first batch of cartridges and a second batch of cartridges; a dispensing subsystem to dispense powder into a batch of the cartridges in the cartridge tray; and a tray positioning mechanism to move the cartridge tray to sequentially position the first and subsequent batches of cartridges in the cartridge tray in alignment with the dispensing subsystem.

According to a ninth aspect of the invention, a method for dispensing powder into a cartridge comprises positioning a cartridge below a dispenser module having a hopper containing a powder, opening a valve that controls the hopper, operating a feed wand in the hopper to dispense powder through the valve to the cartridge, and closing the valve when a desired fill state of the cartridge is reached.

Operation of the feed wand can include rotating the feed wand and reversing rotation of the feed wand to condition the powder in the hopper. The feed wand can be rotated at variable speeds and can be dithered during rotation. The feed wand can reciprocate, causing the wand to quickly rotate clockwise and counterclockwise, during some portion of one or more revolutions. The method can include sensing a weight of powder in the cartridge and closing the valve when the sensed weight is equal to or greater than a target weight. Opening the valve can include rotating a valve member in a selected direction, and closing the valve can include rotating the valve member in the same direction. Opening the valve can include post-positioning the valve member with respect to the dispenser nozzle opening.

The feed wand can be rotated at a selected maximum speed during a first portion of a fill cycle and then rotated at a reduced speed during a second portion of the fill cycle. The second portion of the fill cycle can be initiated when the powder dispensed into the cartridge is equal to or greater than a selected weight. Proportional control and/or integral control can be utilized during any portion of the fill cycle.

According to a tenth aspect of the invention, the powder dispensing and sensing apparatus is a highly compact, modular system which is operable both in a research laboratory and in a production plant. This feature facilitates regulatory approval for a common machine and results in cost reduction due to common technical support and training and reduced parts inventories.

According to an eleventh aspect of the invention, the powder dispensing and sensing apparatus has the capability to fill inhaler cartridges, one time use inhalers and compact multiple use inhalers. This capability can be achieved by relatively minor changes to the system that delivers containers to be filled to the powder dispensing and sensing apparatus.

BRIEF DESCRIPTION OF THE DRAWINGS

For a better understanding of the present invention, reference is made to the accompanying drawings, which are incorporated herein by reference and in which:

FIGS. 14A-14F illustrate a feed wand in accordance with another embodiment of the invention;

FIG. 22 is a perspective view of a first embodiment of a weight sensor probe;

FIG. 23 is a perspective view of a second embodiment of a weight sensor probe;

FIGS. 28A-28C are cross-sectional views of the powder aerator of FIG. 24;

DETAILED DESCRIPTION

Figure 1:
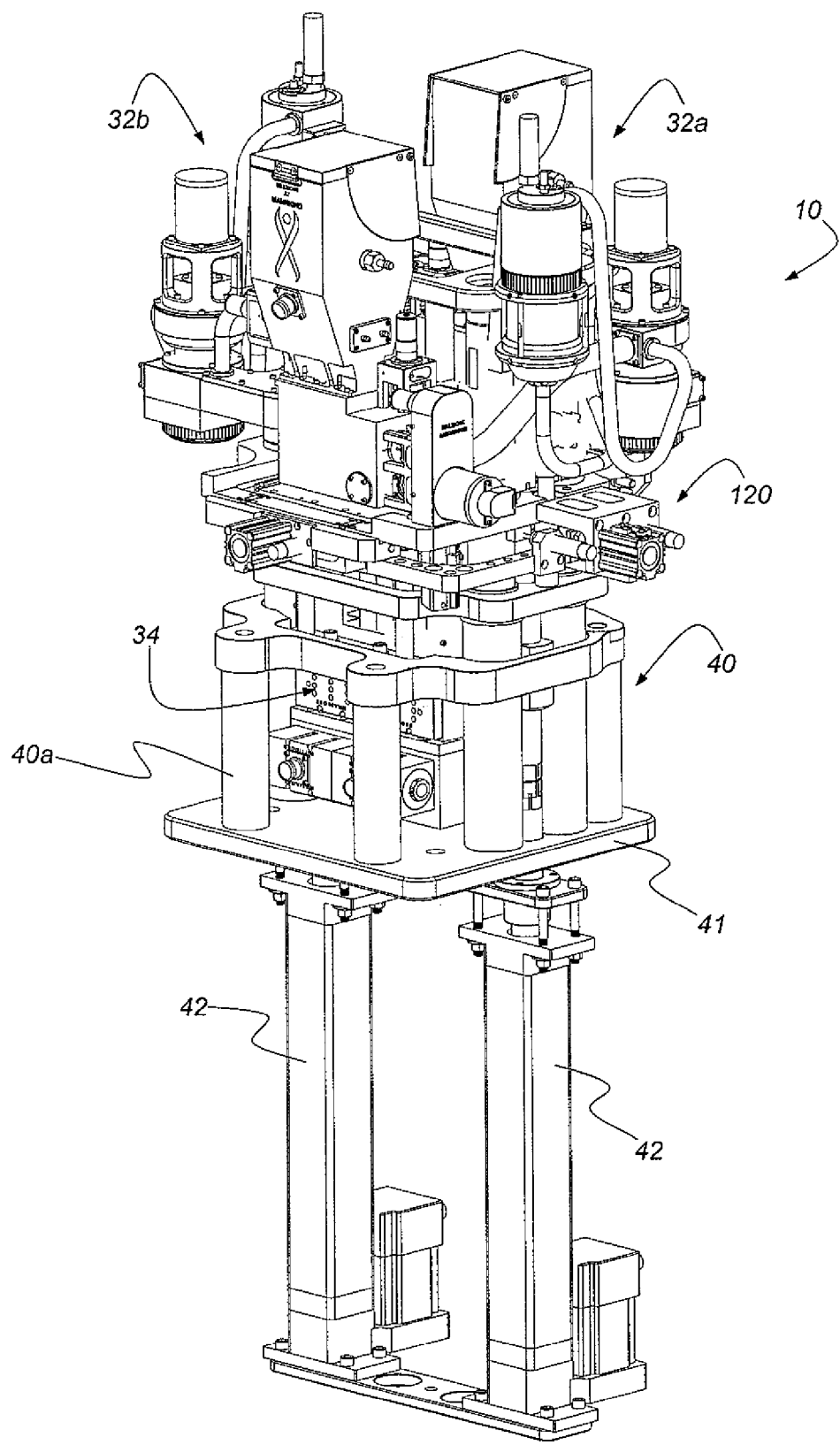
FIG. 1 is a perspective view of a powder dispensing and sensing apparatus in accordance with an embodiment of the invention.

Powder dispensing and sensing apparatus 10 in accordance with an embodiment of the invention is shown FIGS. 1-7. A purpose of the apparatus is to dispense powder into multiple cartridges 20 and to sense and control a fill state of each of the cartridges, so that each of the cartridges receives a precisely-controlled quantity of the powder. As used herein, the term “cartridge” refers to any container or capsule that is capable of holding a powder, typically a powder containing a drug substance. As used herein, the term “fill” includes filled and partially filled, since each cartridge is typically not filled to capacity and in fact may be filled to only a small fraction of its capacity. As described below, the apparatus can be used to fill an inhaler cartridge or a compact inhaler, but is not necessarily limited as to the type of container to be filled.

Cartridges 20 can be held in a cartridge tray 22 that is positioned in a tray support frame 24 for processing. The cartridges can be held in an array of rows and columns. In one example, cartridge tray 22 holds forty-eight cartridges 20 in a 6×8 array. The configuration of cartridge tray 22 and the corresponding configuration of apparatus 10 are given by way of example only and are not limiting as to the scope of the invention. It will be understood that cartridge tray 22 can be configured to hold a different number of cartridges and that cartridge tray 22 can have a different array configuration within the scope of the invention. In another embodiment described below, the cartridge tray can hold 192 cartridges. Cartridge tray 22 can be placed in support frame 24 and removed from support frame 24 by a robot.

Components of powder dispensing and sensing apparatus 10, in addition to tray support frame 24, include a powder dispenser assembly 30 to dispense powder into cartridges 20, a powder transport system 32 to deliver powder to powder dispenser assembly 30 and a sensor module 34 to sense a fill state of each of cartridges 20. Powder dispensing and sensing apparatus 10 further includes a frame 40 for mounting of tray support frame 24, powder dispenser assembly 30, powder transport system 32 and sensor module 34, and actuators 42 to move powder dispenser assembly 30 and powder transport system 32 with respect to cartridges 20.

Figure 8:
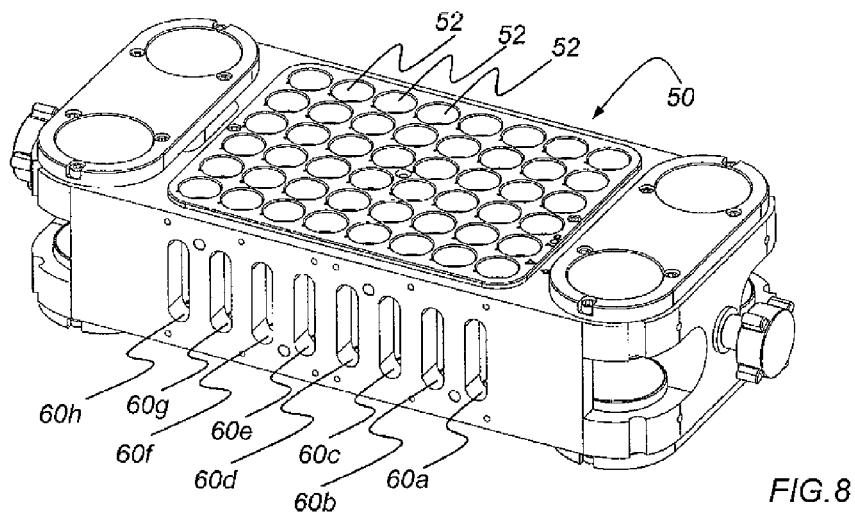
FIG. 8 is a perspective view of an array block.

Powder dispenser assembly 30 includes an array block 50 having an array of vertical ports 52 and a powder dispenser module 54 mounted in each of the vertical ports of array block 50. Array block 50 can be configured to match the array of cartridges 20 in cartridge tray 22 or a subset of the cartridges in the cartridge tray. In the above example of a cartridge tray that holds forty-eight cartridges, array block 50 can have a 6×8 array of vertical ports 52 and provides mounting for forty-eight powder dispenser modules 54. In this embodiment, powder dispenser modules 54 are mounted on one-inch centers. It will be understood that a different spacing arrangement can be utilized within the scope of the invention. As shown in FIG. 8, array block 50 further includes powder storage and transport channels 60a, 60b, 60c, 60d, 60e, 60f, 60g and 60h, with one channel for each row of six powder dispenser modules 54 in this embodiment. Powder is delivered by powder transport system 32 to powder dispenser modules 54 through each channel in array block 50, as described below. Each channel preferably has sufficient volume to store powder for several powder dispensing cycles.

In the embodiment of FIGS. 1-7, powder transport system 32 includes a first powder transport system 32a to deliver powder to a first group of four channels 60a, 60b, 60c and 60d in array block 50 and a second powder transport system 32b to deliver powder to a second group of four channels 60e, 60f, 60g and 60h in array block 50. Each of powder transport systems 32a and 32b includes a blower assembly 70 to move a transport gas through the powder transport system, a powder aerator 72 to deliver powder to powder dispenser assembly 30 and a hopper assembly 74 to supply powder to powder aerator 72. In other embodiments, a single powder transport system or more than two powder transport systems can be utilized.

Blower assembly 70 is coupled through a tube 76 to a gas inlet 78 of powder aerator 72 and produces a flow of transport gas through gas inlet 78. Powder aerator 72 includes a powder inlet 80 to receive powder from hopper assembly 74. The powder is delivered by powder aerator 72 through four powder output ports 82 to inlet ends of respective channels in array block 50. The powder is transported through the respective channels to the powder dispenser modules 54 in each row of powder dispenser assembly 30. The powder is individually dispensed to cartridges 20 by powder dispenser modules 54 as described below.

Channels 60a-60h pass through array block 50, and a tuned suction manifold 84 is coupled to outlet ends of the channels. The suction manifold 84 of first powder transport system 32a is connected to outlet ends of channels 60a-60d, and the suction manifold 84 of second powder transport system 32b is connected to the outlet ends of channels 60e-60h. Suction manifold 84 returns the transport gas to blower assembly 70, thus forming a closed loop recirculating gas transport system. In other embodiments, the powder transport system can utilize an open loop gas transport system. Any powder not delivered to powder dispenser modules 54 or stored in the channels returns through suction manifold 84 to blower assembly 70. As discussed below, blower assembly 70, in some embodiments, can include a gas-particle separation device to retain large powder agglomerates, while small powder agglomerates are recirculated to powder aerator 72 for delivery to powder dispenser assembly 30. As further discussed below, each powder transport system can include a gas conditioning unit to control the relative humidity and/or temperature of the recirculating transport gas.

The powder transport system 32 can include sensors to determine the powder level in different components of the powder transport system. Hopper assembly 74 can include a hopper level sensor to sense the powder level in the reservoir of hopper assembly 74. Powder aerator 72 can include a dump valve level sensor to determine the powder level in the dump valve of powder aerator 72. The blower assembly 70 can include a large agglomerate level sensor. A dispenser fill level sensor can be located at the suction manifold 84 of blower assembly 70. The powder level sensors can use optical techniques to sense powder level, for example. The powder level sensors can be used to control operation of powder delivery system 32 and loading of powder dispenser modules 54 with powder.

Sensor module 34 (FIG. 20) can include a sensor housing 100 (FIG. 21) and an array of sensor assemblies 110 mounted in sensor housing 100. In the illustrated embodiment, each of the sensor assemblies 110 includes two sensor cells 114 (FIG. 3) and associated circuitry. Thus, one sensor assembly 110 is used with two powder dispenser modules 54. In other embodiments, each sensor assembly can include a single sensor cell or more than two sensor cells. The number of sensor assemblies 110 and the arrangement of sensor assemblies 110 in the array can be such that the sensor cells 114 match the configuration of cartridges 20 in cartridge tray 22 or a subset of the cartridges in the cartridge tray. For the example of a cartridge tray 22 that holds forty-eight cartridges 20 in a 6×8 array on one inch centers, the sensor module 34 can include twenty-four sensor assemblies 110, which provide forty-eight sensor cells 114 in a 6×8 array on one inch centers. In the embodiment of FIGS. 1-7, each of the sensor cells 114 is a weight sensor to sense the weight of the powder delivered to the respective cartridge 20. A weight sensor probe 112 is affixed to each of the sensor cells 114 and contacts a lower end of cartridge 20 through an opening in cartridge tray 22.

The sensor cells 114 individually sense the fill state of each of cartridges 20 during dispensing of powder, so that powder dispensing can be terminated when the desired amount of powder has been dispensed into each cartridge 20. The sensor cells 114 are preferably weight sensors which monitor the weight of cartridge 20 during the powder dispensing process and are accurate within 5 to 10 micrograms in the present embodiment. An electrobalance beam is typically used as a weight sensor in applications requiring high accuracy, high speed and repeatability with very small weights.

The physical configuration of the weight sensor assembly 110 is a consideration in systems where powder dispenser modules 54 are closely spaced, such as on one inch centers. Preferably, the weight sensor assemblies 110 can be placed in an array that matches the configuration of cartridge tray 22 and powder dispenser modules 54. In a preferred embodiment, sensor assemblies 110 have a vertical configuration and two sensor cells 114 are packaged together to form a sensor assembly. The weight sensing mechanical components are located at the top of the assembly, electrical circuitry is located below the mechanical components and an electrical connector is located at the bottom. The sensor assemblies can be mounted in an array for weight sensing on one inch centers.

In another embodiment, a commercially available weight sensor module has a horizontal configuration and can be utilized in a tiered arrangement on three different levels for an array having six cartridges per row. In the tiered arrangement, probes of different lengths are used to contact the cartridges.

The powder dispensing and sensing apparatus 10 has been described as having powder dispenser modules 54 and sensor cells 114 mounted on one inch centers. It will be understood that a larger or smaller spacing between components can be utilized within the scope of the invention. Further, the components of the apparatus 10 are not necessarily mounted in a uniform array. For example, the x-direction spacing between components can be different from the y-direction spacing between components, or a row of the array can be offset with respect to an adjacent row.

In operation, cartridge tray 22 holding cartridges 20 is positioned in tray support frame 24, preferably by a robot or other automation mechanism. Cartridge tray 22 is lowered so that cartridges 20 are raised from cartridge tray 22 by weight sensor probes 112 on respective sensor assemblies 110 and are supported by probes 112. Cartridge tray 22 can be provided with openings at each cartridge location to permit probes 112 to pass through cartridge tray 22 and lift cartridges 20. Thus, each cartridge 20 can be weighed by one of the sensor cells 114 without interference from cartridge tray 22. In some embodiments (FIGS. 22 and 23), probe 112 includes a three-point support for cartridge 20. In other embodiments, probe 112 includes a cylindrical support for cartridge 20. Powder dispenser assembly 30 is lowered to a dispensing position. In the dispensing position, each powder dispenser module 54 is positioned slightly above and in alignment with one of the cartridges 20.

Figure 2:
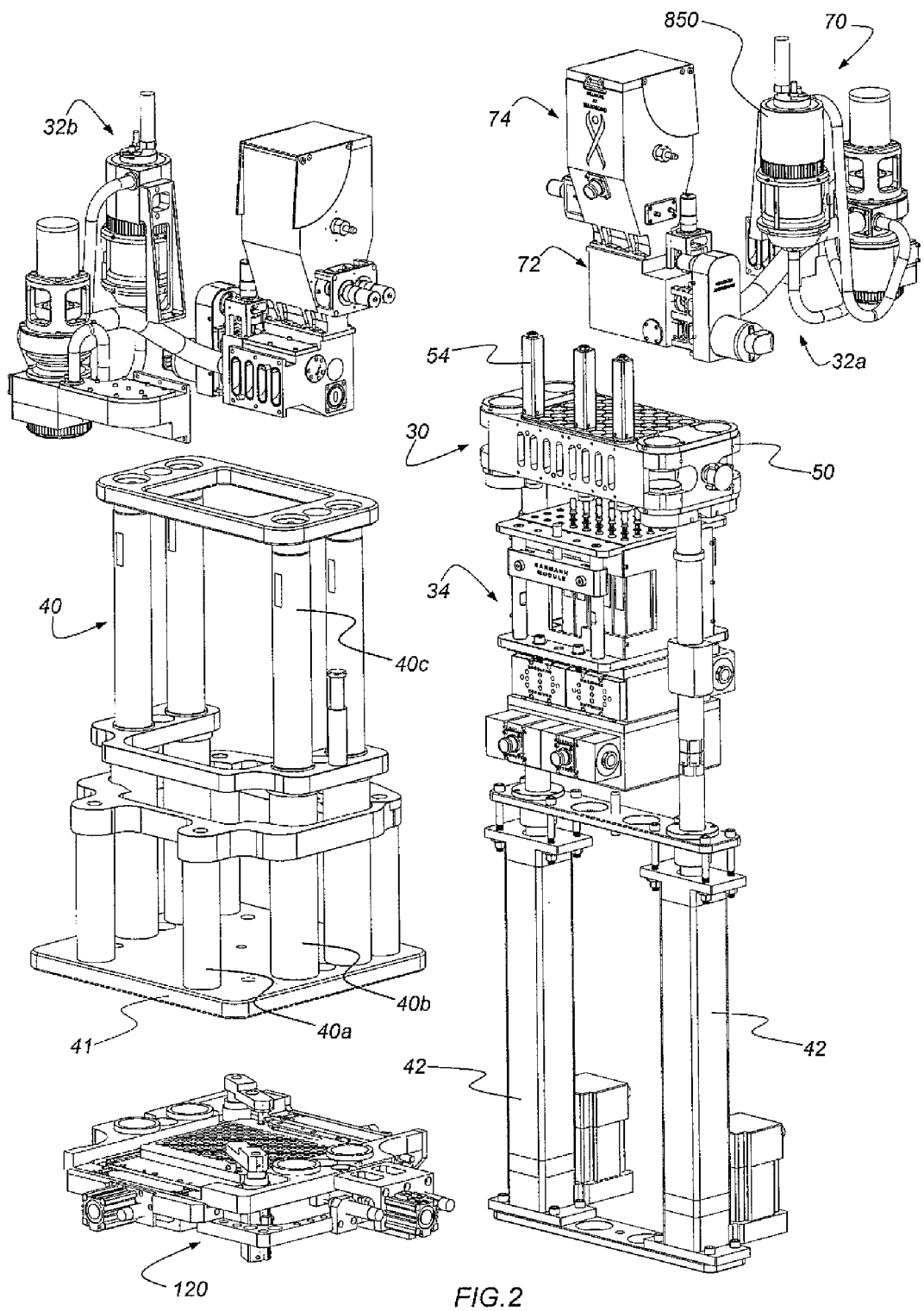
FIG. 2 is an exploded view of the powder dispensing and sensing apparatus of FIG. 1.
Figure 3:
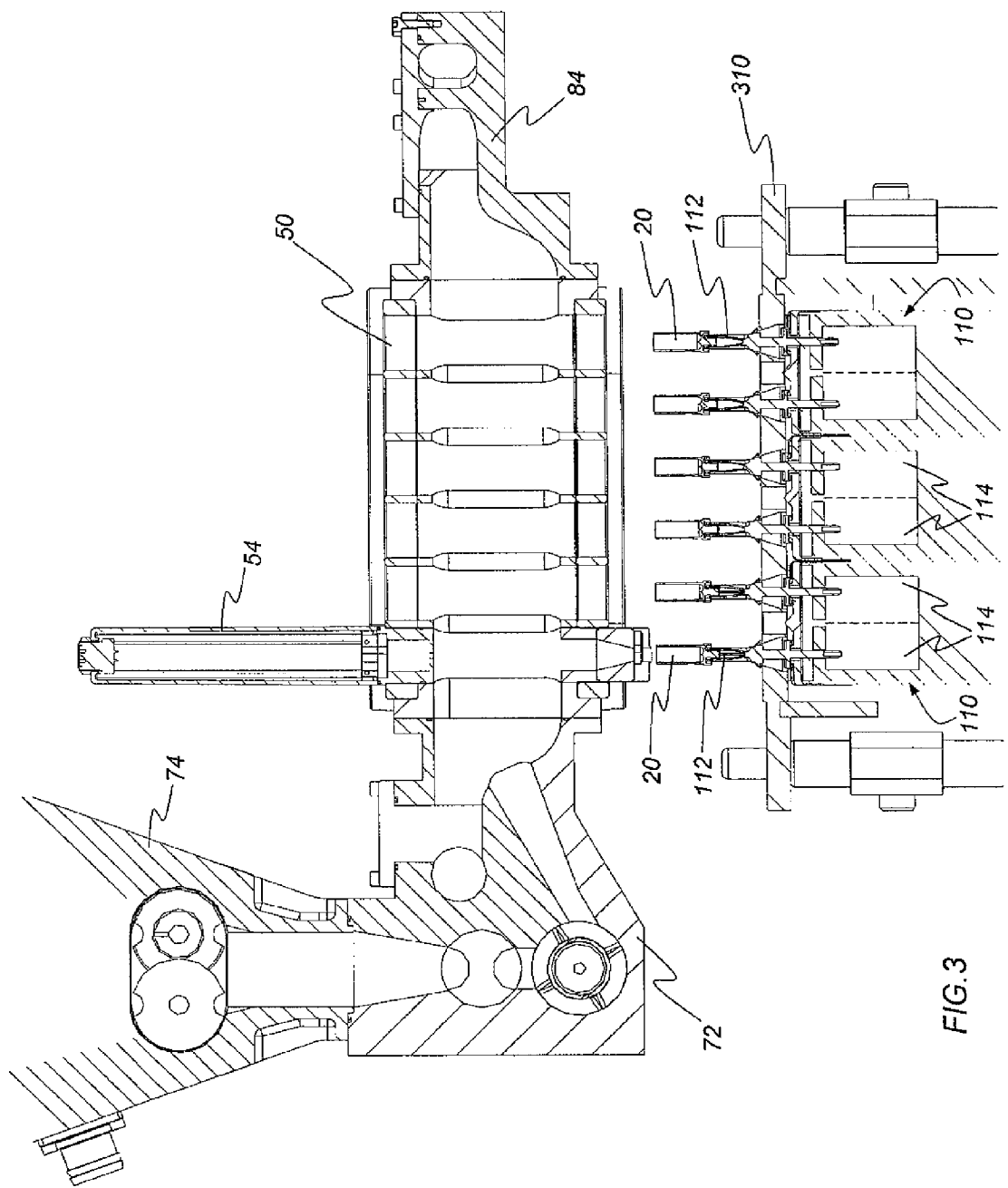
FIG. 3 is a partial vertical cross-sectional view of the powder dispensing and sensing apparatus.
Figure 3A:
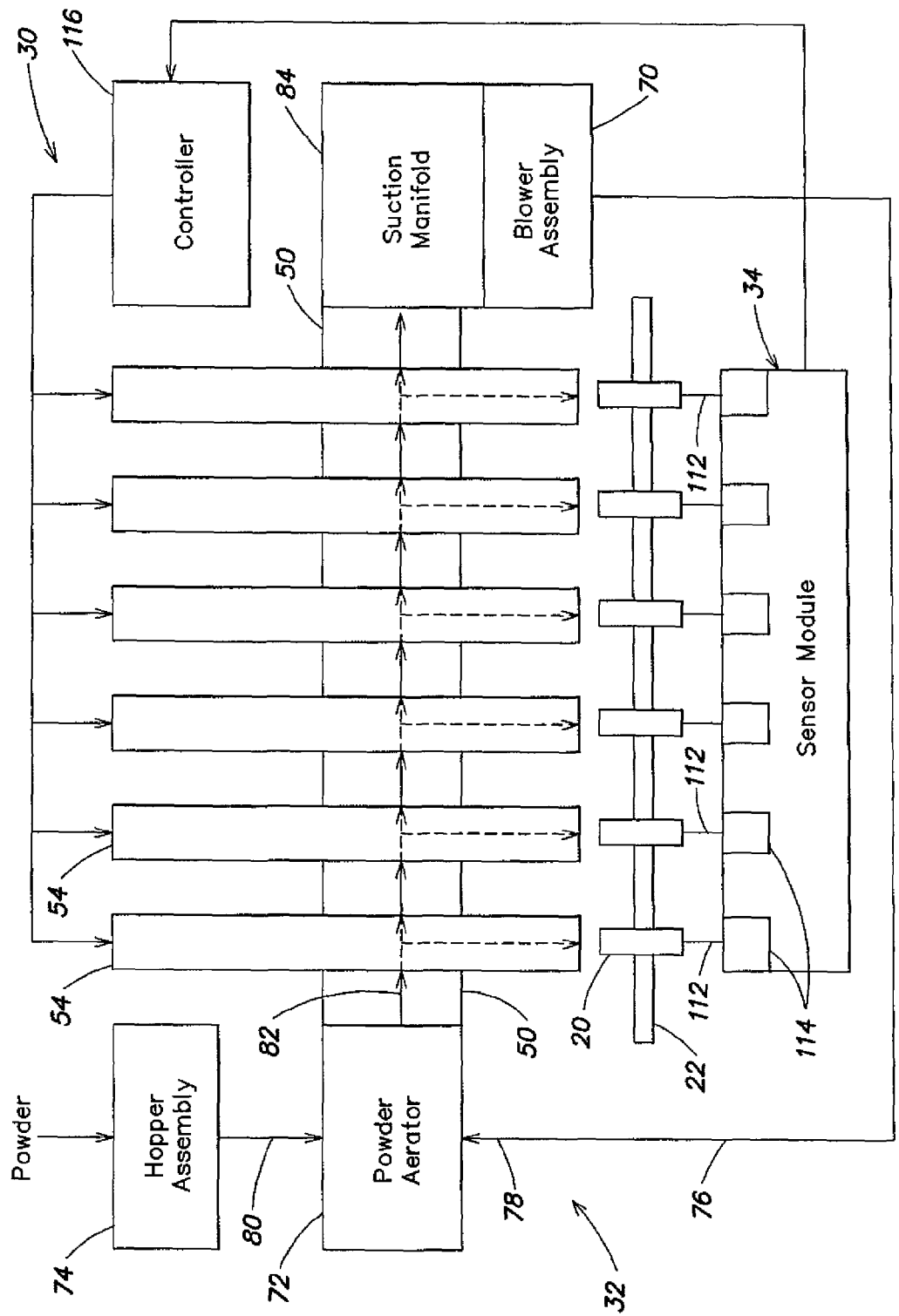
FIG. 3A is a schematic block diagram of the powder dispensing and sensing apparatus.
Figure 4:
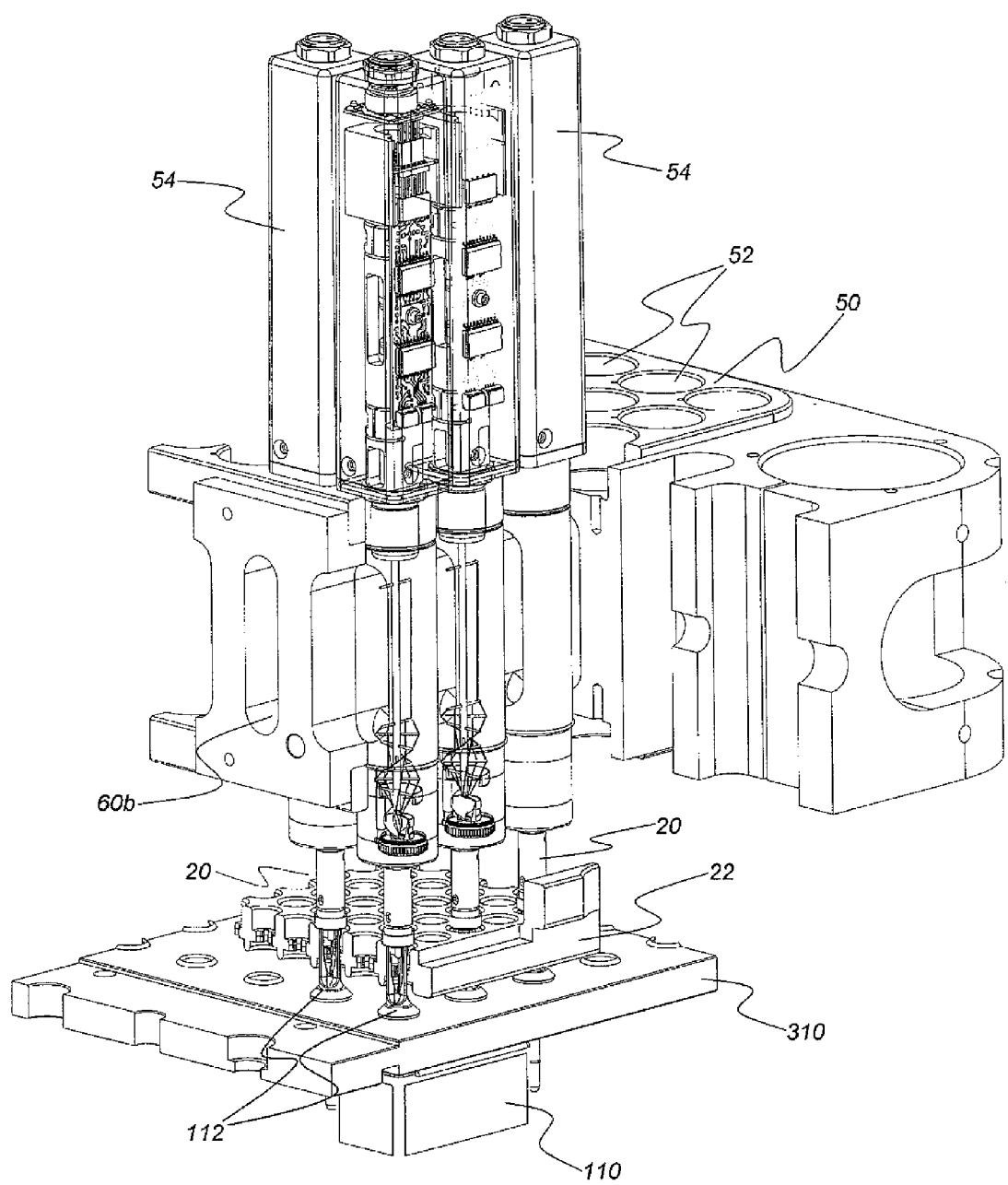
FIG. 4 is a perspective view of powder dispenser modules, cartridges, a cartridge tray and weight sensor cells.
Figure 5:
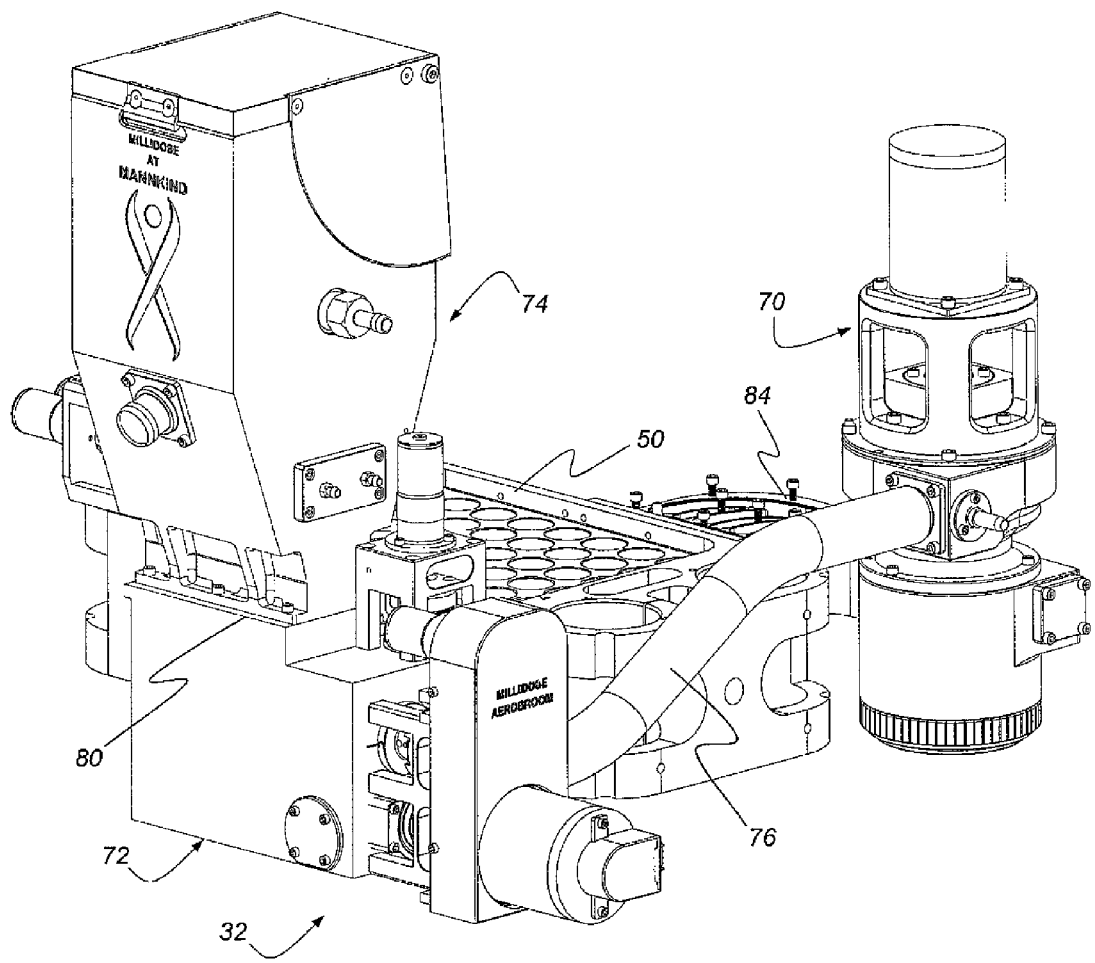
FIG. 5 is a perspective view of a powder transport system.
Figure 6:
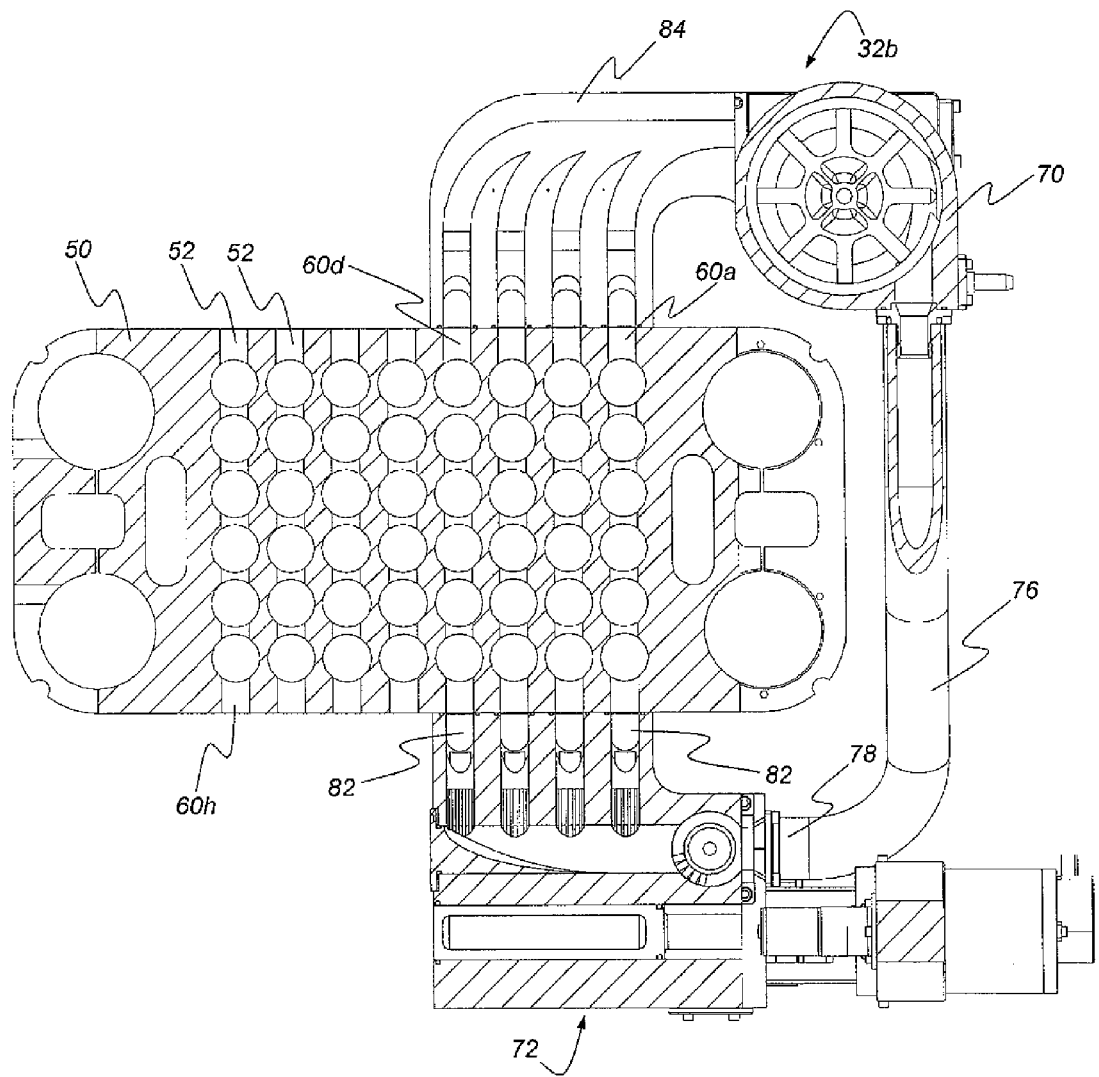
FIG. 6 is a cross-sectional diagram of an array block and one powder transport system.

As shown in FIG. 2, frame 40 can include a lower frame 40a, a middle frame 40b and an upper frame 40c. Lower frame 40a and middle frame 40b are secured to a base plate 41. Upper frame 40c provides mounting for tray support frame 24, powder dispenser assembly 30 and powder transport system 32. Array block 50 is connected to actuators 42 and moves upwardly or downwardly when actuators 42 are energized. Sensor module 34 is mounted in a fixed position within lower frame 40a and middle frame 40b.

As discussed below, powder transport system 32 can operate continuously or at intervals. The powder dispenser modules 54 are activated to dispense powder to cartridges 20. The dispensing of powder to cartridges 20 is performed concurrently, so that all cartridges in cartridge tray 22 or a subset of the cartridges in the cartridge tray receive powder simultaneously. As powder dispensing progresses, the weights of cartridges 20 are sensed by respective sensor cells 114. The output of each sensor cell 114 is coupled to a controller. As discussed below, each controller compares the sensed weight with a target weight which corresponds to the desired quantity of powder. As long as the sensed weight is less than the target weight, powder dispensing continues. When the sensed weight is equal to or greater than the target weight, the controller commands the corresponding powder dispenser module 54 to terminate the powder dispensing operation. If the sensed weight exceeds a maximum allowable weight after the fill cycle, the corresponding cartridge can be marked as defective. Thus, powder dispensing and weight sensing proceed concurrently for a batch of cartridges in cartridge tray 22. The batch can include all the cartridges in cartridge tray 22 or a subset of the cartridges in the cartridge tray. A powder dispensing cycle can include concurrent dispensing of powder to and weight sensing of a batch of cartridges and achieves 100% inspection and control of powder dispensing.

In one embodiment, the number and spacing of cartridges in cartridge tray 22 matches the number and spacing of powder dispenser modules 54 in apparatus 10. In other embodiments, the cartridge tray can have a different number of cartridges and a spacing between cartridges that is different from the configuration of powder dispenser modules 54. For example, the cartridge tray can be configured to hold a multiple of the number of powder dispenser modules 54 and to have a smaller spacing between cartridges than the spacing between powder dispenser modules 54. By way of example only, the cartridge tray can be configured to hold 192 cartridges 20 spaced on one-half inch centers. With this arrangement, a 12×16 array of cartridges on one-half inch centers occupies the same area as a 6×8 array of cartridges on one inch centers.

Figure 7:
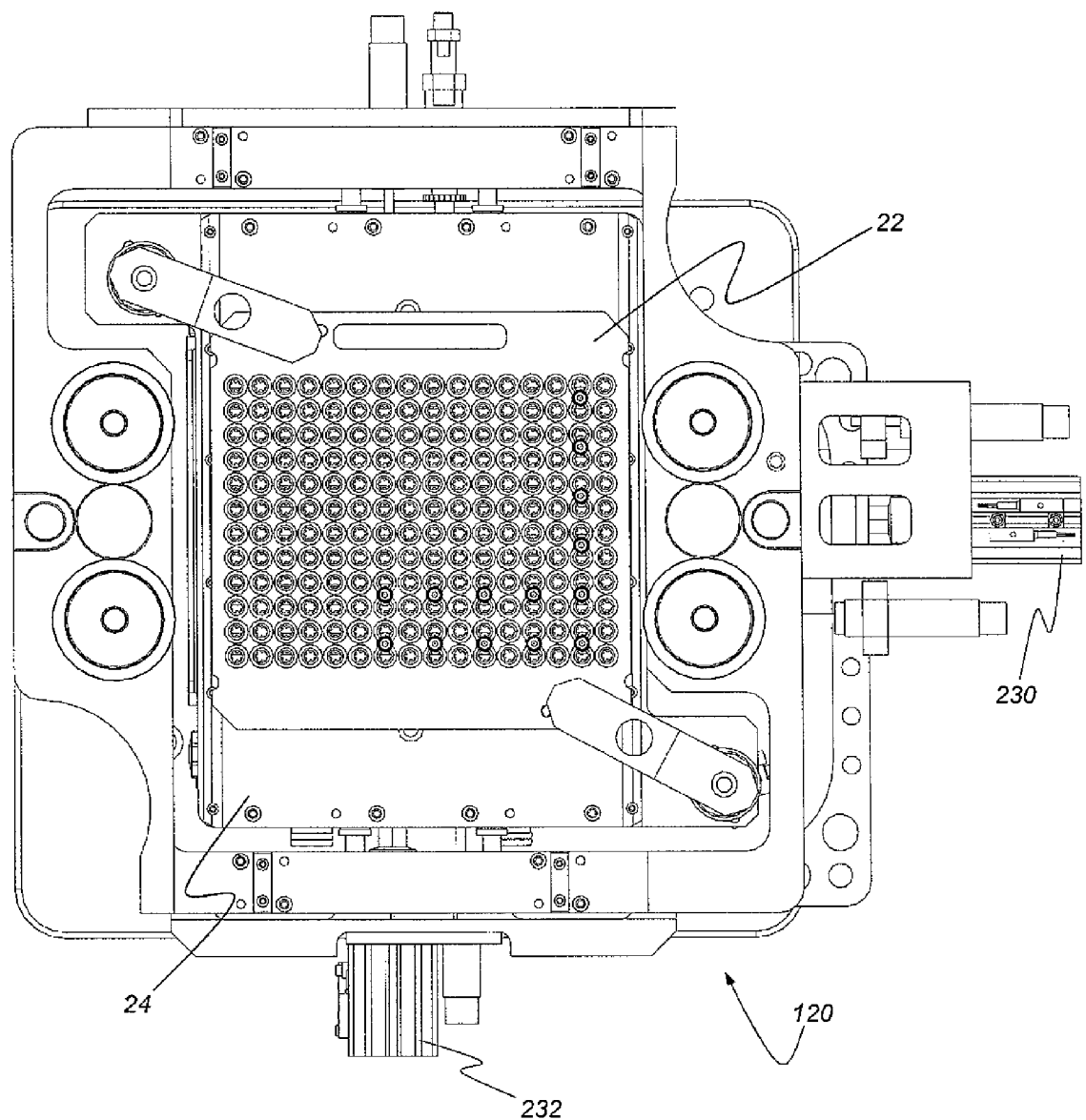
FIG. 7 is a cross-sectional diagram of a cartridge tray and a tray positioning system.

As shown in FIG. 7, the cartridge tray 22 can be displaced in a horizontal direction by a tray positioning mechanism 120 to align different batches of cartridges with powder dispenser modules 54. Cartridge tray 22 is positioned in tray support frame 24 for processing. Tray positioning mechanism 120 includes an X-direction actuator 230 coupled to tray support frame 24 and a Y-direction actuator 232 coupled to tray support frame 24. Thus, tray support frame 24 and cartridge tray 22 can be moved in a horizontal X-Y plane for positioning of batches of cartridges in relation to powder dispenser modules 54 and sensor cells 114.

The cartridge tray with 192 cartridges can be processed as follows. The cartridge tray is moved from a neutral position to a first X-Y position (0,0) such that a first batch of 48 cartridges is vertically aligned with the array of 48 powder dispenser modules 54. Powder is dispensed into the first batch of cartridges and then the cartridge tray is moved to a second X-Y position (0, 0.5) to align a second batch of 48 cartridges with the array of 48 powder dispenser modules 54. Powder is dispensed into the second batch of cartridges and then the cartridge tray is moved to a third X-Y position (0.5, 0) to align a third batch of 48 cartridges with the array of 48 powder dispenser modules 54. The cartridge tray is then moved to a fourth X-Y position (0.5, 0.5) to align a fourth batch of 48 cartridges with the array of 48 powder dispenser modules 54. Powder is dispensed into the fourth batch of cartridges to complete processing of the 192 cartridges. In the above example, the order of the tray positions and the order of the batches of cartridges can be changed.

It will be understood that this process can be applied to different tray arrangements with a different spacing between cartridges, different numbers of cartridges, and the like. In these embodiments, the cartridge tray is displaced in the horizontal plane to achieve alignment between batches of cartridges and the array of powder dispenser modules. The batch of cartridges typically matches the array of powder dispenser modules 54. However, in some applications the batch can have fewer cartridges than the number of powder dispenser modules.

Figure 9:
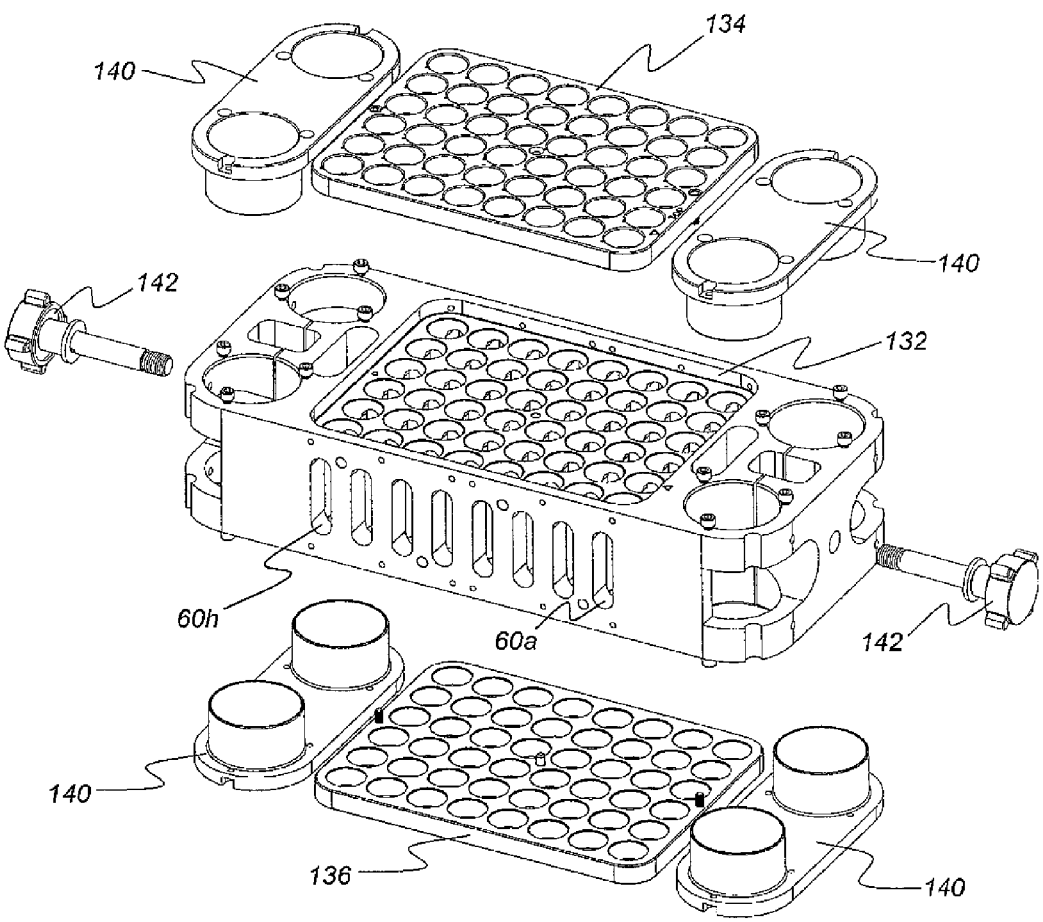
FIG. 9 is an exploded view of the array block of FIG. 8.

Array block 50 is shown in FIGS. 8 and 9. As described above, array block 50 is provided with powder storage and transport channels 60a, 60b, 60c, 60d, 60e, 60f, 60g and 60h, one channel corresponding to each row in the array of powder dispenser modules 54. Each of the channels 60a-60h extends through array block 50 and intersects the vertical ports 52 in the corresponding row of the array. In the embodiment of FIGS. 1-7, powder transport system 32a delivers powder to one side of array block 50, and powder transport system 32b delivers powder to the opposite side of array block 50. Accordingly, FIGS. 8 and 9 show the inlet ends of channels 60a-60d and the outlet ends of channels 60e-60h.

Figure 10:
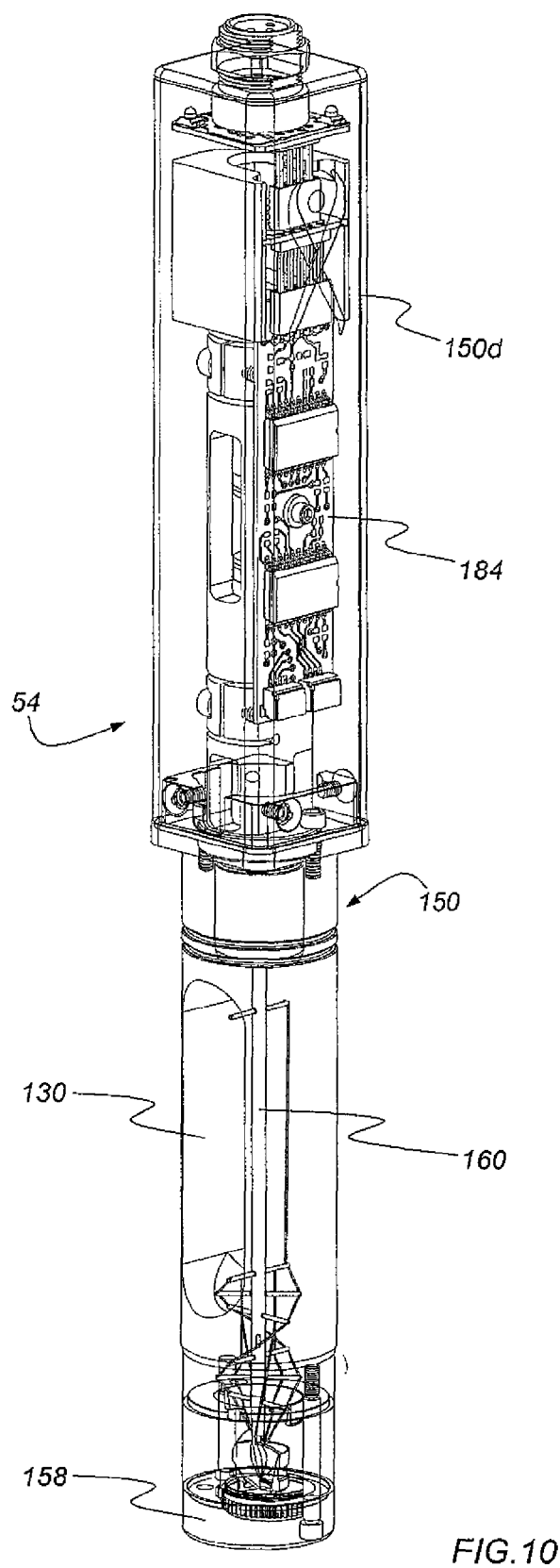
FIG. 10 is a perspective view of a powder dispenser module.

In the embodiment of FIGS. 8 and 9, channels 60a-60h have slot-shaped cross-sections and are parallel. As shown in FIG. 10, each of the powder dispenser modules 54 is provided with a powder inlet 130 in the form of a slot-shaped opening that passes through the powder dispenser module. When powder dispenser modules 54 are mounted in array block 50, powder inlets 130 are aligned with the corresponding channel in array block 50. Powder inlets 130 and channels 60a-60h preferably have cross sections of equal sizes and shapes and are polished to provide smooth inside surfaces. Each channel in array block 50 and the corresponding powder inlets 130 in powder dispenser modules 54 define a passage through array block 50 for delivery of powder to each of the powder dispenser modules 54. Powder is supplied to each of powder dispenser modules 54 through powder inlet 130. Powder inlet 130 is configured as a through opening so that part of the powder transported through the channel is delivered to the first powder dispenser module 54 and another part of the powder is transported through powder inlet 130 and the channel in array block 50 to successive powder dispenser modules 54.

In addition, channels 60a-60h serve a powder storage function. Channels 60a-60h can store more powder than is needed for dispensing to a single batch of cartridges. In one embodiment, powder transport system 32 operates at intervals. Sufficient powder for a number of batches of cartridges 20 is supplied from hopper assembly 74 to channels 60a-60h. Then, powder is dispensed to several batches of cartridges 20 until the powder supply in dispenser modules 54 becomes low. In other embodiments, powder is supplied continuously to channels 60a-60h, and channels 60a-60h serve as buffers to store powder not dispensed to cartridges 20.

The closed-loop pneumatic powder transport system 32 feeds the agglomerate particles into the array block 50 from the powder aerator 72. Then, the transport gas is recirculated back to powder aerator 72. The transport gas can be conditioned by a secondary process control gas that is supplied to the blower assembly 70.

The array block 50 functions as a dynamic powder storage device that feeds batch loads or continuous loads of drug powder into individual powder dispenser modules 54. More generally, the array block 50 includes one or more channels used to transport powder aerosols and/or agglomerate slurries of drug powders to an array of powder dispenser modules. The array block 50 can operate in an open loop or a closed loop gas transport system. The powder aerator 72 and the array block 50 fluidize, entrain and transport drug powder into the channels of array block 50.

Array block 50 can provide the main structural support for associated components and subsystems, such as powder aerator 72, hopper assembly 74, suction manifold 84, and pump assembly 70. In addition, array block 50 holds an array of powder dispenser modules 54 for dispensing powder to an array of cartridges. In a preferred embodiment, the array block includes a main block 132, a top plate 134 and a bottom plate 136. Plates 134 and 136 include O-rings which serve as guides and seals for powder dispenser modules 54. This array block further includes bearings 140 and clamping handles 142 for attachment of the array block to frame members.

In operation, powder is transported through each of channels 60*a*-60*h* by the transport gas and is delivered to each of the powder dispenser modules 54 in a controlled particle deposition process. The powder drops by action of gravity into each of the powder dispenser modules 54. Any powder that passes through the channel without dropping into one of the powder dispenser modules 54 and without being stored returns through suction manifold 84 to pump assembly 70.

Each powder dispenser module 54 dispenses powder into a cartridge 20. The powder dose is typically in a range of 5 to 30 milligrams, but the dose is not limited to this range.

As shown in detail in FIGS. 10-16B, powder dispenser module 54 includes a powder dispenser housing 150 having a lower housing section 150*a*, a middle housing section 150*b*, an upper housing section 150*c* and a cover 150*d*. The powder dispenser housing 150 can have an elongated configuration with a small cross section to permit close spacing in array block 50. As noted above, powder dispenser modules 54 can be mounted on one inch centers. Middle housing section 150*b* includes powder inlet 130 and a cylindrical conduit 152 that extends downwardly from powder inlet 130 to lower housing section 150*a*. Lower housing section 150*a* includes a tapered conduit 154 that extends downwardly to a dispenser nozzle 158, which is dimensioned for compatibility with cartridge 20. The tapered conduit 154, which can be conical in shape, provides a transition from the dimension of cylindrical conduit 152 to the dimension of dispenser nozzle 158. Together, cylindrical conduit 152 and tapered conduit 154 define a dispenser hopper 156 for holding powder to be dispensed. The powder in dispenser hopper 156 is termed a bulk powder bed. Dispenser nozzle 158 is configured to dispense powder into cartridge 20.

Powder dispenser module 54 further includes a feed wand 160 to move powder downwardly in a controlled manner through dispenser hopper 156 to nozzle 158, a wand actuator 162 to actuate wand 160, a dispenser fill valve 180 at the lower end of hopper 156, and a valve actuator 182 to open and close valve 180. Wand actuator 162 and valve actuator 182 can be miniature motors. Wand actuator 162 can be coupled to feed wand 160 by a flexible coupling 186 or other coupling which can provide vertical wand agitation, displacement, or both, in addition to rotation. Powder dispenser module 54 further includes a circuit board 184 having circuitry for controlling wand actuator 162 and valve actuator 182 and for communicating with control circuitry that controls operation of powder dispenser module 54.

Fill valve 180 can include a valve member 190 implemented as a gear provided with an eccentrically-located valve opening 191. Valve member 190 can be mounted in lower housing section 150*a* for rotation about an axis such that valve opening 191 can be rotated into alignment with dispenser nozzle 158, as shown in FIG. 16A, and can be rotated out of alignment with dispenser nozzle 158 as shown in FIG. 16B. When valve opening 191 and dispenser nozzle 158 are aligned or partially aligned, fill valve 180 is open and powder is dispensed into a cartridge. When valve opening 191 is not aligned with dispenser nozzle 158, fill valve 180 is closed and powder is not dispensed. Preferably, fill valve 180 is a type that can be partially opened, as described below.

Valve member 190 of fill valve 180 can be coupled to valve actuator 182 by a drive assembly including a lower gear 192 that meshes with the gear of valve member 190, a drive shaft 193 that extends from a lower portion of dispenser module 54 to an upper portion thereof where valve actuator 182 is mounted, an upper gear 194 attached to the upper end of drive shaft 193 and an upper a gear 195 attached to valve actuator 182. Upper gears 194 and 195 are interengaged such that valve member 190 is caused to rotate when valve actuator 182 is energized.

Gear 195 can match valve member 190, and gear 194 can match gear 192. Thus, the position of gear 195 is indicative of the position of valve member 190 and the position of valve opening 191 relative to nozzle 158. A magnet attached to upper gear 195 rotates relative to open and closed sensors 220 (FIG. 17) to indicate the open and closed positions, respectively, of fill valve 180.

A schematic cross-sectional diagram of the lower end of powder dispenser module 54, between powder inlet 130 and dispenser nozzle 158, is shown in FIG. 12. As shown, dispenser hopper 156 may be considered as having a powder bed preparation zone 156*a*, a powder bed compression zone 156*b* and a discharge zone 156*c*. Powder bed preparation zone 156a is located in the cylindrical conduit 152 below powder inlet 130. Powder bed compression zone 156b is located in an upper portion of tapered conduit 154, and discharge zone 156c is located in a lower portion of tapered conduit 154.

Figure 12:
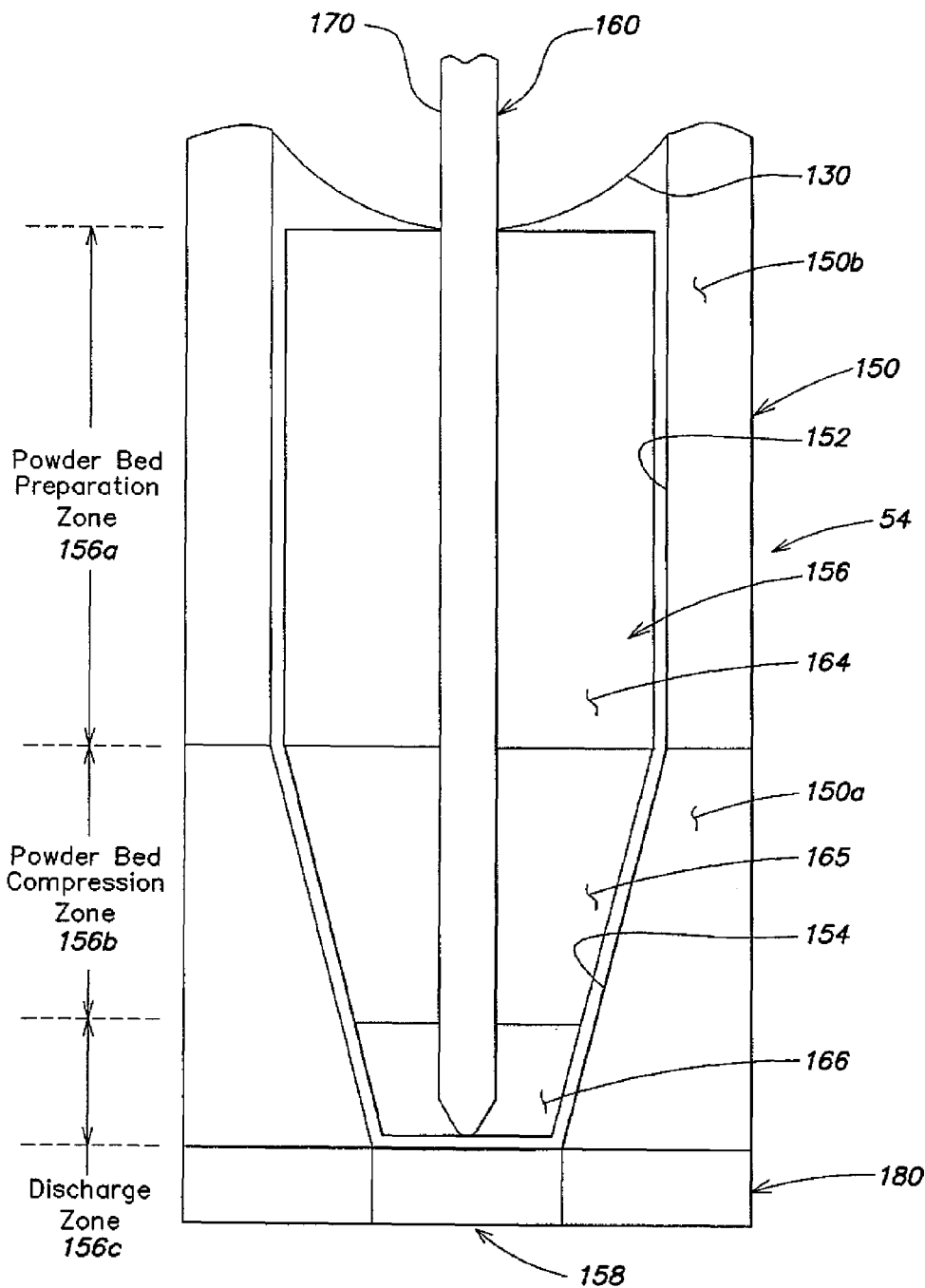
FIG. 12 is a schematic cross-sectional diagram of the lower end of the powder dispenser module.

Feed wand 160 can include a shaft 170 in the form of a rod that extends axially through dispenser hopper 156. Feed wand 160 further includes one or more feed elements affixed to shaft 170. The feed elements move powder from powder inlet 130 to dispenser nozzle 158 in a controlled manner. In the embodiment of FIG. 12, feed wand 160 includes a powder bed preparation element 164 in powder bed preparation zone 156a, a powder bed compression element 165 in powder bed compression zone 156b and a discharge element 166 in discharge zone 156c. Examples of feed elements 164, 165 and 166 are described below.

Figure 13A:
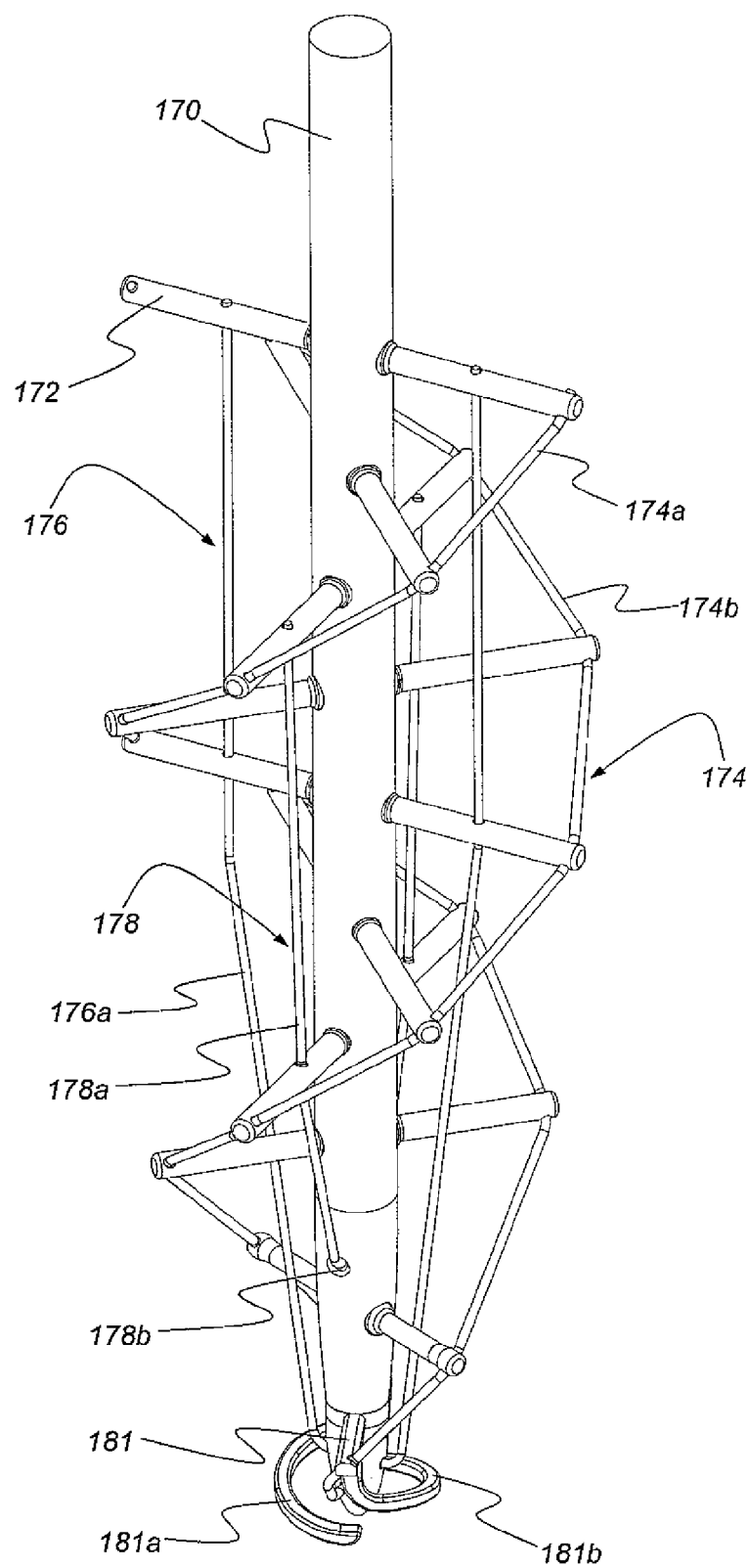
FIGS. 13A-13B illustrate a feed wand in accordance with one embodiment of the invention.
Figure 13B:
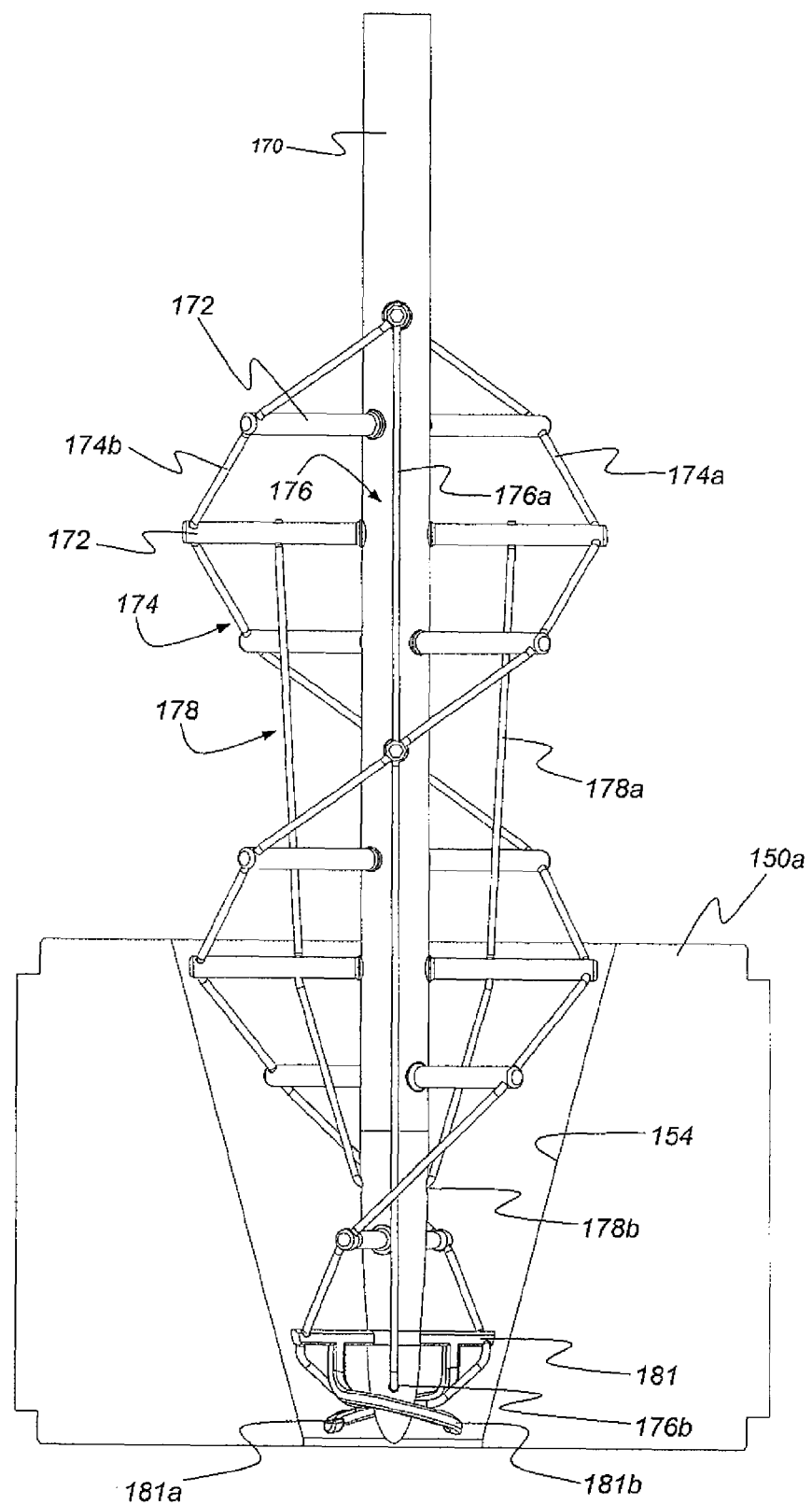
Figure 14B:
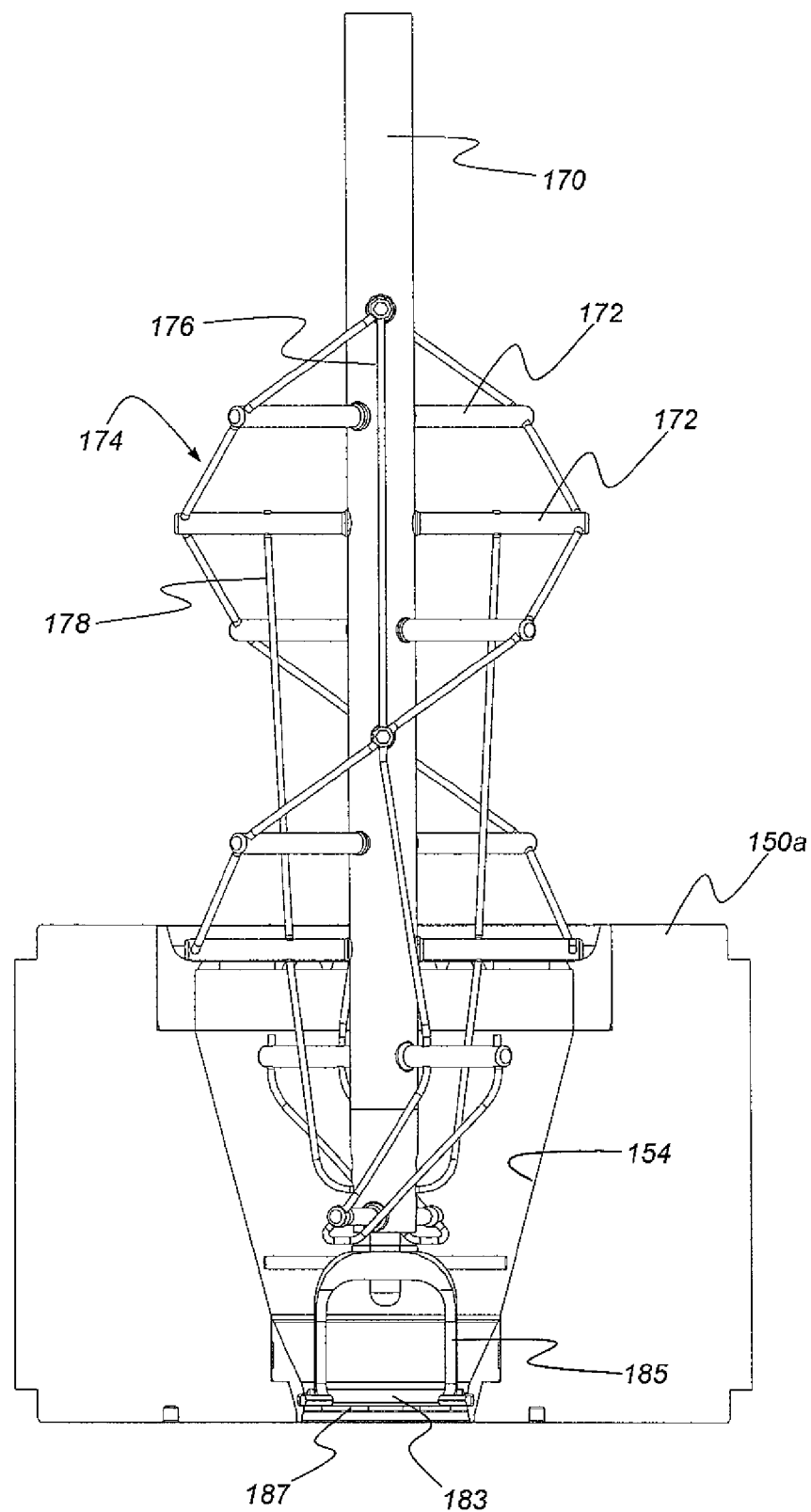
Figure 15C:
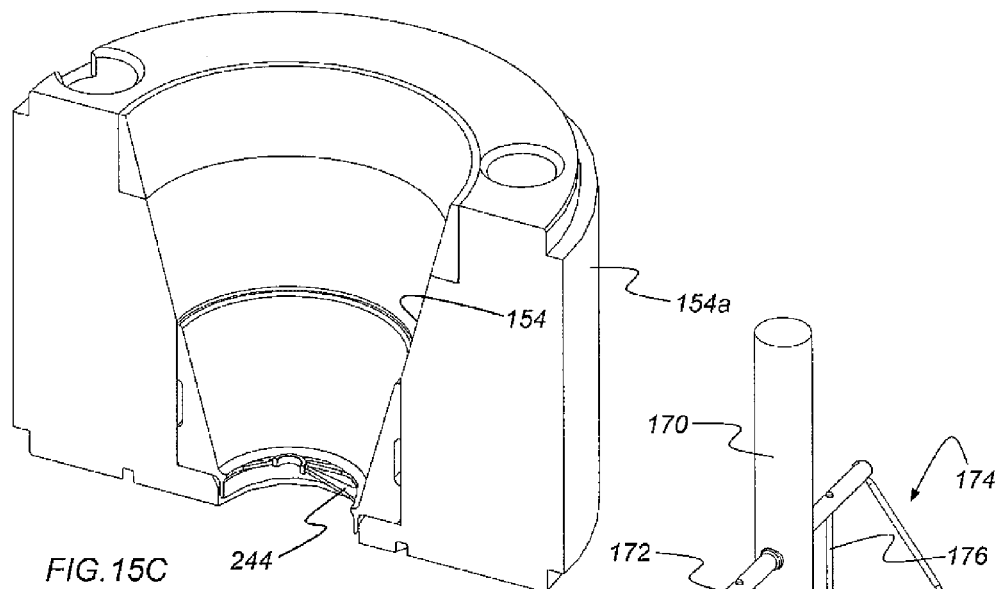
FIGS. 15A-15D illustrate a feed wand in accordance with a further embodiment of the invention.
Figure 15D:
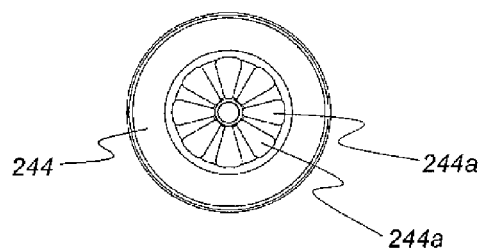
Figure 15A:
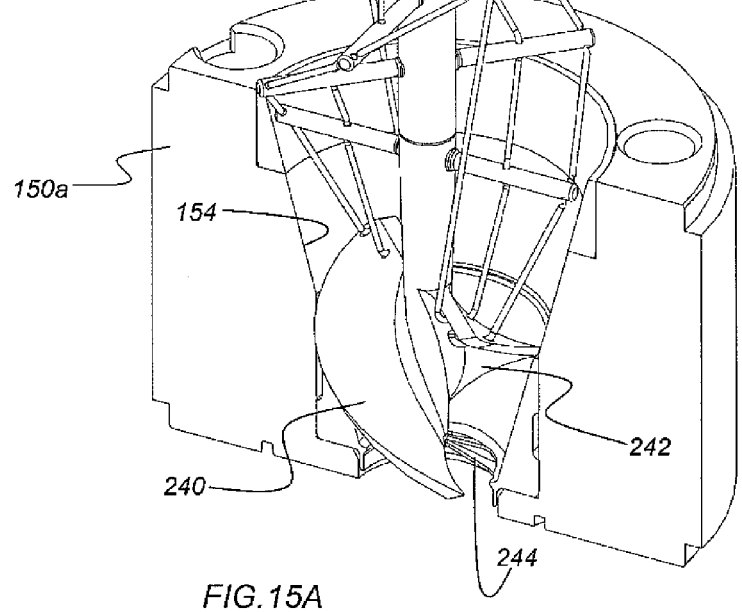
Figure 15B:
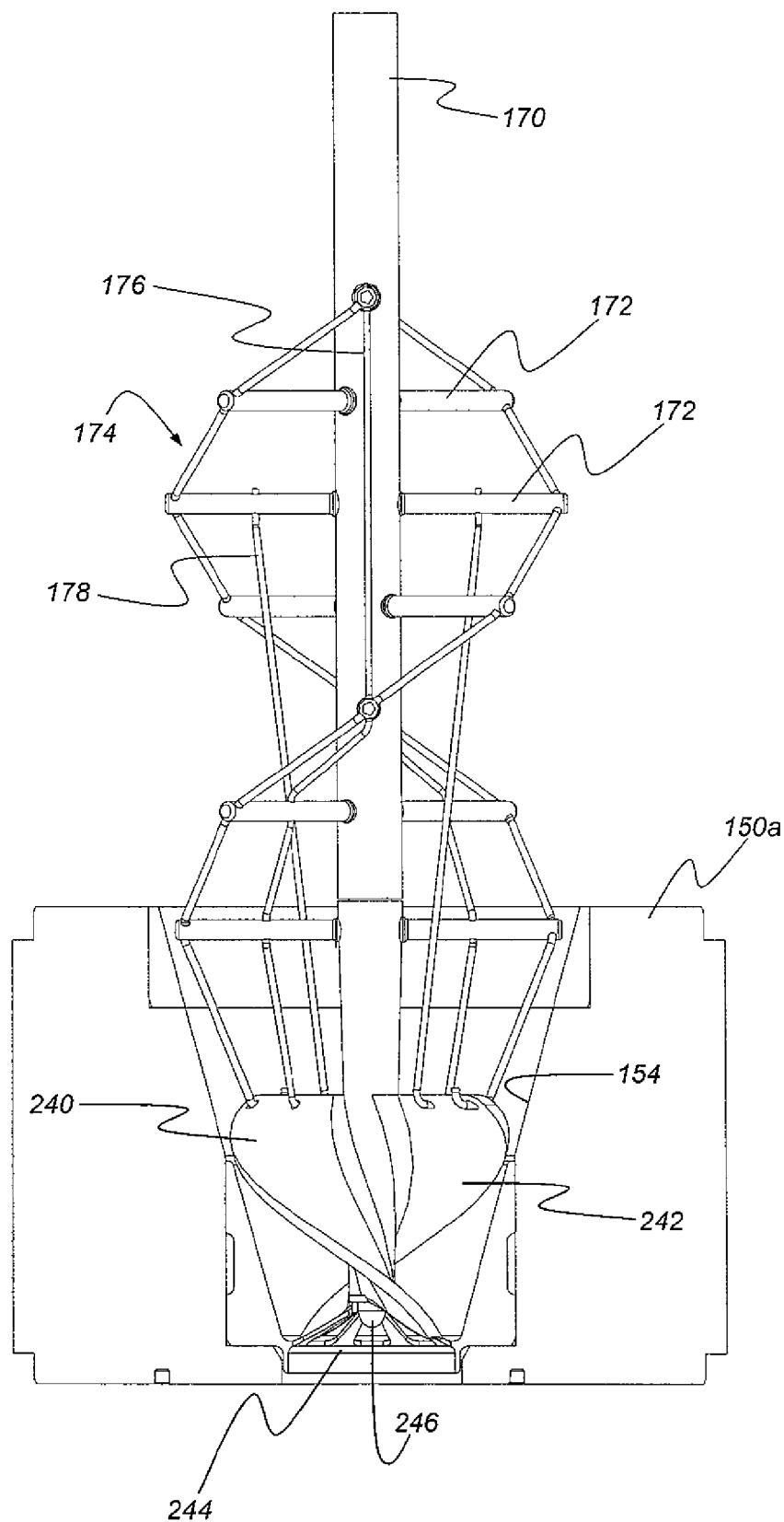
Figure 16A:
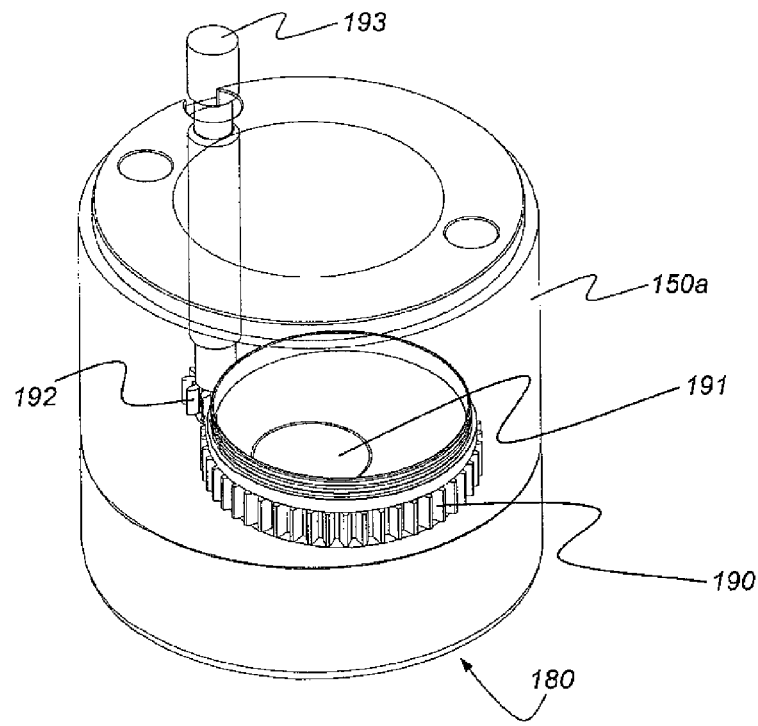
FIGS. 16A and 16B illustrate a fill valve in the open and closed positions, respectively.
Figure 16B:
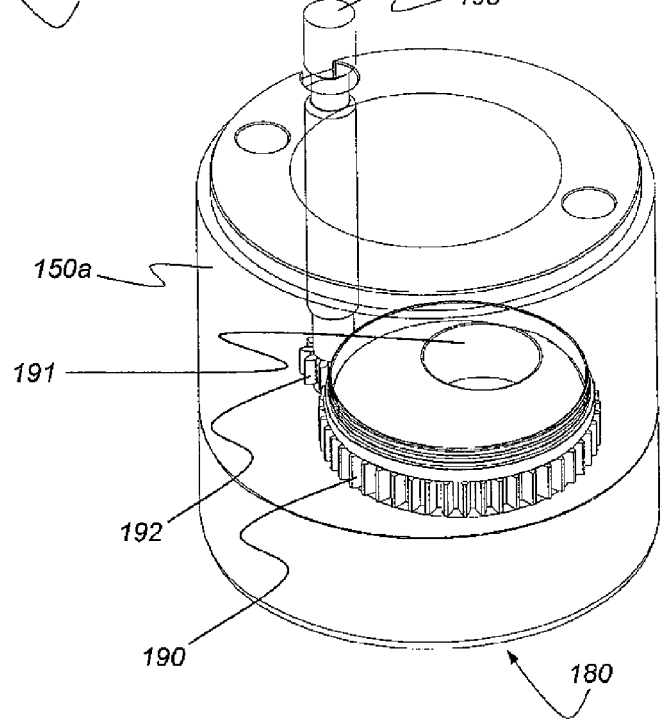

One embodiment of feed wand 160 is shown in FIGS. 13A and 13B. In the feed wand embodiments described herein, the powder bed preparation element 164 and the powder bed compression element 165 are implemented as a helical open space frame, including a plurality of spaced-apart spars 172 mounted to shaft 170 and one or more wires affixed to spars 172 and shaft 170. Spars 172 can extend radially from shaft 170 in cylindrical conduit 152 and tapered conduit 154. Spars 172 can extend nearly to the inside wall of hopper 156 without contacting the inside wall. The spars 172 in tapered conduit 154 vary in length to match the conical inside wall of tapered conduit 154. Spars 172 are mounted to shaft 170 in different radial directions. In a preferred embodiment, the ends of spars 172 define a double helix.

In the embodiment of FIGS. 13A and 13B, feed wand 160 includes ten spars. In this example, adjacent spars are spaced apart along shaft 170 at 0.125 inch intervals, and each spar is rotated by 45 degrees relative to the adjacent spar, except for the last two spars at the bottom of shaft 170, which are rotated by 22.5 degrees. The spar diameter can be the preferred agglomerate size, on the order of 0.025 to 0.075 inch. The spar material can be stainless steel or other structurally stiff, inert material that is corrosion-resistant, such as metal, ceramic, plastic and the like. The feed wand can be made of conductive or non-conductive material, depending on the powder morphology. Non-conductive materials such as ceramics, plastics and elastomers can be metallized to provide a conductive outer surface. Too many spars cause the powder to compact with wand rotation, whereas too few spars will not support the double helix configuration. The spacing between spars and the angle between adjacent spars can be inversely proportional to the number of spars used.

As noted above, feed wand 160 includes wires affixed to spars 172. In the embodiment of FIGS. 13A and 13B, the wires define a double helix 174, a first chevron 176 and a second chevron 178. As shown, double helix 174 includes a helix wire 174a at or near one end of each spar 172 and a helix wire 174b at or near the opposite end of each spar 172. Each helix wire 174a, 174b progresses downwardly from spar to spar in a clockwise direction as viewed downwardly from wand actuator 162.

First chevron 176 can include a first chevron wire 176a affixed to spars 172 at a first spacing from shaft 170, and second chevron 178 can include a second chevron wire 178a affixed to spars 172 at a second spacing from shaft 170. First chevron wire 176a passes through a hole 176b in shaft 170, and second chevron wire 178a passes through a hole 178b in shaft 170. It will be understood that the helix wires and the chevron wires are not necessarily affixed to every spar in the feed wand 160. In particular, first chevron wire 176a is affixed to the first spar (the uppermost spar) and the fifth spar. Second chevron wire 178a is affixed to the third spar and the seventh spar. The first and second chevrons can be spaced by 90° relative to each other.

In the embodiment of FIGS. 13A and 13B, the helix wires and the chevron wires are threaded through holes in the respective spars and are attached at each end. The helix wires are located at or near the ends of the spars, and the chevron wires are located at desired spacings from shaft 170. The holes in spars 172 can be tool drilled, laser drilled or edm drilled. In a preferred embodiment, the holes in spars 172 are edm drilled at angles that avoid significant bending of the wires. Thus, the holes in each spar are approximately aligned with the adjacent spars. This arrangement permits the wires to slide through the holes more or less freely so that the powder loading forces are distributed along the entire wire length, thereby reducing the wire stress concentration which could cause breakage. In other embodiments, the wires can be attached to the spars, such as by laser welding for example. In this example, the helix wires and chevron wires are 0.008 inch in diameter.

The double helix 174 can be formed by lacing the outer ends of the helically-mounted spars 172 with helix wires 174a and 174b. Wiring the spars 172 on both outer ends creates a double helix wire pattern. The double helix wire pattern performs three main functions. First, the perimeter wire inhibits compressed powders from adhering to conduit walls, particularly the walls of tapered conduit 154. Second, when the wand 160 is rotated clockwise (from the actuator shaft looking downward), the double helix lifts the powder at the conduit wall interface and further reduces it into the preferred agglomerate flowability size range. Third, when the wand 160 is rotated counterclockwise, the double helix feeds the bulk powder down along the shaft 170, as well as along the chevron wire free paths and into the dispenser nozzle 158. In addition, this rotary bulk powder feed operation tends to break up compressed powder disks which form horizontally between the rotating spars 172.

The feed wand 160 utilizes a helical open space frame that includes shaft 170 as a center support, spars 172 as structural cross members which form a helical pattern with a conically tapered lower end geometry, and wires that form double helix 174 and first and second chevrons 176 and 178, as described above. The inverted conical shape transitions the spars from a larger diameter conduit to a smaller diameter powder discharge nozzle. Wires are affixed to the spars to reduce bulk powder compression effects and to promote flow of the agglomerate slurry. The feed wand 160 has the capability of transporting highly cohesive powders with microgram dispensing precision, while controlling the tendency for bulk powder compaction. Powder compaction leads to powder compression lock-up and thus causes dispenser clogging. The helical open space frame provides an optimal bulk powder transport member which is capable of precision transport and dispensing of all types of powder morphologies from free flowing to highly cohesive. This capability is achieved by allowing only a minor portion of the helical mechanical forces to be directed downwardly into the bulk powder bed, thus controlling compression effects appropriately to the individual characteristics of the powder being dispensed. Because of this compression control, it is possible to transport cohesive powders from a large diameter conduit to a smaller one in an effective manner.

Shaft 170 forms the central drive shaft of the feed wand 160. Shaft 170 supports spars 172, double helix 174 and first and second chevrons 176 and 178 which, in turn, transport bulk powder for precision dispensing. The central drive shaft allows fine powders to flow along its smooth surface toward dispenser nozzle 158.

Spars 172 are structural cross-members that break up the compacted powder agglomerate bed. Spars 172 also support the helix and chevron wires. In addition, spars 172 provide the helical spiral mechanism necessary to convey the bulk powder bed in a controlled, low compression manner.

The chevron wires 176*a* and 178*a* provide cutting patterns within the bulk powder bed. The wires are located to reduce the compacted powder and to open a temporary free path within the powder bed that allows minute amounts of powder agglomerates to flow downwardly through the powder bed by gravity. In addition, the chevron wires sever the bulk powder disk that forms between spars 172. These disks are created by progressive compaction forces and form suspended aggregate powder structures. By cutting the disks, preferably at mid-span, the disks become structurally unstable and begin to break up and flow downwardly, driven by the mechanical forces from the helically-pitched spars 172.

The discharge element 166 (FIG. 12) is contoured and located to break up a powder compression disk located at the dispenser nozzle 158. The powder disk forms when the feed valve 180 is closed and the wand 160 is performing bulk powder raking and grooming operations. Without the discharge element 166 to dislodge and reduce the disk, the disk would either clog the nozzle or would fall into the cartridge when the valve opens, possibly causing cartridge overfill. The powder disk has the greatest tendency to block the nozzle when the ambient humidity is above 50 percent.

Embodiments of discharge element 166 are shown in FIGS. 13A-13B, 14A-14F and 15A-15D. Each of the embodiments uses the helical open space frame of spars and wires described above, but uses different discharge elements. Powder is induced to fall in powder bed preparation zone 156*a* by rotating the helical open space frame described above. The outer helical wires break attraction forces between the powder and the cylindrical conduit wall, and lift and aerate the powder bed when rotated in the reverse direction. The chevron wires cut and further reduce the powder bed as the helical space frame rotates. The powder bed preparation zone 156*a* enhances the flowability of the powder bed as it enters the tapered conduit of powder bed compression zone 156*b*. The powder flowability is enhanced by the ability of the helical open space frame to form natural agglomerates that allow the powder to flow when induced by the forces of the helical open space frame. In the powder bed compression zone 156*b*, the agglomerated powder bed experiences compression due to the volume reduction of the tapered conduit. The compression zone steadily increases the consolidation of the powder bed, while the spars and wires continue to reduce and aerate the powder bed. In discharge zone 156*c*, the powder agglomerate clumps are further reduced and discharged through nozzle 158. The discharge element controls the reduction and dispensing characteristics of the powder. Inadequate powder reduction control causes the discharge orifice to clog. Inadequate powder reduction control also inhibits powder dispensing within a specified time limit without dose overshoot. The discharge element determines the final powder dispensing flow rate and powder agglomerate consistency.

In the embodiment of FIGS. 13A-13B, the discharge element 166 is configured as a modified spar 181. The two sides 181*a* and 181*b* of modified spar 181 extend downwardly in a one-half turn counterclockwise helix, thus forming a double helix. Double helix modified spar 181 and double helix 174 have opposite pitches. In other embodiments, one side of the modified spar is turned upwardly in a helical shape. The modified spar can use a clockwise or counterclockwise helix. In some embodiments, the modified spar can be formed as an inverted U-shape or as an S-shape. The U-shape works better for free-flowing powders, while the S-shape performs better for cohesive powders. In the U-shape, both sides of the modified spar are turned toward the dispenser nozzle. In the S-shape, one side of the modified spar is turned toward the dispenser nozzle and the other side is turned upwardly.

The double helix modified spar 181 of FIGS. 13A-13B functions as a rotating polarizing element within the lower end of the tapered conduit. The reverse pitch geometry of the modified spar adds powder lift and aeration to control powder dispensing and to enhance powder consistency. The reverse pitch geometry also drives powder toward the nozzle during the raking cycle. This creates an initial 2 to 4 milligram powder dump at the beginning of the dispensing cycle and allows more time for filling at the end.

Another embodiment of feed wand 160 is shown in FIGS. 14A-14F. In the embodiment of FIGS. 14A-14F, the discharge element 166 is implemented as a roller pin 183 mounted to shaft 170 by a support element 185 having an inverted U-shape. In the embodiment of FIGS. 14A-14F, an optional multi-slot baffle disk 189 can be located in the upper portion of tapered conduit 154 and affixed to lower housing section 150*a*.

Powder dispenser module 54 further includes an orifice element 187 mounted in the lower end of tapered conduit 154. Orifice element 187 may have one or more slot-shaped orifices. In one embodiment shown in FIG. 14D, an orifice element 187*a* includes two slot-shaped orifices that intersect to form a cross. In other embodiments, orifice elements 187*b* and 187*c* include three intersecting slot-shaped orifices, as shown in FIGS. 14E and 14F. The orifices may be relatively wide, as shown in FIG. 14E, or relatively narrow, as shown in FIG. 14F. Feed wand 160 is positioned such that roller pin 183 is spaced from orifice element 187 by a spacing of less than the natural agglomerate size. In operation, roller pin 183 rotates relative to orifice element 187, causing powder to be discharged through the orifices in orifice element 187.

The baffle disk 189 can be used to control the powder bed advancement rate and to further reduce powder agglomerates as they enter the tapered conduit. In the discharge zone 156*c*, powder agglomerate clumps are reduced and then extruded by the rotating roller pin 183 through the orifices in orifice element 187. The mechanism including support element 185, roller pin 183 and orifice element 187 control the reduction and dispensing characteristics of the powder. Inadequate powder reduction control causes the discharge orifice to clog. Inadequate powder reduction control also inhibits powder dispensing within a specified time limit without dose overshoot. The support element 185 and the roller pin 183 determine the final powder dispensing flow rate and powder agglomerate consistency. The mechanism including support element 185, roller pin 183 and orifice element 187 can be configured to provide an optimum powder flow and agglomerate size for a particular powder morphology. The support element 185 tracks in a perimeter groove of lower housing section 150*a* to self-center the feed wand 160. The roller pin 183 combined with orifice element 187 produces low force powder agglomerate dispensing. The orifice element 187 provides powder agglomerate consistency within a tighter agglomerate size range.

A further embodiment of feed wand 160 is illustrated in FIGS. 15A-15D. Discharge element 166 is implemented as helical auger blades 240 and 242 affixed to shaft 170. Each auger blade 240, 242 has approximately one-half turn around shaft 170. The axial length of auger blades 240 and 242 can be approximately one-half of the axial length of tapered conduit 154. As shown, the feed wand of FIGS. 15A-15D uses fewer spars than the embodiment of FIGS. 13A-13B, and the helix wires and chevron wires can be affixed to the upper edges of auger blades 240 and 242. Auger blades 240, 242 and double helix 174 can have opposite pitches.

The powder dispenser module 54 shown in FIGS. 15A-15D further includes an orifice element 244 mounted in the lower end of tapered conduit 154. In the embodiment of FIGS. 15A-15D, orifice element 244 has an inverted conical shape and is provided with a plurality of orifices 244a for discharge of powder through nozzle 158. Further, the lower edges of auger blades 240 and 242 are angled to match inverted conical orifice element 244. A bearing 246 mounted at the lower end of shaft 170 engages an opening in orifice element 244 and establishes a desired spacing between auger blades 240, 242 and orifice element 244. The bearing 246 can be a jewel material, such as ruby or sapphire, which is non-contaminating to the dispensed drug powder. In operation, auger blades 240 and 242 rotate relative to orifice element 244, causing powder to be discharged through the orifices in orifice element 244. In other embodiments, the orifice element can be flat, as shown in FIGS. 14D-14F, and the lower edges of auger blades 240 and 242 are flat to match the orifice element.

This embodiment rotates opposite to the feed wands shown in FIGS. 13A-13B and 14A-14F. In the discharge zone 156c, powder agglomerates are caused to flow by the reverse pitch auger blades and then extruded and granulated by the rotating auger tip through the orifices in orifice element 244. The mechanism of auger blades and orifice element controls the reduction and dispensing characteristics of the powder. Inadequate powder reduction control causes the discharge orifice to clog. Inadequate powder reduction control also inhibits dispensing within a specified time limit without dose overshoot. The mechanism of auger blades 240, 242 and orifice element 244 has the capability of compensating for the variability of the powder bed fluidic head height, thus reducing the sensitivity of the dispensing process to the powder bed head conditions. The half-turn double helix of the auger blades isolates vertical fluidic bed forces from the powder in the nozzle, thus eliminating the force vectors which tend to pack powder in the nozzle. The mechanism of auger blades 240, 242 and orifice element 244 can be configured to provide optimum monotonic powder agglomerate sizes. The mechanism provides powder agglomerate consistency within a tighter agglomerate size range. The bearing 246 provides auger alignment and support, while maintaining auger-to-orifice powder membrane thickness.

In some embodiments, the discharge element 166 is mounted in a hole in the tip of shaft 170. In other embodiments, the discharge element 166 is implemented on a removable tip of shaft 170. For example, a double helix discharge element can be formed on a removable tip that is press fit into the end of shaft 170. The removable tip can be changed to accommodate different powder morphologies.

The following discussion of the operation of powder dispenser module 54 refers to raking operations and dispensing operations for the embodiments of FIGS. 13A-13B and 14A-14F. Raking is an operation to groom and recondition a powder bed into an evenly aerated, preferred agglomerate size matrix, thus providing greater flowability characteristics for bulk powder transport. The preferred agglomerate size is the natural, stable size of cohesive powder agglomerates created by a powder bed tumbling operation and is typically in a range of 0.025 inch to 0.075 inch spherical diameter. Powder bed raking can be performed in the down-feed or uplift modes. However, cohesive powders prefer uplift raking to achieve optimal aeration and enhanced flowability. Dispensing is an operation to transport dry bulk powder in a "sprinkling" manner, falling under the force of gravity without compression, as a preferred agglomerate matrix, discharged from a powder nozzle that dispenses into a cartridge. The powder dispensing and sensing apparatus described herein is capable of operation with powder agglomerates in a range of 0.005 inch to 0.075 inch spherical diameter, but is not limited to this range.

The feed wand 160 is rotated in a clockwise direction as viewed from the top of the dispenser module 54 to rake, groom and aerate the bulk powder bed. Clockwise rotation lifts the powder due to an upward flow vector created by the double helix. In this operation, the wand can be viewed as a screw, held vertically at its cap, being rotated into the powder. The double helix scrapes the conduit walls and also moves the outer agglomerates toward the center of the dispenser hopper. As the wand rotates, the spars force large agglomerates to break up evenly. This aerates the bulk powder bed, creating better bed consistency.

To dispense the powder, the wand 160 is preferably rotated in a counterclockwise direction. Spars 172 and chevrons 176, 178 break up the powder bed and open a free path for the powder to flow along shaft 170. The double helix 174 adds a downward compression vector to drive the powder down and through the dispenser nozzle 158. In other embodiments, the wand 160 is rotated in a clockwise direction to dispense powder. However, the agglomerates tend to be larger and the tendency to overfill is much greater for powder dispensing by rotation in the clockwise direction.

In the embodiments described above, the spars and the helix wires have a clockwise configuration as viewed from the top. It will be understood that the arrangement of the spars and wires of the feed wand can be reversed within the scope of the invention. Thus, the spars and the helix wires can have a counterclockwise configuration as viewed from the top. In this configuration, the wand is preferably rotated in a clockwise direction to dispense powder.

The following discussion of the operation of powder dispenser module 54 refers to raking operations and dispensing operations for the embodiments of FIGS. 15A-15D. The feed wand 160 is rotated in a counterclockwise direction as viewed from the top of the dispenser module 54 to groom the bulk powder bed and fill the auger. The double helix 174 adds a downward compression vector to drive the powder down and into the dispenser nozzle 158. At the same time, the auger blades 240, 242 supply upward force vectors on the powder to bring the powder in the auger up into the upper bed for aeration.

To dispense the powder, the feed wand 160 is preferably rotated in a clockwise direction. Clockwise rotation lifts the upper bed powder due to an upward flow vector created by the double helix of the helical open space frame. In this operation, the upper wand can be viewed as a screw, held vertically at its cap, being rotated into the powder. The double helix scrapes the conduit walls and also moves the outer agglomerates toward the center of the dispenser hopper. As the wand rotates, the spars force large agglomerates to break up evenly. This aerates the bulk powder bed, creating better bed consistency. Spars 172 and chevrons 176, 178 break up the powder bed and open a free path for the powder to flow along shaft 170.

The powder in the auger when dispensing first starts is forced through the nozzle by the downward force vectors of the auger. During dispensing, additional powder is supplied by the aerated powder falling from the upper bed.

In the embodiment described above, the spars and the helix wires have a clockwise configuration as viewed from the top. It will be understood that the arrangement of the spars and wires of the feed wand can be reversed within the scope of the invention. Thus, the spars and the helix wires can have a counterclockwise configuration as viewed from the top. In this configuration, the wand is preferably rotated in a counterclockwise direction to dispense powder.

Figure 11:
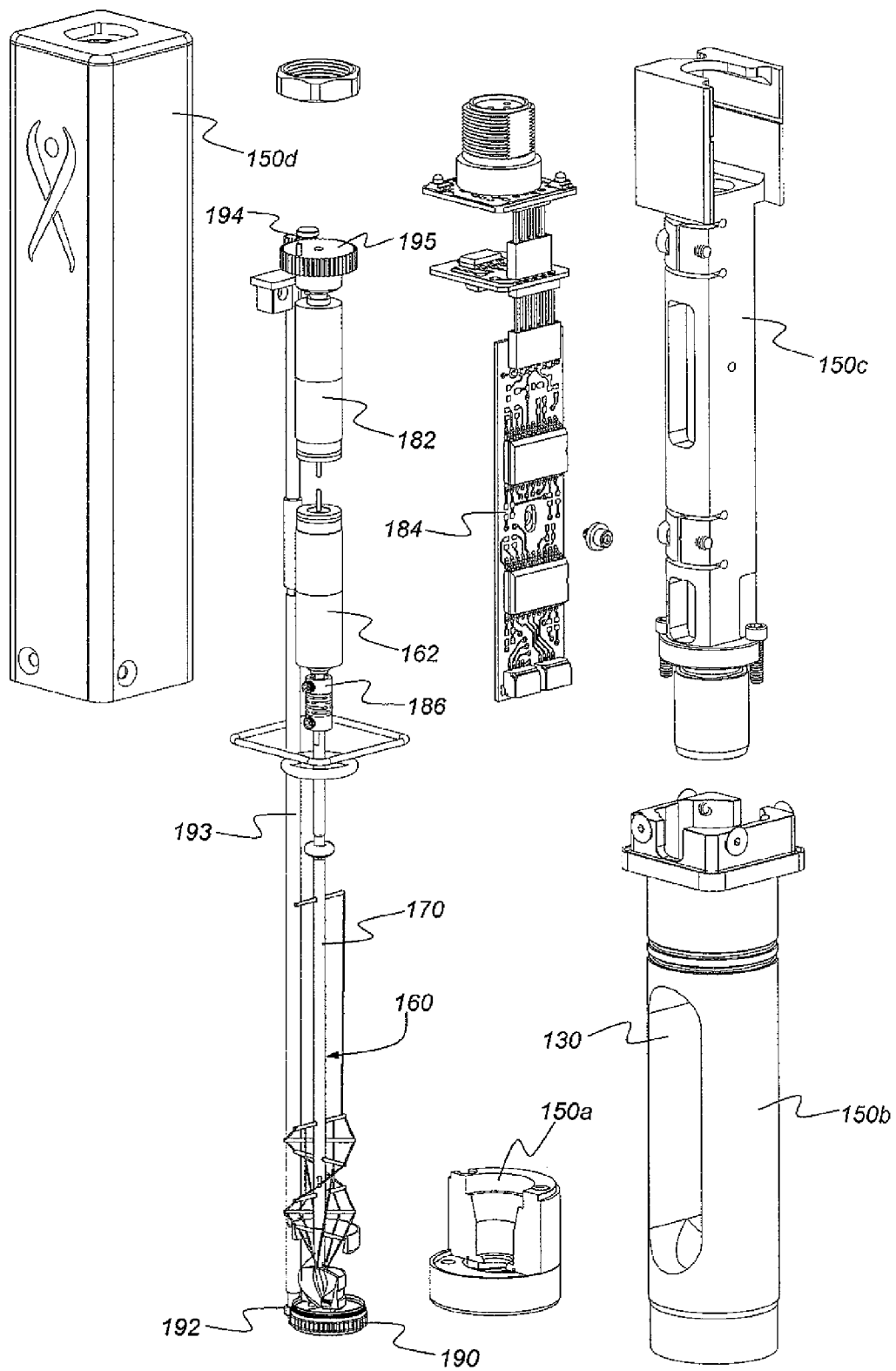
FIG. 11 is an exploded view of the powder dispenser module of FIG. 10.
Figure 17:
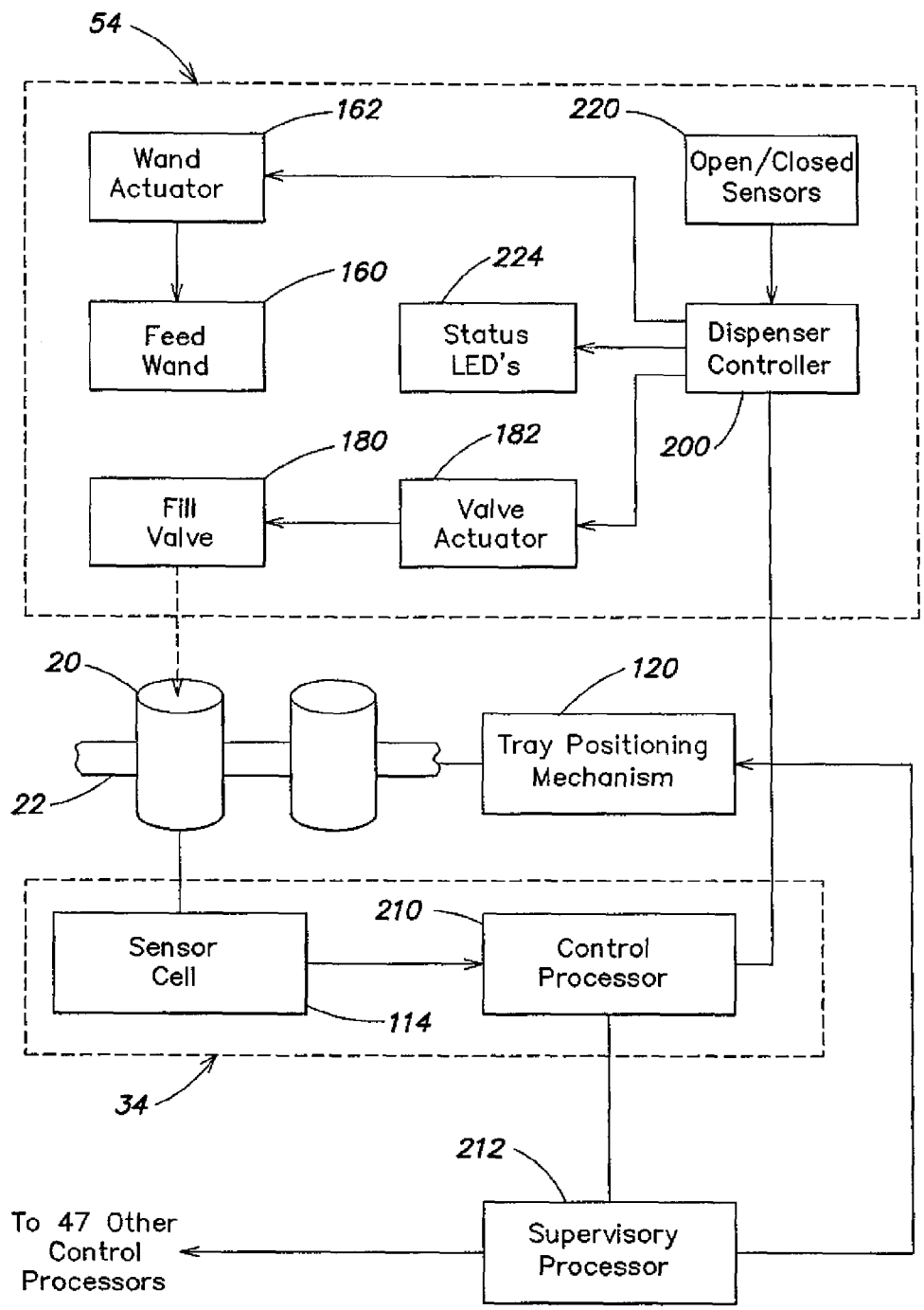
FIG. 17 is a block diagram of a control circuit for a single powder dispenser module and weight sensor cell.

A block diagram of a controller for a single powder dispenser module 54 and the corresponding sensor cell 114 is shown in FIG. 17. Preferably, the powder dispenser controls provide strategically concentrated redundant computing power at the lowest level. Powder dispenser module 54 includes a dispenser controller 200 (FIG. 17) on circuit board 184 (FIG. 11). Dispenser controller 200 can include three processors. One processor is provided for each of wand actuator 162 and valve actuator 182, and one processor is used to control status LEDs 224 and optional analog sensor inputs. A control processor 210 is located on a backplane of sensor module 34 as described below. The system utilizes one control processor 210 for each dispenser module 54 and its associated sensor cell 114. Processor 210 controls the communications between the sensor module 34 and the dispenser module 54, as well as external communication. When given fill parameters and a "go" command, the control processor 210 provides the intelligence to read the sensor cell and command the dispenser module actuators to perform cartridge filling. The control processor 210 also communicates with a supervisory processor 212 through a network interface. The supervisory processor 212 provides high level control of all the powder dispenser modules and sensor cells.

The controller of FIG. 17, except for supervisory processor, is repeated for each dispenser module 54 and associated sensor cell 114 in the system. In the above example of a 6×8 array of dispenser modules, the system includes 48 controllers. This arrangement provides individual control and monitoring of powder dispensing into each cartridge.

In one embodiment, the powder dispenser module 54 is configured and controlled to accurately dispense 10.0 mg (milligrams) of powder in ten seconds. The average flow rate is 1.0 mg per second at an accuracy of +/−0.3 mg, or 3 percent. The control circuit makes at least 20 decisions per second to fill at this flow rate. In other embodiments, the control circuit makes more or fewer than 20 decisions per second to achieve a desired accuracy. The feed wand geometry provides sufficient flow consistency to achieve this performance. The feed wand breaks down powder clumps into small agglomerate particles. The mechanically-fed agglomerate slurry has flow characteristics that allow the powder to be halted when the feed wand is stopped, with minimal powder overspill, which would cause overfilling of the cartridge.

The control circuit can provide the following controls and functions.

1. Wand speed is variable from 0.1 revolutions per second to 5 revolutions per second in 50 different speeds.

2. The wand can be dithered while filling. In dithering, the wand alternately rotates clockwise then counterclockwise, such as for example with a two steps forward/one step backward, type of motion based upon a programmable dither factor. A "dither less than weight" function engages the dither motion when the fill weight is less than a selected weight. A "dither greater than weight" function engages the dither motion when the fill weight is greater than the selected weight. A "dither between" function engages the dither motion when the fill weight is between two selected weights. A dither index is the selected rotational speed while dithering. A dither weight is the selected weight to start or stop dithering, and a minimum dither time at the selected dither weight can be selected. In some applications, dithering may not be utilized.

3. The control circuit can open and close the powder dispenser fill valve.

4. The control circuit can tare the sensor cell and start a powder dispensing cycle, and can stop the powder dispensing cycle.

5. The control circuit can rake the powder in the powder dispenser with a sequence defined by rake time, dither time and speed.

6. A new load function starts a raking/dither cycle usually run after loading the dispenser module with fresh powder. The rake time, dither time and speed are specified.

7. Additional functions include automatically opening and closing the fill valve during a filling cycle, automatically raking the powder each time the valve closes, and automatically dithering the powder after raking each time the valve closes.

8. A "stop-steps" function sets the number of steps to reverse rotate the feed wand after reaching a target weight. This tends to pull the powder flow back to prevent overfill and depends on the type of powder morphology and relevant ambient humidity conditions.

9. A speed control function forces the feed wand to run at full speed until reaching a selected fill weight. At this trigger point, proportional control starts to reduce the wand speed in proportion to the target weight minus the actual weight. This approach reduces the total fill time. For a nominal fill weight of 10 mg and a tolerance of +/−3 percent, any fill weight between 10.3 and 9.7 mg is acceptable. Since an overfilled cartridge must be discarded, filling is stopped as soon as possible after reaching the minimum weight in order to avoid possible overfills. The minimum weight is set, for example, to 9.75 mg, which is slightly above the actual low limit of 9.70 mg. This is necessary because when powder falls into the cartridge, peripheral forces such as inertia, aerodynamics, static, and magnetic field flux can cause temporary weight readings that are slightly higher than the actual powder weight. The reading settles to the actual weight over a brief time of a few tenths of a second. Setting the minimum weight to 0.05 mg above the actual low limit reduces the risk of an underfilled cartridge.

10. Parameters associated with the fill cycle include the proportional gain of the fill servo loop, the integral gain of the fill servo loop which is activated, for example, at 1.0 mg less than the target weight, and the maximum wand speed allowed during a fill cycle. The wand speed can be controlled by specifying a speed index between 0 and 50. The wand speed in revolutions per minute as a function of wand speed index has a characteristic that is relatively linear for low values of wand speed index and then increases dramatically to the maximum wand speed. This characteristic provides finer control at lower speeds than at higher speeds and permits the wand to be run much faster during the initial 70 percent of the fill cycle to quickly fill the cartridge to 90 percent of its fill weight. The maximum wand speed is typically about 5 revolutions per second. Beyond that speed, there is a risk of packing the powder so tightly that the dispenser would have to be removed and cleaned to restore the original powder flow characteristics.

A dither factor controls reciprocation of the feed wand as it rotates, if dithering is enabled. In this embodiment, the ratio of forward rotation to reverse rotation is two. Thus, the feed wand rotates 2n steps forward and n steps backward, based on the value of the dither factor. Thus, for example, a dither factor of 500 represents 1000 steps forward and 500 steps backward, whereas a dither factor of 1 represents 2 steps forward and 1 step backward. In other embodiments, the ratio of forward rotation to reverse rotation can have a value different from two and/or can be programmable.

11. A fill time servo control function adjusts the maximum index of wand speed in proportion to the time spent at full speed during the last fill cycle. The time spent at full speed is a good indication as to how well the powder is flowing. If the actual time at full speed is greater than the setting, then the control increases the maximum wand speed index to speed up the filling. Conversely, if the actual time at full speed is less than the setting, the maximum wand speed index is decreased to maintain a consistent process time. While filling as fast as possible appears desirable, there is a risk of packing the powder, clogging the dispensers or overfilling the cartridges.

The parameters of the powder dispenser module 54 are interrelated as follows. Greater overshoot control is available when smaller particle agglomerate sizes are dispensed into the cartridge. Speeding up the wand increases flow rates but compresses the powder into large agglomerates. Large agglomerates increase flow, but are more likely to overfill in the last seconds of filling. A large powder reservoir saves dispenser loading time, but compresses the powder into large agglomerates and requires more powder conditioning prior to filling. Dithering chops up the large agglomerates for more accurate filling, but reduces the flow rate. Conditioning the powder prior to filling increases filling consistency, but adds to overall filling time.

An embodiment of a cartridge fill cycle is described with reference to FIGS. 18 and 19. The fill cycle is described with reference to an example of filling the cartridge with a 10 mg dose of Technosphere microparticles in 10 seconds. It will be understood that different parameters can be utilized for different fill weights, different powder morphologies, different fill times and different environmental conditions. The cartridge fill cycle can be executed by control processor 210 and dispenser controller 200.

The dispenser control processors in conjunction with the supervisory computer monitors all of these control factors against the filling weight values, read 20 times per second, as the dispensers are filling the cartridges. This data, when compared against ideal dispense cycles, provides feedback to promote improved powder cohesivity, flowability, consistency, patient drug efficacy and overall quality control. It will be understood that the weight values can be read more or fewer than 20 times per second within the scope of the invention.

Figure 18:
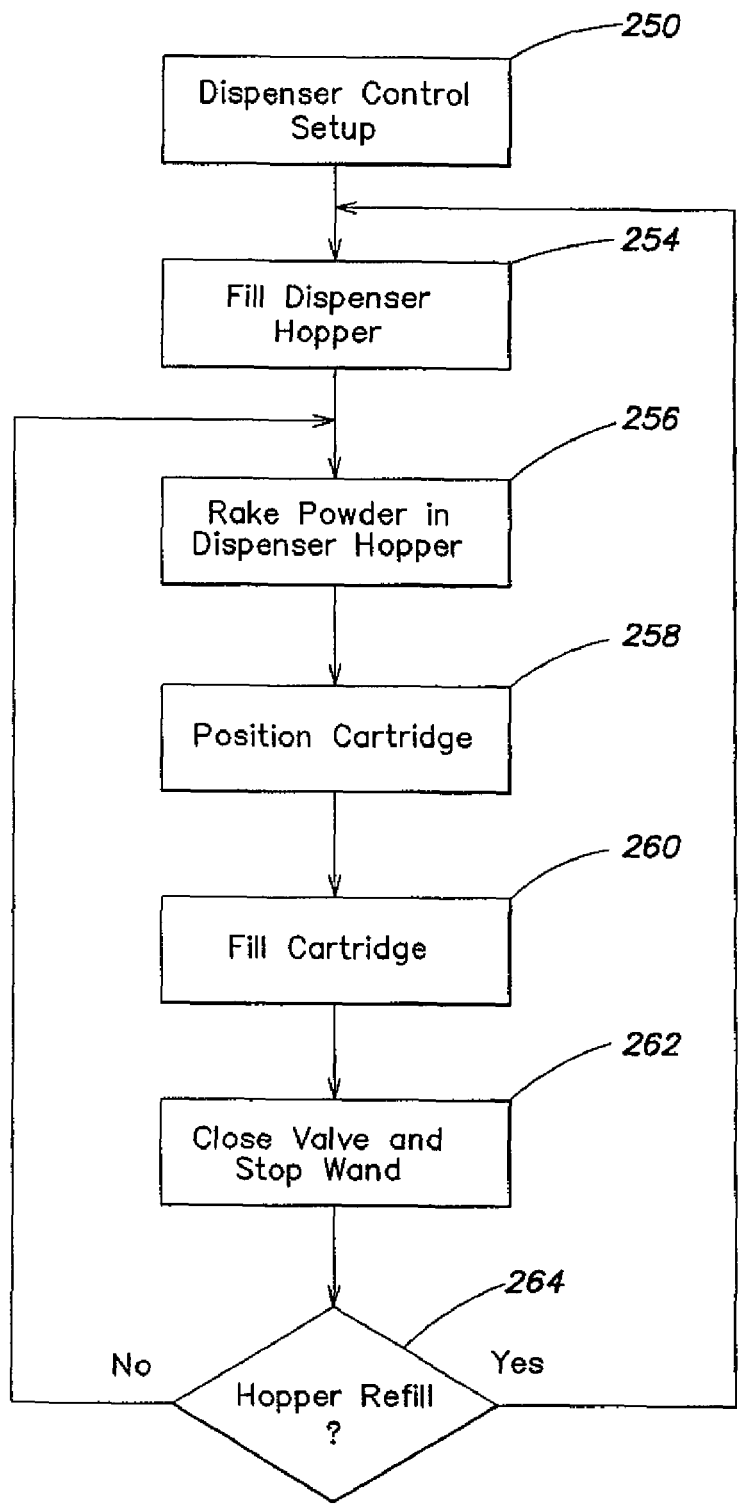
FIG. 18 is a flow chart of a powder dispensing process.

Referring to FIG. 18, control parameters for dispenser module operation may be set in step 250. For example, initially, dithering is set to "off." The valve control parameters can be set such that raking is set for two seconds after a new powder load, the speed index is set to 44, auto-open is set to "on" and automatic rake after close is set to two seconds. Fill parameters can include a setting of 8.8 mg at which proportional control begins, the target fill weight can be set to 10.0 mg, proportional gain can be set to 1.0, integral gain can be set to 0.03, and the maximum wand speed index can be set to 41 (two revolutions per second). The dither factor can be set to 50, and the fill time servo can be set to 10.0 seconds. A bipolar ionizer can be activated to charge neutralize the powder dispenser module and the cartridge.

In step 254, the dispenser hopper 156 is filled with powder by operation of the powder transport system 32. Powder is delivered to array block 50 by powder aerator 72. The powder is supplied through the channels in array block 50 to each of the powder dispenser modules 54. When excess powder passes through array block 50 and is sensed by the dispenser fill level sensor in suction manifold 84, loading of the dispenser modules 54 is complete, and the powder transport system is de-energized. The dispenser hopper 156 can be raked during the hopper fill cycle to remove large air gaps and inconsistencies in the powder bed.

The hopper assembly 74 is filled by the operator or other automatic injection system. The flow assist mechanism rotates to breakup the new compressed powder. The agglomerator rollers rotate to deliver large agglomerate powder to the dump valve in the aerator 72. A dump valve level sensor signals that the dump valve is full to stop the agglomerator rollers. The blower assembly 70 rotates at approximately 3500 rpm to cycle gas through the system. The pneumatic broom rotates in preparation for powder delivery by the dump valve. The bypass valve is set to 50% to facilitate both powder and air stream gas transport.

The dump valve rotates in 10 degree per second increments to gradually drop powder into the pneumatic broom chambers. As powder becomes available to the pneumatic broom, fine agglomerates are transported up the risers and into the dispenser fill chamber. Most filling occurs in the last dispenser positions at this time. After the dump valve cycle is complete, the crossover valve rotates to 0% bypass in 10 degree per second increments to phase in maximum pneumatic broom pressure. This transports all but the heaviest agglomerates into the dispenser chamber and fills the middle rows of dispenser modules. Lastly, the blower assembly 70 increases speed to 8000 rpm to transport the remainder of the powder from the pneumatic broom chamber to the first rows of dispenser modules.

As these fill cycles continue, the dispenser hoppers become full. The blower assembly 70 in combination with the bypass valve even out the dispenser bed height across the dispenser modules by scavenging powder from the high peaks, circulating the fine powder through the system and depositing the powder into the low pressure areas of the powder bed between the peaks.

In step 258, a cartridge is positioned below the dispenser nozzle 158 on the weight sensor cell. As described above, a tray of cartridges is positioned between the array of powder dispenser modules 54 and the sensor module 34. In step 260, the cartridge is filled with the prescribed dose of powder. The fill cycle is described below in connection with FIG. 19. In step 262, the fill valve is closed and rotation of the feed wand is stopped.

In step 264, a determination is made as to whether the dispenser hopper requires refilling. If the dispenser hopper requires refilling, the process returns to step 254. If the dispenser hopper does not require refilling, the process returns to step 256. In the present example, the dispenser hopper can be refilled after four 10.0 mg doses. It will be understood that refilling of the dispenser hopper can be initiated after more or fewer than four cartridge fill cycles, depending for example on the capacity of the dispenser hopper and the quantity of powder dispensed on each fill cycle. The dispenser hopper is refilled in step 254. If refilling is not required, the process proceeds with the fill cycle for the next cartridge in step 256. In the present example, the dispenser hopper contains enough powder for twenty 10.0 mg doses. In some embodiments, the filling process is dependent upon the powder height in the dispenser hopper to create a dry powder fluidic head and to assist in gravity-induced powder flow. Without an adequate fluidic head, the filling time increases beyond the fill time limit. Other techniques may be used to determine that refilling of the dispenser hopper 156 is required. For example, if little or no powder is dispensed during the cartridge fill cycle, it may be assumed that refilling of dispenser hopper 156 is required.

Figure 19:
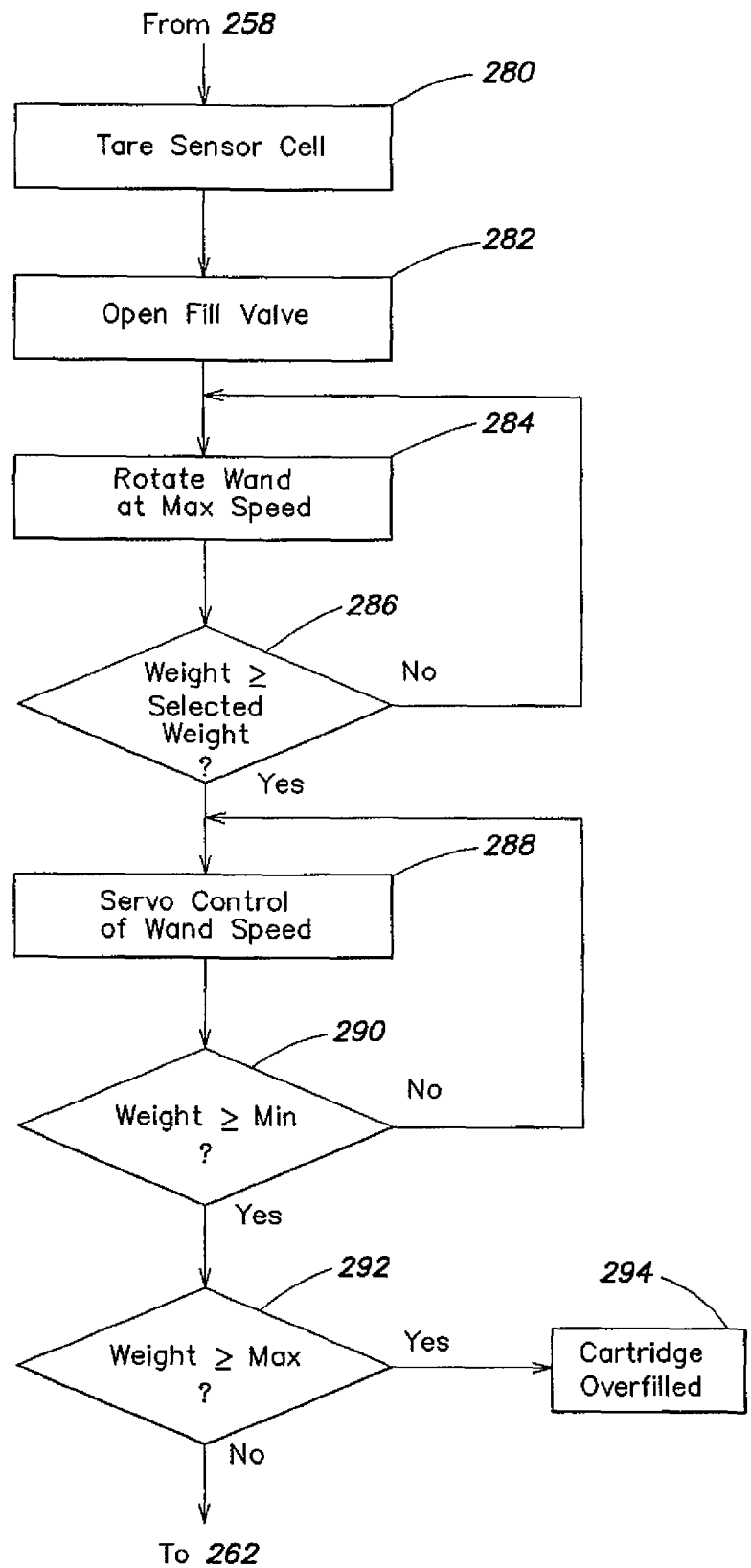
FIG. 19 is a flow chart of a cartridge fill cycle.

An embodiment of the cartridge fill cycle is shown in FIG. 19. An initial operation is to tare the sensor cell in step 280. The tare operation subtracts the empty cartridge weight from the sensor cell reading so that the sensor cell reads zero or near zero at the beginning of the fill cycle. The control circuit waits 0.5 second for the sensor cell to complete its tare cycle and proceeds with the fill operation if the sensor cell reads less than 0.02 mg. Otherwise, the tare cycle is repeated.

In step 282, the fill valve 180 is opened. As described below, the fill valve opening can be slightly offset from the dispenser nozzle 158 to ensure consistent operation.

In step 284, the feed wand is rotated in the counterclockwise direction for filling. Typically, actual filling starts after about 2 seconds, the time needed to advance enough powder to restart powder flowing after raking. Initially, the feed wand is rotated at the full speed specified during dispenser module setup. The weight of the dispensed powder in the cartridge is monitored during filling.

In step 286, a determination is made as to whether the current sensed weight is greater than the selected weight at which proportional control is initiated. In the example of a 10 mg dose, the selected weight can be 8.8 mg. If the sensed weight is not greater than the selected weight, the process returns to step 284 and rotation of the feed wand continues at full speed. If the sensed weight is greater than the selected weight, servo control of wand speed is utilized in step 288. An initial error is determined as the target weight minus the selected weight at which servo control is initiated. In the above example, the initial error is 10.0−8.8=1.2 mg. The wand speed is controlled according to:

New wand speed index=((current error/initial error)*proportional gain*max index)+(integral gain*elapsed time).

In this embodiment, the control circuit sets the wand speed based on the current error 20 times per second. The current error is determined as the target weight minus the current sensed weight. For a current error of 0.6 mg, which is one-half the initial error in the above example, the wand speed is reduced from the max index of 41 to an index of 20. Due to the nonlinearity of the index-speed curve, the actual wand speed is less than half of the initial speed. As noted above, the index-speed curve is linear to zero where the most control is needed. The proportional gain value allows the amount of speed change as a function of error to be varied. The elapsed time is turned "on" when the current sensed weight is greater than the target weight minus 1.0 mg. The proportional error equation reduces the wand speed based on a fixed ratio of actual to desired weight. There are times at very low speed, when nearing the target weight, that the wand speed is inadequate to produce powder flow. If left alone, the fill cycle would run overtime and fail to complete the target weight. The integral gain factor increases the speed by accumulating elapsed time and multiplying elapsed time by the integral gain factor. This factor increases the new wand speed and forces the wand to rotate faster to overcome the filling stall.

Referring again to FIG. 19, the current sensed weight is compared with the minimum weight in step 290. If the current sensed weight is less than the minimum weight, servo control of the wand speed continues in step 288. If the current sensed weight is equal to or greater than the minimum weight, the current sensed weight is compared with the maximum weight in step 292. If the current sensed weight is greater than the maximum weight, the cartridge is determined to be overfilled in step 294. If the current sensed weight is not greater than the maximum weight, the fill cycle is complete and the process returns to step 262 in FIG. 18.

In step 262, the control circuit can adjust the servo. If the fill time was greater than 11 seconds, the control circuit can increase the max speed index by one. If the fill time was less than nine seconds, then the control circuit can decrease the max speed index by one. This control attempts to maintain a consistent fill time of 10 seconds.

Preferably, valve member 190 is positioned such that valve opening 191 is offset with respect to the lower end of tapered conduit 154 when fill valve 180 is in the open position. More particularly, valve member 190 is offset such that valve opening 191 is post-positioned relative to tapered conduit 154. That is valve opening 191 is offset toward the closed position of the valve. In addition, valve member 190 is rotated in one direction when opening and closing the valve to compensate for any hysteresis in the drive train. Thus, for example, valve member 190 can be rotated clockwise to open the valve and can be rotated further clockwise to close the valve. This operation reduces the risk of inconsistent filling or overfilling that can result from uncontrolled offset between valve member 190 and tapered conduit 154 in the open position.

Any offset between valve opening 191 and tapered conduit 154 in the open position produces a small shelf on the top of valve member 190 that can accumulate powder. If the valve opening 191 is pre-positioned relative to tapered conduit 154, any powder on the shelf is dumped when the valve is closing, thus potentially overfilling the cartridge. When valve opening 191 is post-positioned relative to tapered conduit 154, the valve closes without dumping any powder from the shelf. The powder is dumped when the valve is opened for the next cartridge, and the dumped powder is measured by the sensor cell.

The powder dispenser module 54 and its operation have been described in connection with embodiments for dispensing a specified quantity of Technosphere microparticles in a specified time. It will be understood that a variety of different dispenser module structures and operating protocols can be utilized within the present invention. For example, the feed wand can utilize different structures, such as different spar configurations, different wire configurations, and in some embodiments wires may not be required. Different numbers of helix wires and chevron wires can be utilized. Different discharge elements can be utilized. The feed wand can utilize a different feed mechanism, such as a screw mechanism, for dispensing powder. Any suitable fill valve mechanism can be utilized to control dispensing of powder. Regarding operation, any operation protocol that achieves desired operating parameters can be utilized. For example, any suitable motion of the feed wand, such as rotation, reciprocation, or vibration, can be utilized. The speed of motion can be fixed or variable, or a combination thereof. Dithering, proportional control, integral control, and other control techniques can be utilized separately or in combination as needed. The sensor module can be configured to provide sensed values at any desired rate, within the capabilities of the sensor module. In general, powder dispenser module 54 should have a compact structure to permit mounting in an array as described above and should be configured to dispense a desired quantity of powder in a specified time interval in response to a control circuit that receives sensed values from a sensor module, such as the weight sensor in the embodiment described above.

As shown in FIGS. 20 and 21, sensor module 34 can include sensor assemblies 110 mounted in sensor housing 100. In the illustrated embodiment, each sensor assembly 110 includes two sensor cells 114. The sensor assemblies 110 are mounted in sensor housing 100 so that sensor cells 114 are positioned to weigh cartridges 20 in cartridge tray 22. In one embodiment, sensor cells 114 are mounted in a 6×8 array on one inch centers. In this embodiment, 24 sensor assemblies 110, each including two sensor cells 114, are utilized to provide an array of 48 sensor cells.

Each sensor assembly 110 has a vertical configuration wherein two sensor cells are packaged together. Weight sensing mechanical components are located at the top of the assembly, electronic circuitry is located below the mechanical components and an electrical connector 300 is located at the bottom of the sensor assembly 110.

Sensor housing 100 includes a sensor locating plate 310, a sensor enclosure 312, a sensor tray 314 and a guide pin assembly 316. Locating plate 310 includes an array of openings that match the positions of cartridges 20 in cartridge tray 22, so that the sensor cells 114 are accurately positioned with respect to cartridges 20. Guide pin assembly 316 permits locating plate 310 to be positioned on sensor assemblies 110 without damaging the sensitive probes 112 or the sensor cells. Sensor tray 314 can include an arrangement of dividers for positioning sensor assemblies 110 in sensor module 34.

Figure 20:
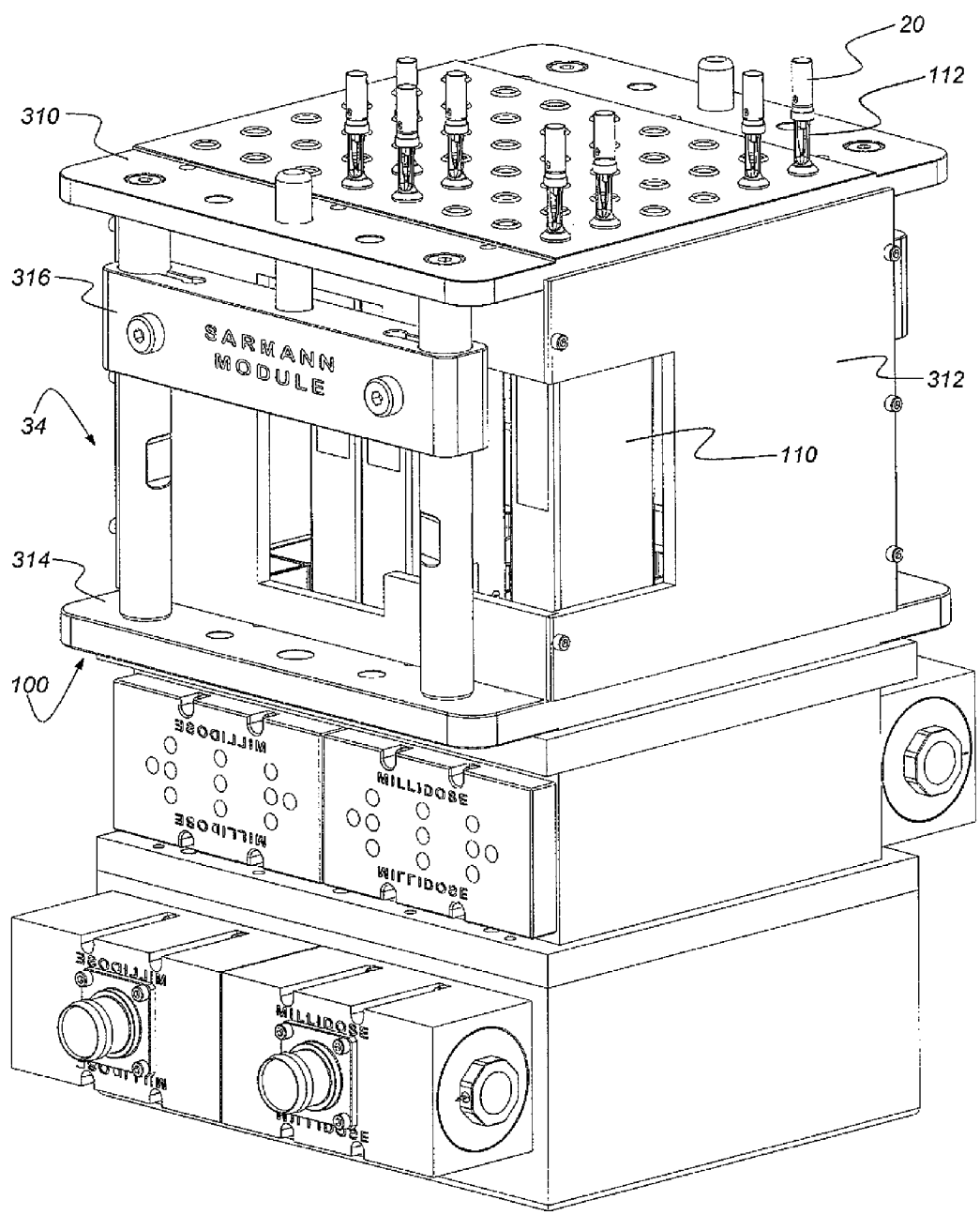
FIG. 20 is a perspective view of the sensor module.
Figure 21:
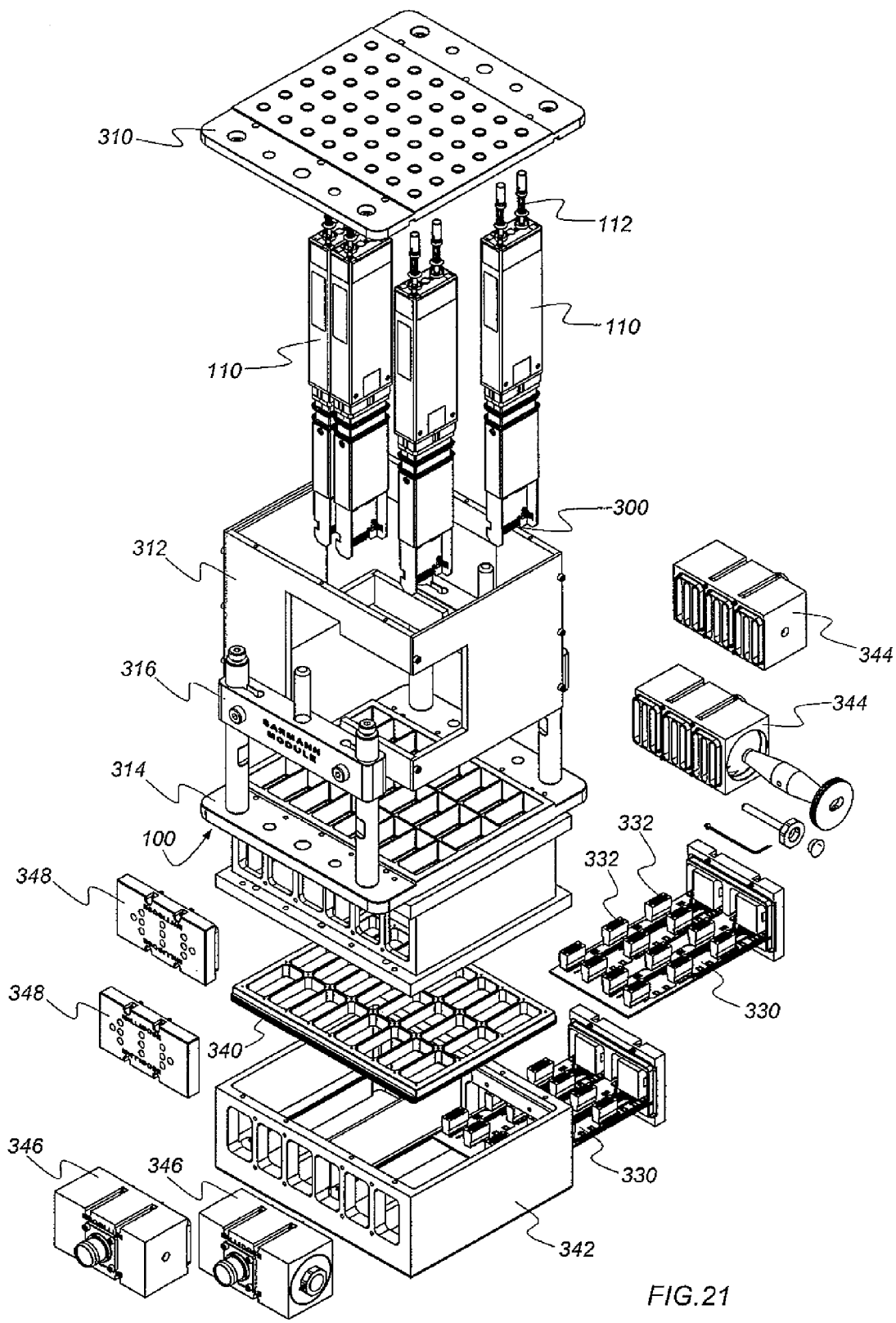
FIG. 21 is an exploded view of the sensor module of FIG. 20.
Figure 24:
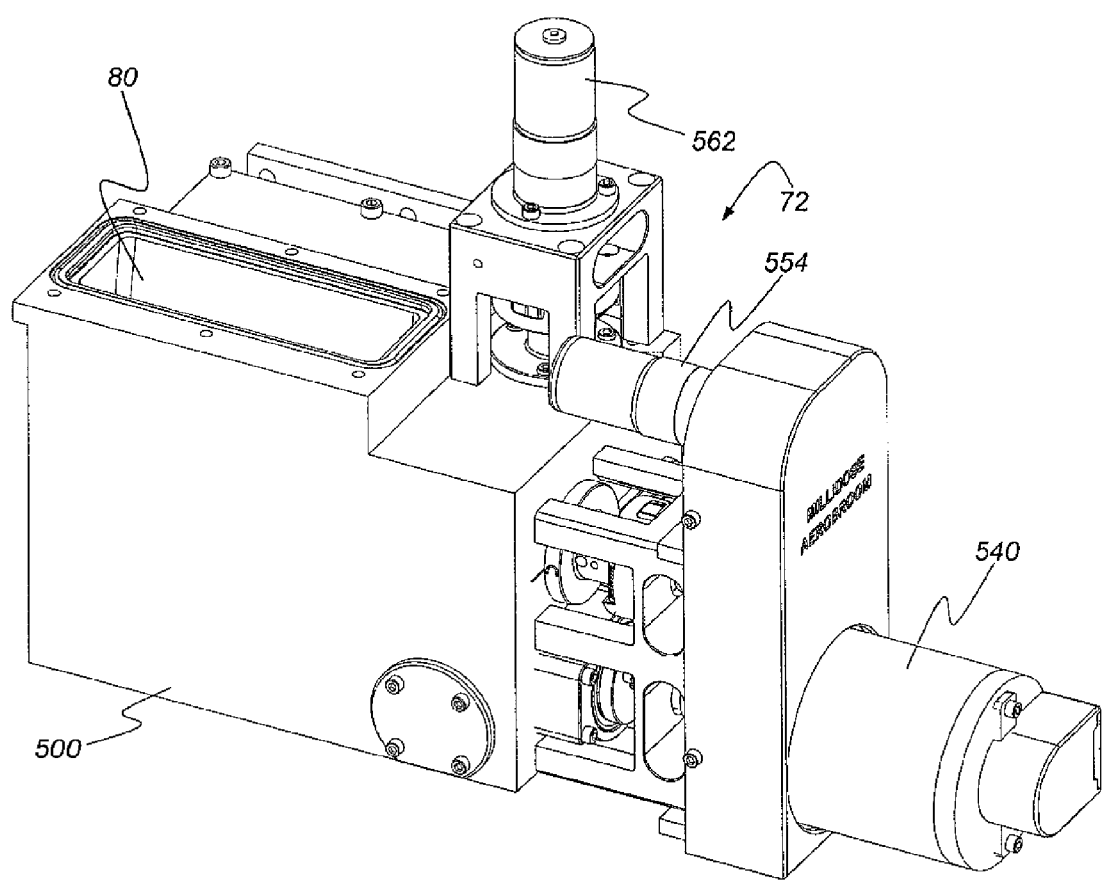
FIG. 24 is a perspective view of a first embodiment of a powder aerator.
Figure 25:
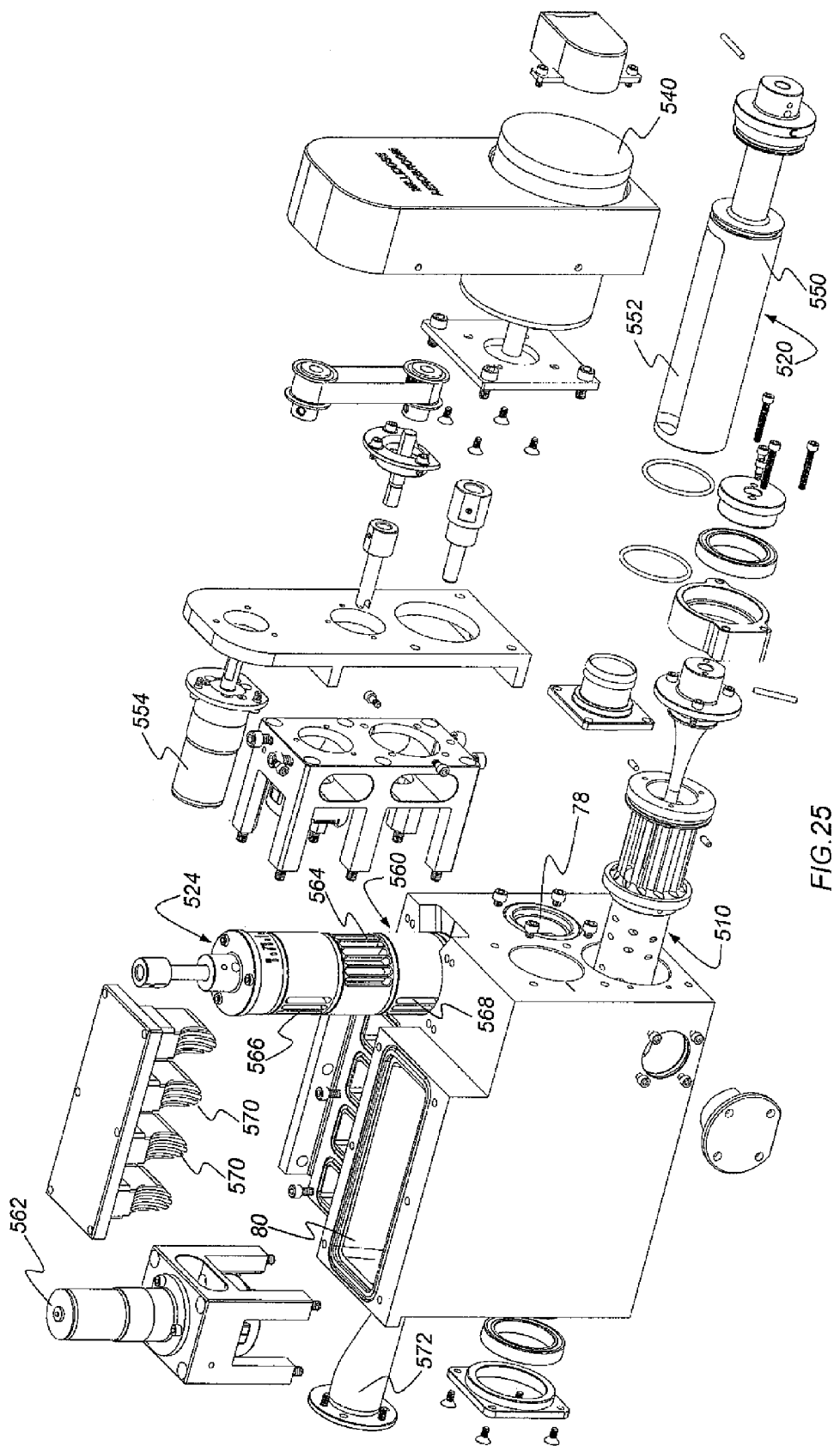
FIG. 25 is an exploded view of the powder aerator of FIG. 24.
Figure 26:
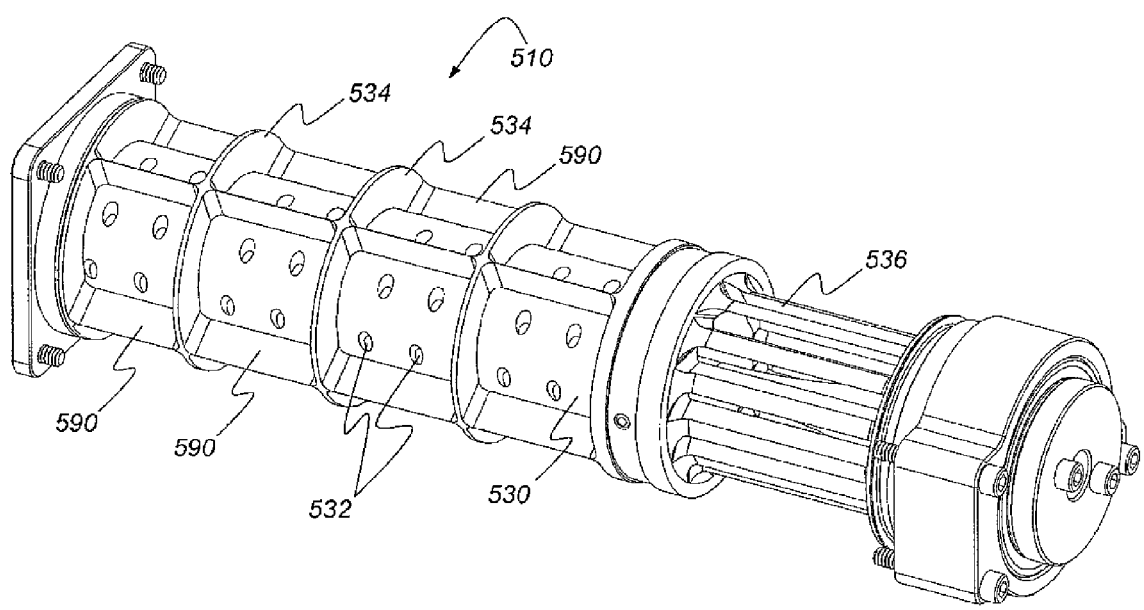
FIG. 26 is a perspective view of a pneumatic broom used in the powder aerator of FIG. 24.
Figure 27:
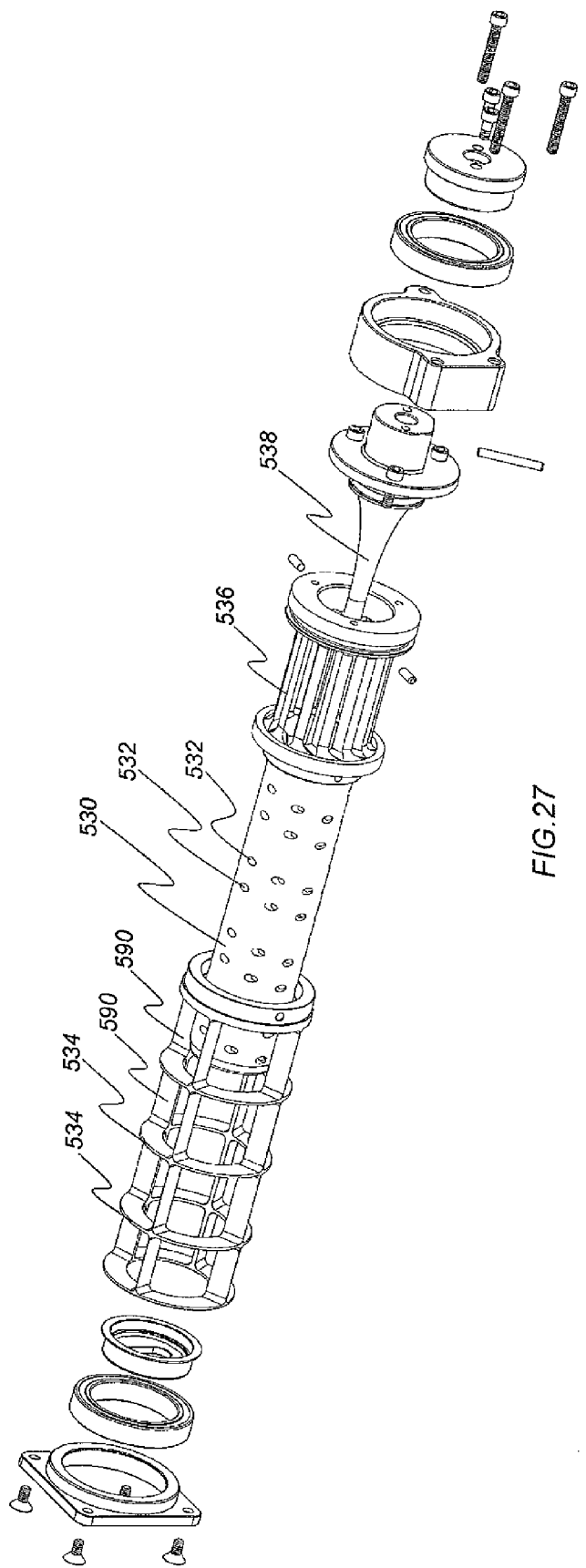
FIG. 27 is an exploded view of the pneumatic broom of FIG. 26.
Figure 29:
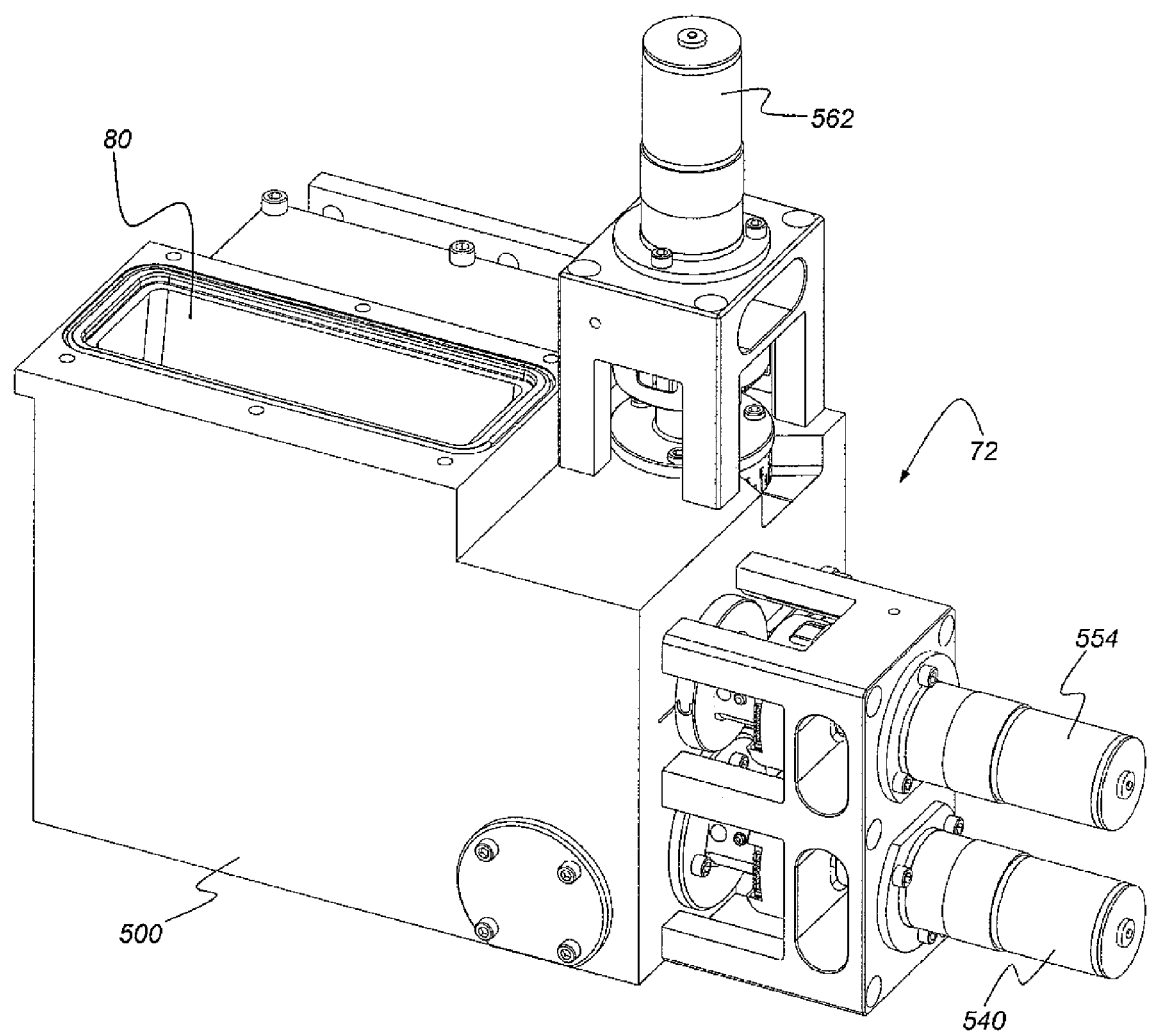
FIG. 29 is a perspective view of a second embodiment of a powder aerator.
Figure 30:
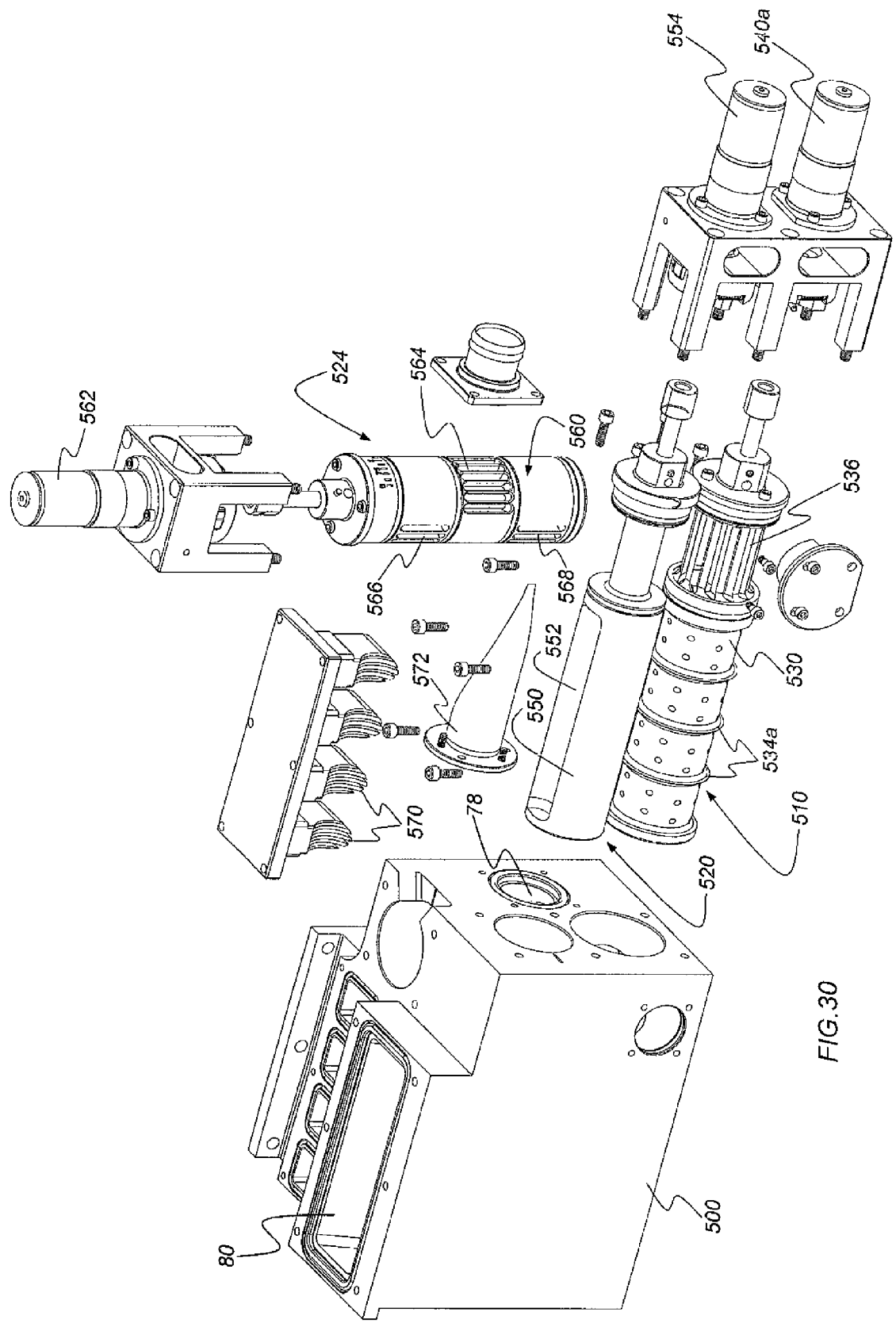
FIG. 30 is an exploded view of the powder aerator of FIG. 29.

Sensor module 34 further includes sensor backplanes 330 having connectors 332 for engaging the electrical connectors 300 of sensor assemblies 110. In the embodiment of FIGS. 20 and 21, sensor module 34 includes two backplanes 330, each having 12 connectors 332 to accommodate a total of 24 sensor assemblies 110. Each sensor backplane 330 can include control circuitry for processing signals from sensor assemblies 110 and for communicating with powder dispenser modules 54 during cartridge fill operations.

Sensor module 34 can be provided with an arrangement for cooling sensor assemblies 110, including a sensor cooling grid 340, a sensor cooling housing 342 and sensor cooling manifolds 344 and 346. Cooling air can be directed through cooling manifolds 344 so that forced air cooling is provided to the lower portion of sensor module 34 which contains electrical circuitry. In the embodiment of FIGS. 20 and 21, cooling manifolds 344 are attached to sensor tray 314 and cooling manifolds 346 are attached to cooling housing 342. With this arrangement, cooling air circulates into the sensor module 34 through cooling manifolds 344, circulates through sensor tray 314 and then downwardly into cooling housing 342, and is exhausted through cooling manifolds 346. In another cooling arrangement, cooling manifolds 346 are attached to sensor tray 314 so that cooling air is directed through sensor tray 314. Unused openings in sensor tray 314 can be closed by cover plates 348. Each of cooling manifolds 344 and 346 can include internal passages which provide uniform air flow through the sensor module. In addition, cooling manifolds 344 and 346 can include temperature sensing elements for monitoring of sensor module temperature.

A first embodiment of the weight sensor probe which provides an interface between the weight sensor cell and cartridge 20 is shown in FIG. 22. Probe 112 includes a main body 360 including a post 362 that engages the sensor cell, a head 364 and a cup 366 that accumulates dust and stray powder particles. Probe 112 further includes a dust skirt 370 that deflects dust and powder particles away from the sensor cell and pins 372 for engaging and supporting cartridge 20. The three pins 372 are equally spaced at 120 degree intervals and are designed to elastically flex and then return to their original positions. In addition, the pins are designed to buckle in an overload condition to protect the sensor cell. In the embodiment of FIG. 22, pins 72 are removable for pin height changes for different cartridge tray designs. The small cross-sectional area of the pins reduces the aerodynamic effects of thermal currents which can add bias load forces to precise microgram weight measurements.

A second embodiment of the weight sensor probe which provides an interface between the weight sensor cell and cartridge 20 is shown in FIG. 23. A probe 112a includes a main body 380, including a post 382, a head 384 and a cup 386. Cup 386 accumulates dust and stray powder particles. A dust skirt 390 deflects dust and powder particles away from the sensor cell. In the embodiment of FIG. 23, probe 112a includes pins 392 that are formed integrally with head 384. Each of pins 392 is reinforced with a radial gusset. This configuration adds structural rigidity to the vertically cantilevered lift pins. This configuration also reduces vibration and displacement at the tips of the pins, thus damping the tuning fork effect.

A first embodiment of powder aerator 72 is shown in FIGS. 24-27 and 28A-28C. A second embodiment of powder aerator 72 is shown in FIGS. 29-32. Powder aerator 72 includes a manifold block 500 which defines gas inlet 78, powder inlet 80 and powder output ports 82. As described above, gas inlet 78 is connected via tube 76 to blower assembly 70, hopper assembly 74 is mounted to powder inlet 80, and powder output ports 82 are connected to respective channels in array block 50. Powder aerator 72 can include a pneumatic broom 510 to deliver powder through riser tubes 512 to powder output ports 82 and a dump valve 520 to supply a quantity of powder from powder inlet 80 to the pneumatic broom 510. In the embodiment of FIGS. 24-27 and 28A-28C, four riser tubes 512 in manifold block 500 connect pneumatic broom 510 to powder output ports 82. Powder aerator 72 further includes a crossover valve 524 that directs transport gas received through gas inlet 78 to pneumatic broom 510 and to a bypass manifold 526 in a desired proportion. Transport gas directed through bypass manifold 526 is caused to flow through powder output ports 82 to array block 50 so as to transport powder to the powder dispenser modules 54 mounted in each channel of array block 50.

Pneumatic broom 510 includes a generally cylindrical aerator tube 530 having a hollow interior and provided with discharge nozzles 532. Aerator tube 530 is located in a bore in manifold block 500. Discharge nozzles 532 can be formed in a helical pattern on aerator tube 530 and can be approximately tangential with respect to a cylindrical surface of aerator tube 530. Dividers 534 are spaced apart along aerator tube 530 and define annular chambers 542 corresponding to respective riser tubes 512. In addition, pneumatic broom 510 includes paddles 590 affixed to dividers 534 and spaced around the annular chambers 542. The combination of discharge nozzles 532 and paddles 590 provides effective transport of a powder slurry into array block 50. A flow director 536 attached to one end of aerator tube 530 includes vanes to help to break up clumps of powder and to direct transport gas from crossover valve 524 to the hollow interior of aerator tube 530. An aerator core 538 has a contour to assist in equalizing flow of transport gas through discharge nozzles 532. A motor 540 causes aerator tube 530 and flow director 536 to rotate within manifold block 500. Motor 540 can have variable speed and rotates pneumatic broom 510 at relatively high speed, for example 3500 rpm, for transport of a powder slurry.

Dump valve 520 includes a cylindrical core 550 having diametrically opposed cavities 552. Core 550 is mounted in a bore in manifold block 500 above pneumatic broom 510 and is connected to a motor 554 for rotation about its central axis. Core 550 is positioned by motor 554 with one of the cavities 552 facing upwardly toward powder inlet 80. Powder is supplied by hopper assembly 74 through powder inlet 80 so as to fill or partially fill cavity 552. Then, core 550 is rotated by 180°, causing the powder to be dumped into the annular chambers 542 around aerator tube 530. The maximum quantity of powder supplied in a single operation of dump valve 520 is defined by the volume of cavity 552.

Crossover valve 524 includes a valve member 560 mounted in a bore in manifold block 500 and a valve actuator 562 to rotate valve member 560 about its central axis. Valve member 560 can be configured as a hollow cylinder having an inlet port 564 and outlet ports 566 and 568 at selected circumferential positions. The ports 564, 566 and 568 can be provided with vanes to block and break up powder clumps. By appropriate adjustment of valve member 560, transport gas received through gas inlet 78 can be directed in desired proportions through pneumatic broom 510 and through bypass manifold 526. In one embodiment, crossover valve 524 is adjusted during delivery of powder to array block 50. In another embodiment, crossover valve 524 has a fixed position during delivery of powder to array block 50.

Powder aerator 72 can further include flow straighteners 570 and contoured flow element 572 to assist in providing a uniform flow of transport gas through each of the powder output ports 82. Each output port 82 can be configured as a discharge cavity that matches the inlet end of one of channels 60a-60h. Bypass manifold 526 supplies transport gas to the upper part of each discharge cavity, and each riser tube 512 supplies aerated powder upwardly into the flow of transport gas in the discharge cavity, as best shown in FIG. 28A.

The powder aerator 72 serves as the interface between the hopper assembly 74, the array block 50 and the blower assembly 70. Powder aerator 72 receives fresh powder from hopper assembly 74 and receives recirculated powder from blower assembly 70. The fresh powder is received through dump valve 520, and the recirculated powder is received through gas inlet 78 and is distributed by crossover valve 524 to pneumatic broom 510 and bypass manifold 526 according to the position of crossover valve 524.

Figure 31:
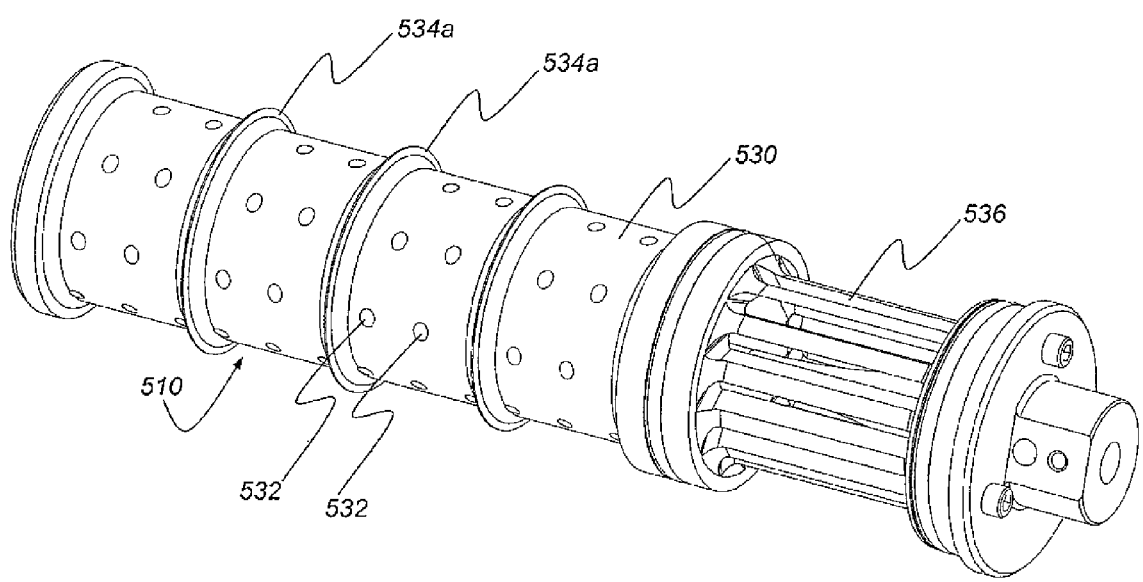
FIG. 31 is a perspective view of a pneumatic broom used in the powder aerator of FIG. 29.
Figure 32:
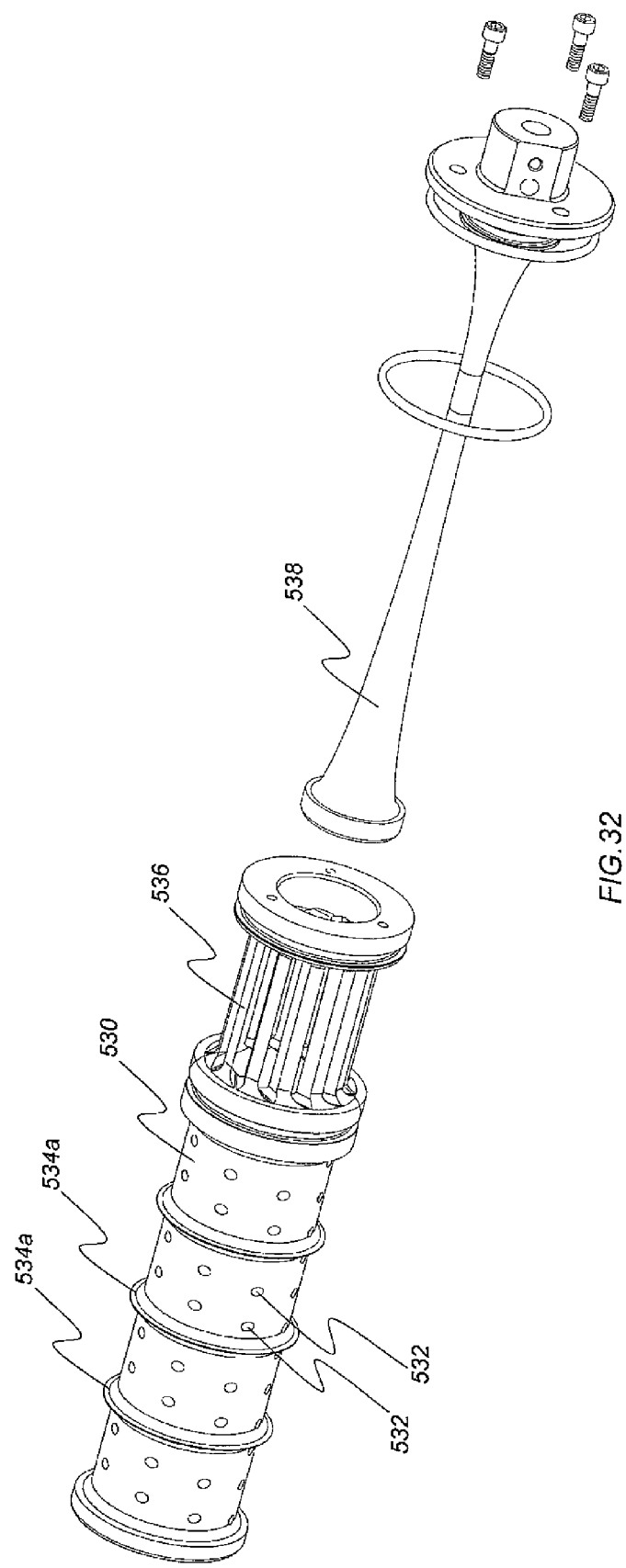
FIG. 32 is an exploded view of the pneumatic broom of FIG. 31.

The second embodiment of powder aerator 72 shown in FIGS. 29-32 is similar to the powder aerator shown in FIGS. 24-27 and 28A-28C, except as follows. As best shown in FIGS. 31 and 32, pneumatic broom 510 similarly includes dividers 534a which are spaced apart along aerator tube 530 and define annular chambers corresponding to respective riser tubes in manifold block 500. The pneumatic broom 510 in the second embodiment does not include paddles spaced around the annular chambers. In addition, the powder aerator of FIGS. 29-32 is provided with a motor 540a which rotates pneumatic broom 510 at relatively low speed, for example 1 to 10 rpm, for transport of a powder aerosol.

Components of powder aerator 72 include pneumatic broom 510, dump valve 520 and crossover valve 524. In addition, bypass manifold 526, flow element 572 and flow straighteners 570 are used to equalize gas flow within each channel of array block 50. The pneumatic broom 510, the crossover valve 524 and the dump valve 520 are motor operated and are controlled by a system control computer.

The crossover valve 524 channels the incoming transport gas in two directions: into the bypass manifold 526 and into the pneumatic broom 510. The rotary cylindrical valve has longitudinal slots to channel flows while maintaining a relatively constant hydraulic loss, thus promoting a stable discharge.

The pneumatic broom 510 has several elements. The intake channeling vanes on flow director 536 change the direction of the incoming transport gas in an efficient, low-loss manner, while creating an impactor system that blocks and obliterates stray agglomerates before they clog downstream discharge nozzles 532. Tangential gas discharge nozzles 532, preferably having a double helix configuration, are arranged along the length of aerator tube 530. The pneumatic broom 510 is divided into four annular chambers 542. The drug powder that is supplied from the dump valve 520 is aerated in annular chambers 542. The tangential discharge nozzles 532 effectively aerate and sweep the drug powder from the chamber walls. The crossover valve 524 allows the two transport gas streams to be controlled inversely, i.e. one can be increased while the other is reduced. This control function allows the drug powder to be tumbled within annular chambers 542 to form the natural average agglomerate size. Then the transport gas flow can be steadily increased to transport the aerated powder slurry up riser tubes 512 and into the channels of array block 50, which fills the array block channels in a controlled particle deposition process. This transport process takes advantage of the undesirable powder morphology of naturally agglomerating powders and coerces them into an agglomerate state that allows them to be effectively pneumatically transported.

The riser tubes 512 intersect the discharge cavity of each output port 82. At this juncture, the horizontal transport gas deflects the uprising emerging powder slurry and downdrafts it into the channels of array block 50. This process creates the conditions for the controlled particle deposition process.

The powder aerator 72 receives a known quantity of powder from the hopper assembly 74. The powder is collected in the dump valve 520. The dump valve 520 isolates the transport gas from the hopper assembly 74. In addition, the dump valve 520 transfers the powder through this gas interlock and into the pneumatic broom 510. The dump valve 520 can have an optional capability of making a coarse weight measurement of the initial drug powder deposited into the system from hopper assembly 74. The weight measurement can be performed by a load cell positioned in cavity 552 of dump valve 520. The coarse weight measurement can be used as a feedback control to hopper assembly 74 as well as additional data to monitor bulk powder dispensing rates.

The pneumatic broom 510 fluidizes, disperses and entrains drug powders in a transport gas in annular chambers 542. The chambers 542 are supplied with transport gas by multiple tangential discharge nozzles 532 in a helical configuration. The helical configuration can include one or more helices, such as a double helix. In addition, the pneumatic broom 510 includes gas channeling vanes in flow director 536 that efficiently direct gas into the aerator tube 530 and act as impactors to reduce large agglomerates before they reach the discharge nozzles 532.

The crossover valve 524 divides the incoming transport gas between pneumatic broom 510 and bypass manifold 526. The crossover valve 524 is configured to inhibit any eddy vortex flow conditions within a compact design. The valve has slot flow ports to optimize and control the flow of gas. The crossover valve is used to control the transport of the aerated, agglomerated powder slurry into the channels 60a-60h of array block 50.

Contoured flow element 572 is placed within bypass manifold 526 to enhance the conduit flow geometry. As the bypass gas flows from the crossover valve 524 and into bypass manifold 526, it is preferable to create isokinetic flow patterns to inhibit the formation of tripped flow or eddy flow stagnation zone conditions.

Flow straighteners 570 include vanes which regulate gas flow by restricting and straightening gas flow as it discharges into the discharge cavity 580. By altering the spacing between vanes, it is possible to achieve uniform flow rates through each of the channels 60a-60h of array block 50.

Figure 33:
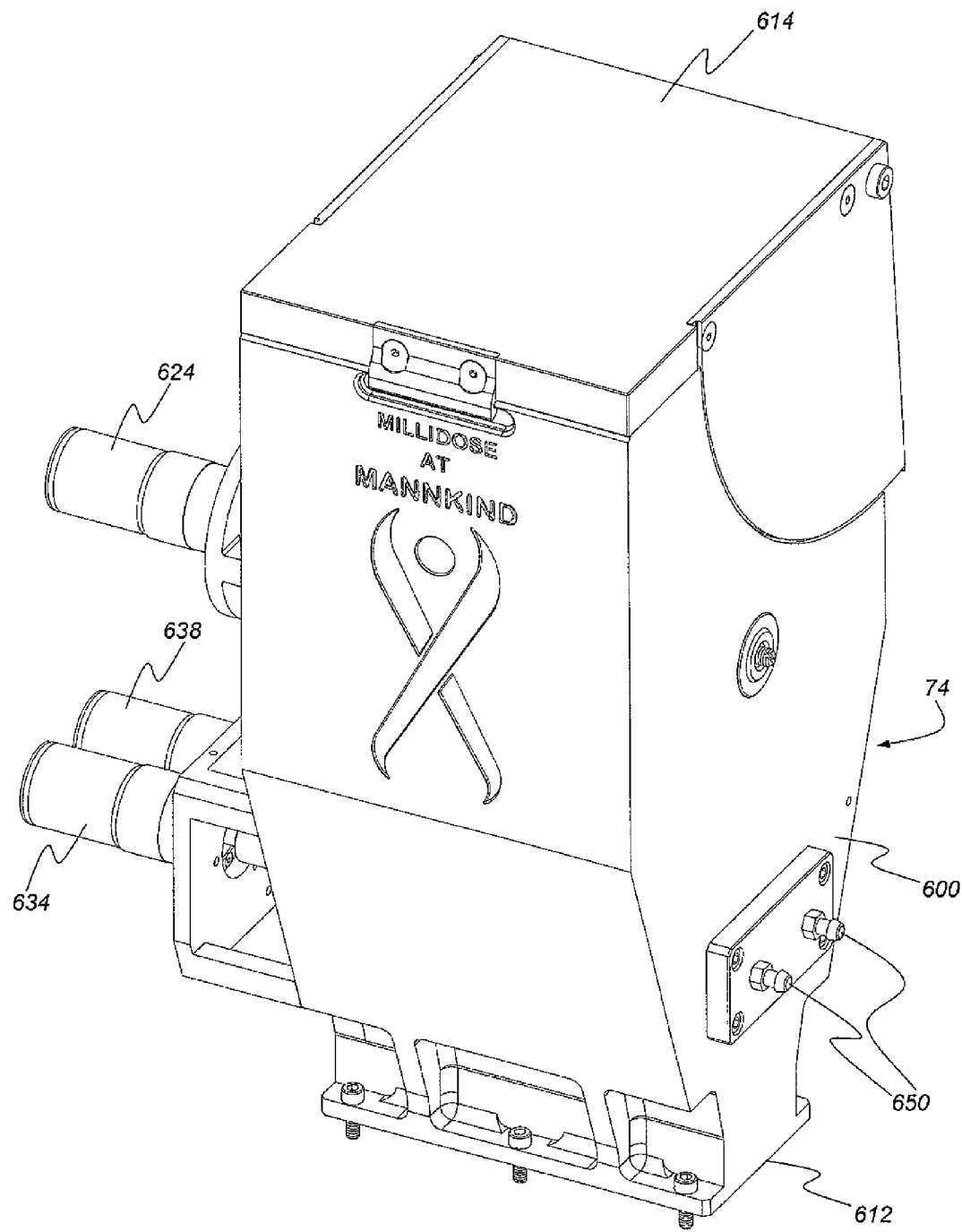
FIG. 33 is a perspective view of a first embodiment of a hopper assembly.
Figure 34:
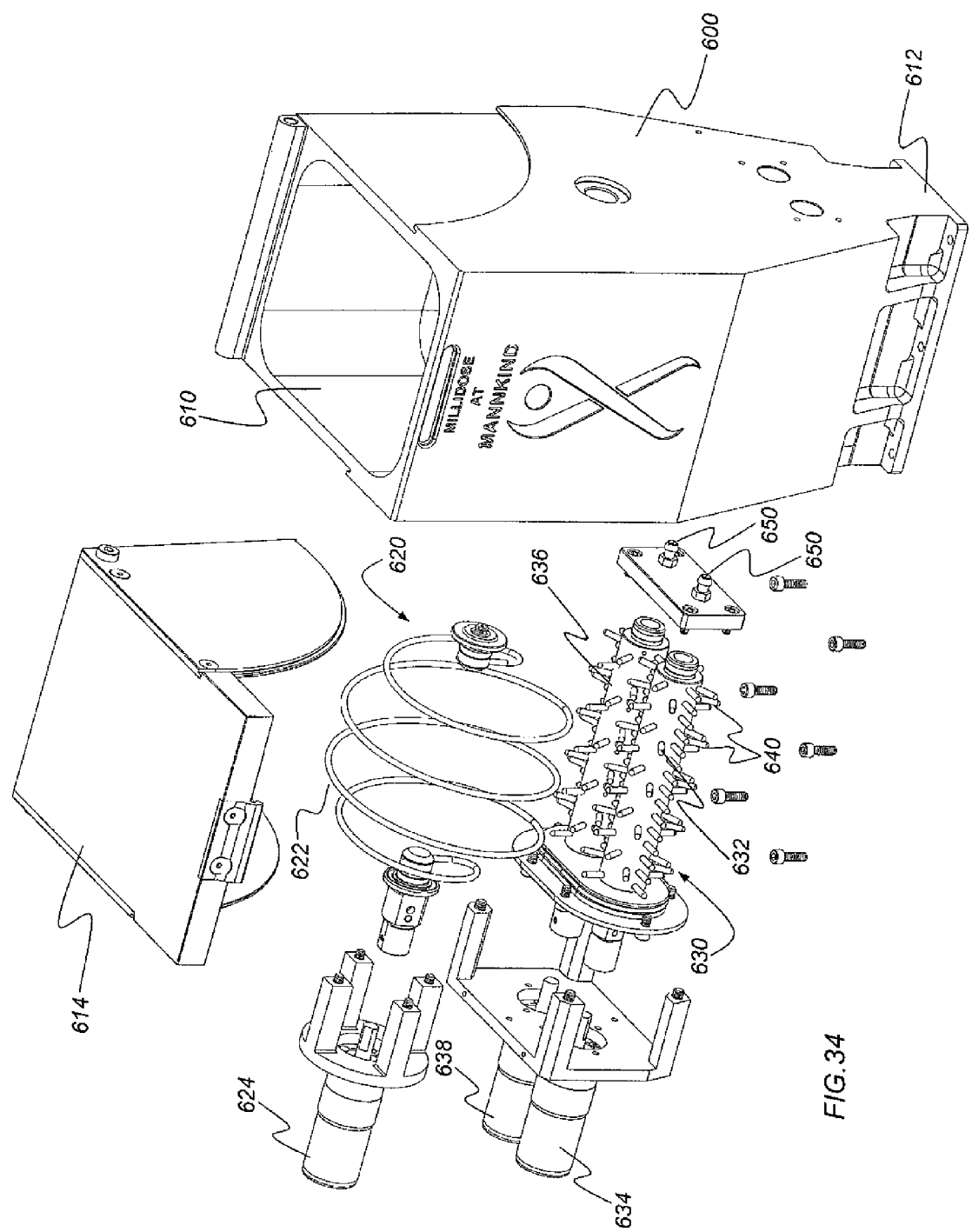
FIG. 34 is an exploded view of the hopper assembly of FIG. 33.
Figure 35:
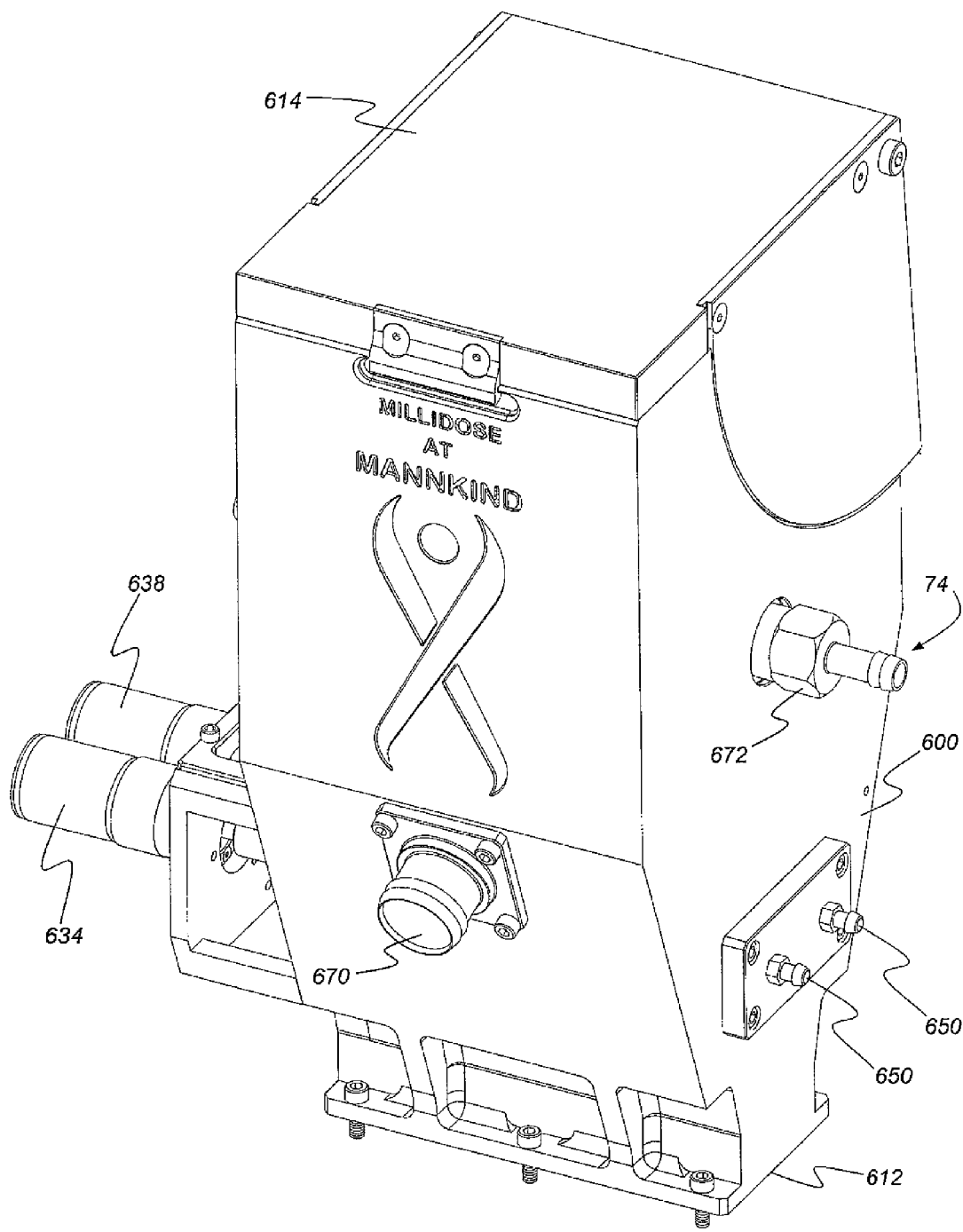
FIG. 35 is a perspective view of a second embodiment of a hopper assembly.
Figure 36:
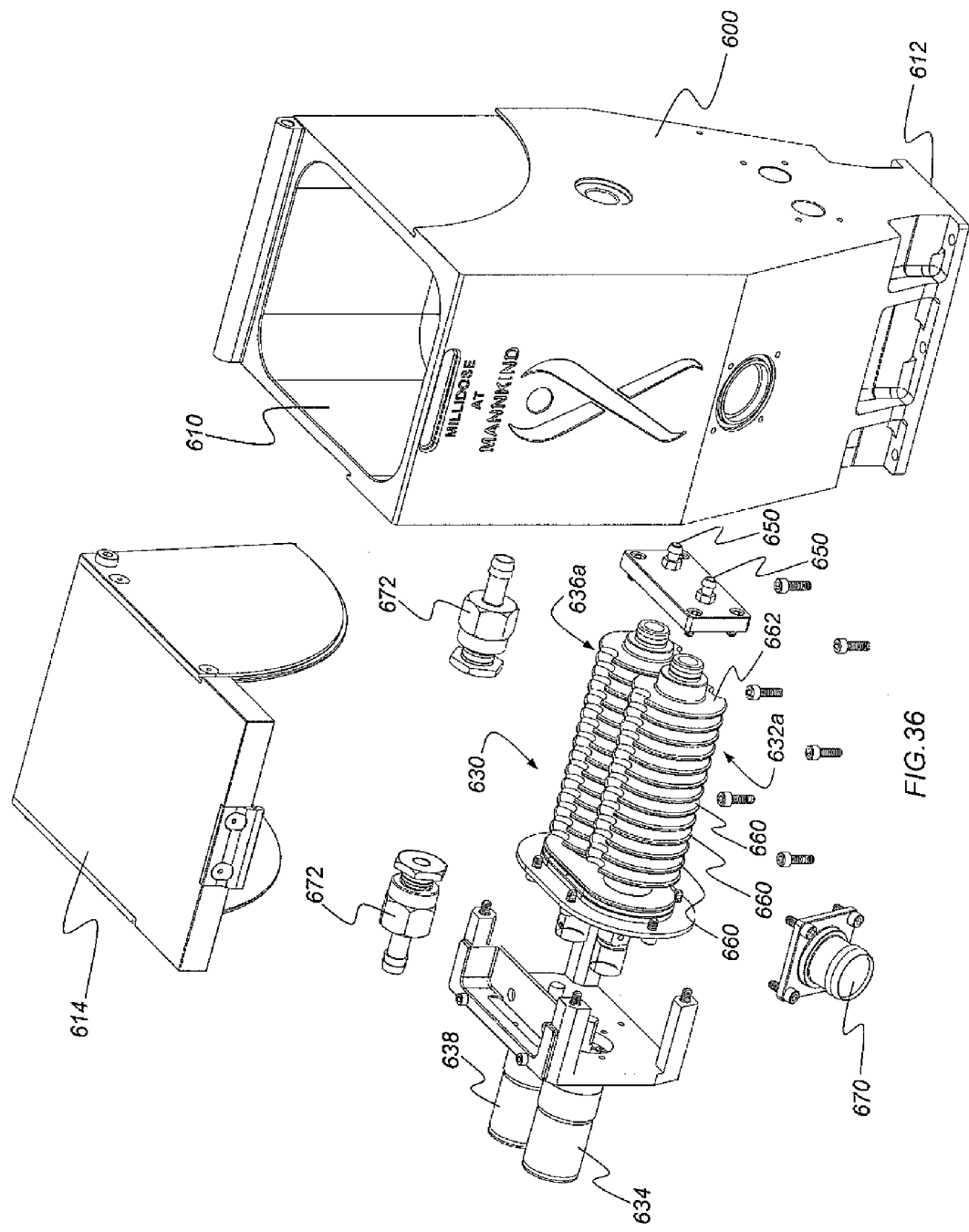
FIG. 36 is an exploded view of the hopper assembly of FIG. 35.
Figure 37:
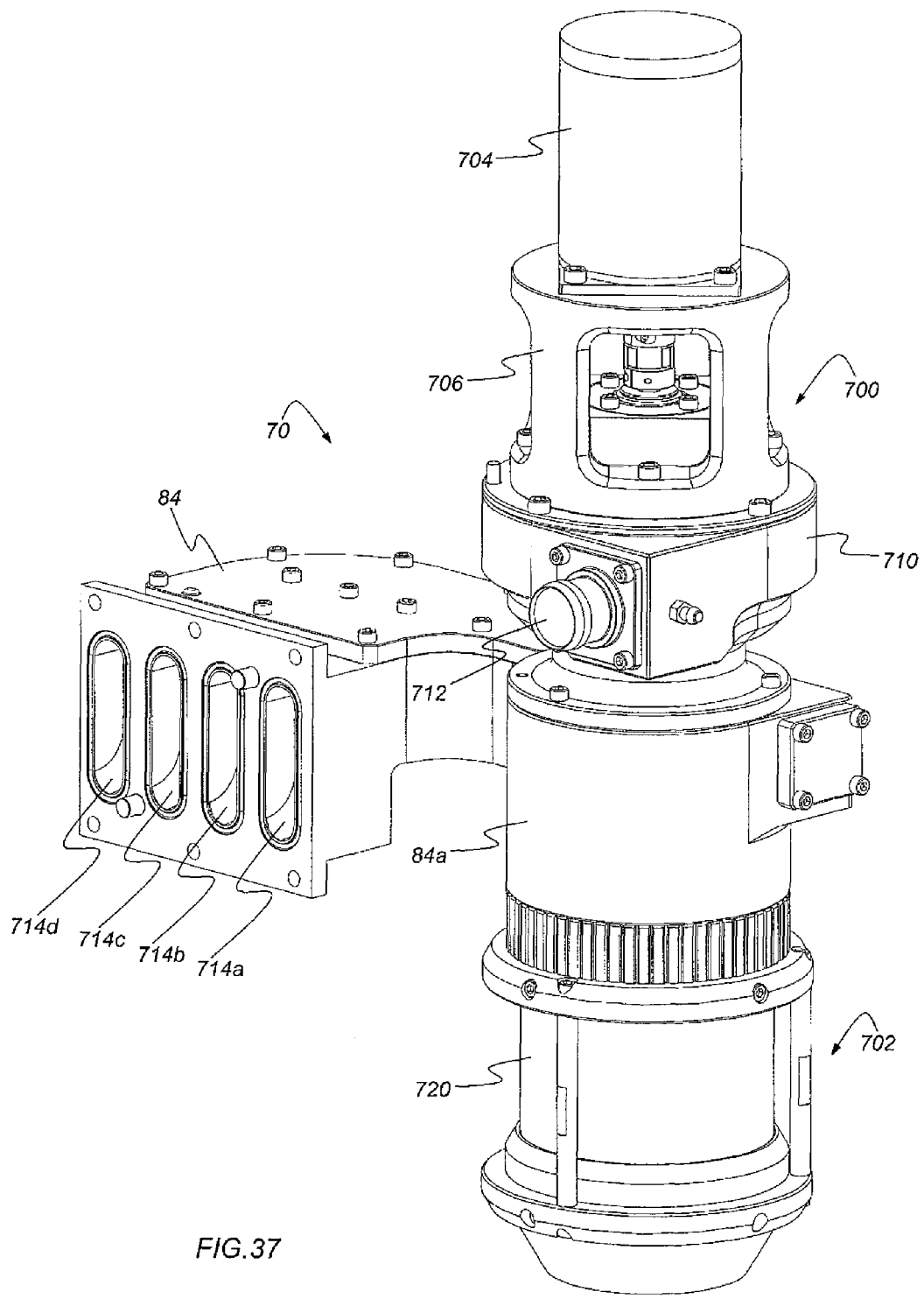
FIG. 37 is a perspective view of a first embodiment of a blower assembly.
Figure 38:
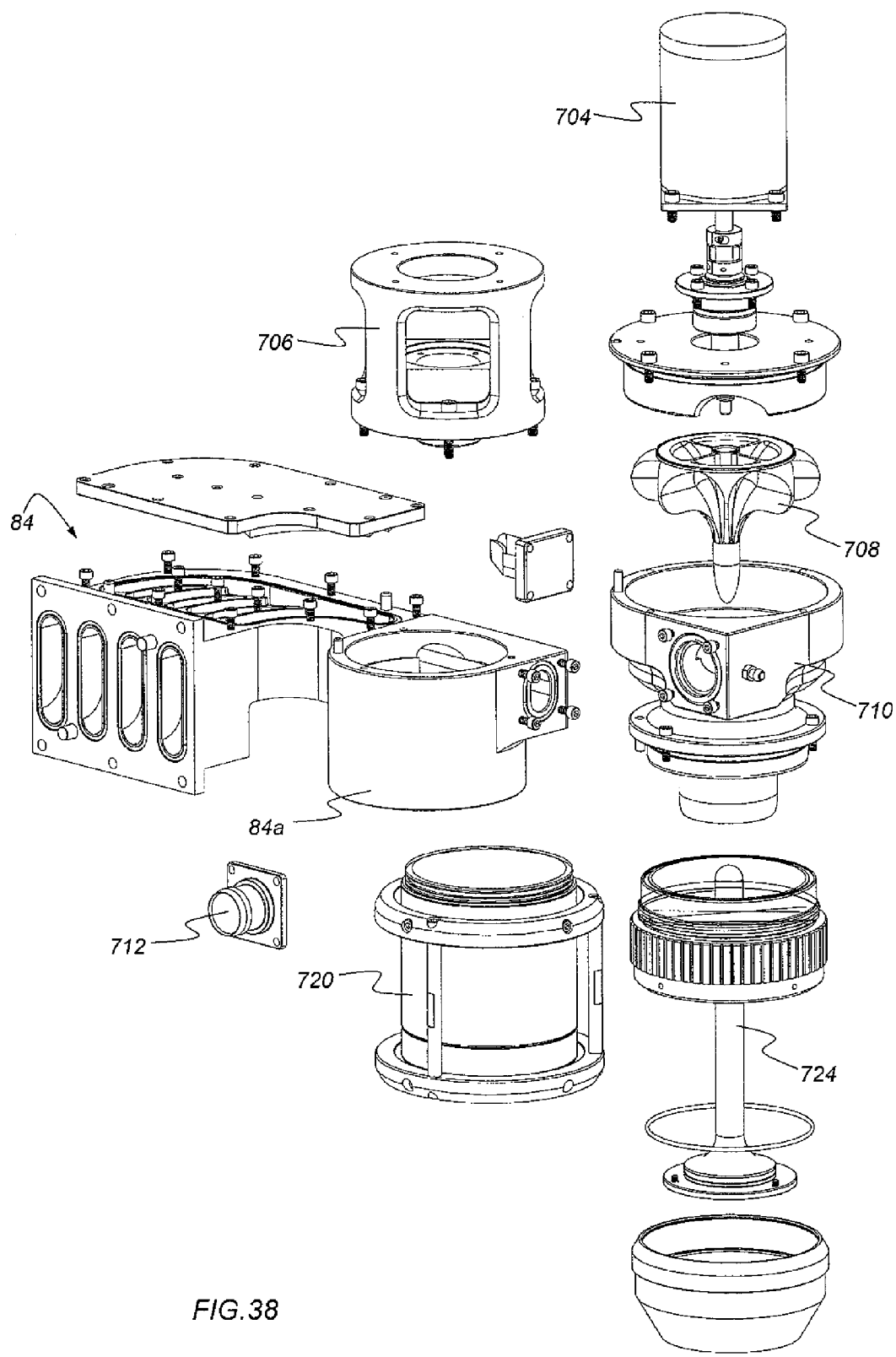
FIG. 38 is an exploded view of the blower assembly of FIG. 37.
Figure 39:
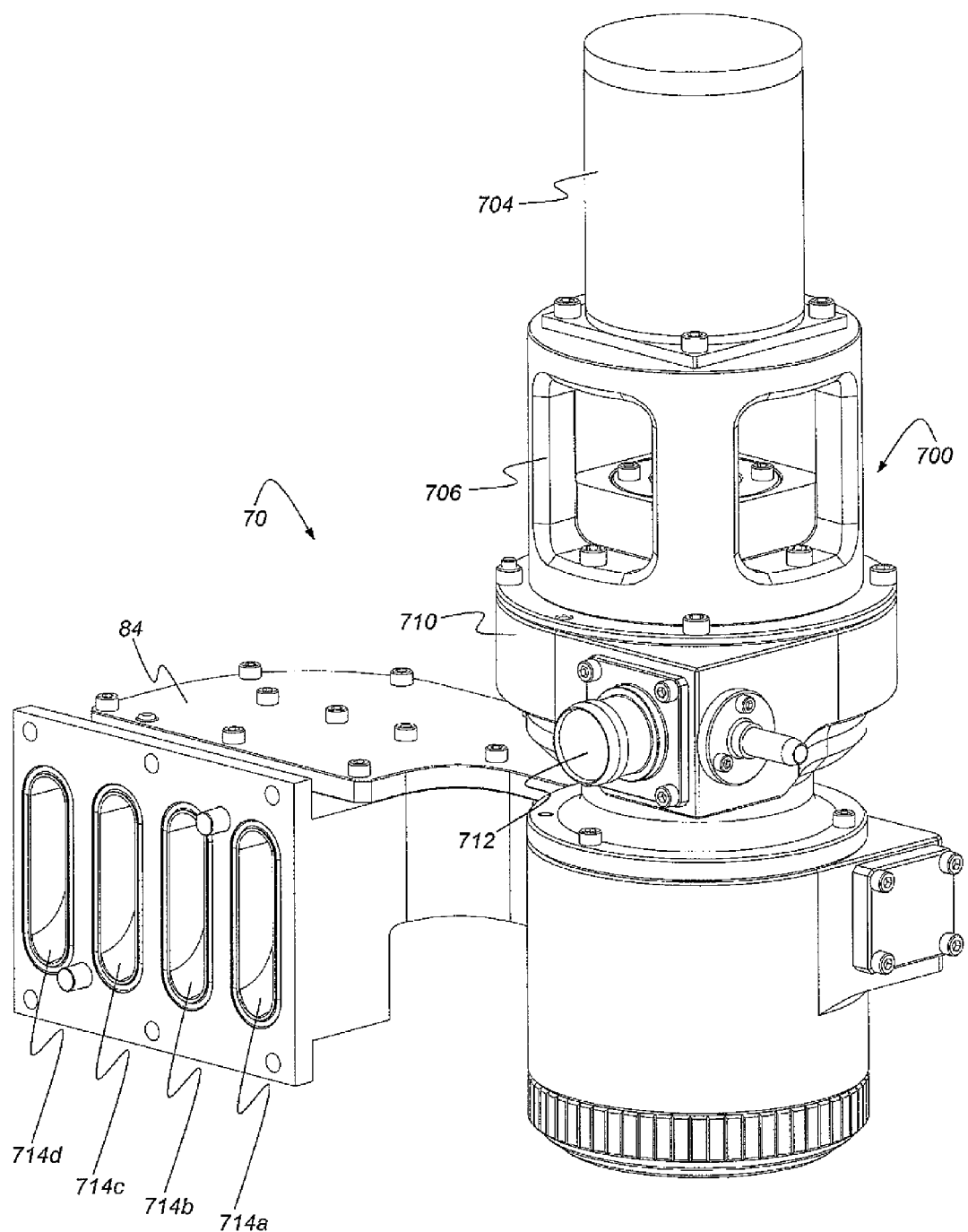
FIG. 39 is a perspective view of a second embodiment of a blower assembly.
Figure 40:
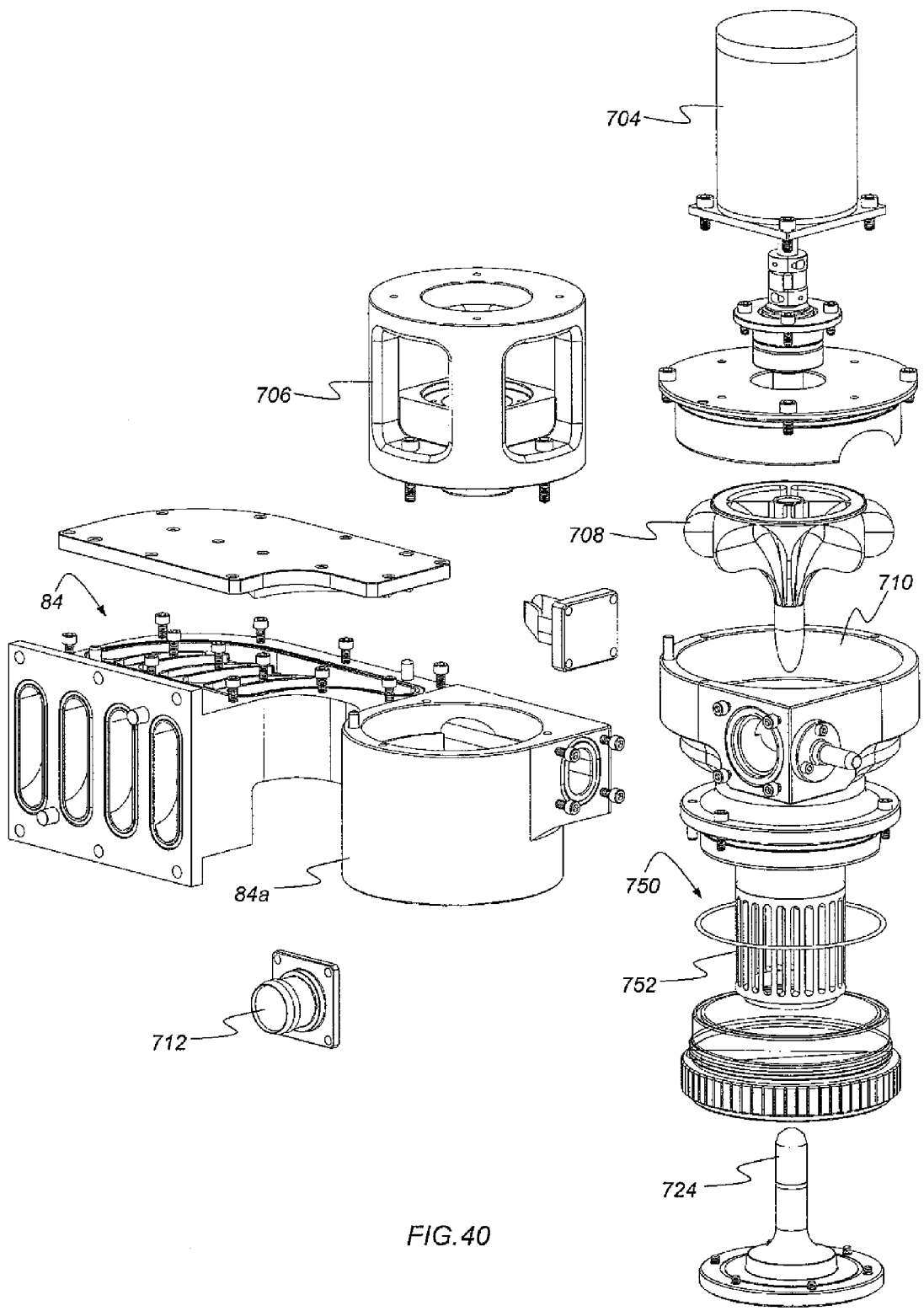
FIG. 40 is an exploded view of the blower assembly of FIG. 39.

A first embodiment of hopper assembly 74 is shown in FIGS. 33 and 34. As shown in FIGS. 33 and 34, hopper assembly 74 includes a hopper body 600, which defines a powder reservoir 610, for holding a supply of powder, and a powder outlet 612, which engages the powder inlet 80 of powder aerator 72. The hopper assembly 74 can be provided with a hinged cover 614 and a flow assist mechanism 620. Flow assist mechanism 620 can include helical coil 622 located within powder reservoir 610 and a motor 624 to rotate coil 622. Hopper assembly 74 can further include a granulator 630 in a lower portion of powder reservoir 610. Granulator 630 can include a first agglomerator roller 632 coupled to a first motor 634 and a second agglomerator roller 636 coupled to a second motor 638. Each of agglomerator rollers 632 and 636 is provided with a plurality of pins 640 extending radially from the respective roller. In one embodiment, the locations of pins 640 on each of rollers 632 and 636 define one or more helical patterns. In addition, agglomerator rollers 632 and 636 can have hollow centers and can be provided with air holes that connect to the hollow centers. Gas connectors 650 at the ends of rollers 632 and 636 can be connected to a source of pressurized air. Air flow through the holes in rollers 632 and 636 assists in aerating the powder being supplied to the system.

In operation, after the powder reservoir 610 has been filled to the level of the hopper level sensor, first and second agglomerator rollers 632 and 636 rotate, causing powder agglomeration and discharge of the agglomerated powder through powder outlet 612 to powder aerator 72. In a preferred embodiment, agglomerator rollers 632 and 636 rotate in opposite directions, with the tops of rollers 632 and 636 rotating toward each other. However, operation is not limited in this regard. Agglomerator rollers 632 and 636 can be rotated continuously, with reciprocating motion or with a combination of continuous and reciprocating motion, and can be reversed. The rotation protocol depends on powder morphology. Granulator 630 produces powder agglomerates in a desired size range to enhance powder flow from hopper assembly 74 into powder aerator 72.

A second embodiment of hopper assembly 74 is shown in FIGS. 35 and 36. The hopper assembly of FIGS. 35 and 36 is similar to the hopper assembly of FIGS. 33 and 34, except as follows. In the hopper assembly of FIGS. 35 and 36, the flow assist mechanism is not utilized. In addition, granulator 630 is implemented with agglomerator rollers 632*a* and 636*a*, each of which is provided with a plurality of spaced-apart disks 660 mounted to shafts of the respective rollers. The disks 660 can be provided with notches 662 which assist in moving the powder downwardly through reservoir 610. The disks of roller 632*a* may be intermeshed with the disks of roller 636*a*.

Bulk powder can be introduced into powder reservoir 610 through the opening at the top of hopper body 600 with cover 614 open. In the second embodiment of hopper assembly 74 shown in FIGS. 35 and 36, a powder slurry can be introduced into powder reservoir 610 through a fitting 670 on an angled portion of hopper body 600. Fittings 672 mounted in the upper portion of hopper body 600 provide an exhaust for transport gas introduced through fitting 670 with the powder slurry.

The hopper assembly 74 is the main powder reservoir and is the stage at which powder is introduced into the powder delivery system 32. The hopper assembly 74 is designed for highly cohesive powders such as Technosphere microparticles. The granulator 630 produces powder agglomerates in a finite size range. This preconditioning enhances the powder aeration and entrainment characteristics by creating a more uniform polysize agglomerated powder blend. In addition, the process of powder granulation aerates and mixes the powder that is normally compressed by gravity when stacked inside powder reservoir 610.

In the mid-region of powder reservoir 610, flow assist mechanism 620 forces the powder to avalanche downward or fall toward granulator 630. The need for flow assist mechanism 620 is contingent on the level of powder cohesivity. The effect can become more apparent when the drug concentration is increased, such as an increase in protein content that makes the particles more viscous or sticky.

A first embodiment of blower assembly 70 is shown in FIGS. 37 and 38. As shown in FIGS. 37 and 38, components of blower assembly 70 can include a variable speed blower 700 and a cyclone separator 702. Blower 700 includes a blower motor 704 supported by a motor mount 706 and an impeller 708 mounted in a blower housing 710. Blower housing 710 has a discharge port 712 for supplying transport gas through tube 76 to powder aerator 72. Tuned suction manifold 84 is mounted to the lower end of blower housing 710. As described above, transport gas is recirculated from array block 50 to blower assembly 70. Suction manifold 84 includes inlet ports 714*a*, 714*b*, 714*c* and 714*d*, which are connected to respective channels in array block 50. Cyclone separator 702 includes a cylindrical housing section 84*a* of suction manifold 84, which is mounted to blower housing 710, and a cyclone vessel 720 mounted below suction manifold 84. Cyclone separator 702, which serves as a gas-particle separation device, receives powder agglomerates that pass through array block 50 without being delivered to powder dispenser modules 54.

A porous induction rod 724 is located within the center of cyclone vessel 720 and is connected to a gas conditioning system 730, as shown in FIG. 41 and described below. The gas conditioning system 730 supplies conditioned gas through porous induction rod 724 to establish a precisely-controlled relative humidity within the powder delivery system 32.

In other embodiments, conditioned gas can be pulsed by a valve into the closed loop system from a source such as a pure water vapor source or a steam source. The loop relative humidity is controlled by sensing the gas in a small bypass loop that is connected to a sensing chamber for temperature, pressure and relative humidity sensors. The bypass loop can be located between the blower discharge port 712 and the tuned suction manifold 84. In further embodiments, the pulsed valve system can be configured as a dual port system that allows an amount of conditioned gas to be pulsed into the closed loop system, and a compensating or equal amount of transport gas to be discharged out of the closed loop system.

A second embodiment of blower assembly 70 is shown in FIGS. 39 and 40. The blower assembly of FIGS. 39 and 40 is similar to the blower assembly of FIGS. 38 and 39, except as follows. In the blower assembly of FIGS. 39 and 40, the cyclone separator is not utilized. Instead, a vane separator 750 is positioned in the housing section 84*a* of suction manifold 84 on the suction side of the blower. The vane separator 750, which serves as a gas-particle separation device, has a cylindrical configuration of vanes 752 separated by vertical slots for separation of heavy particles from the transport gas. A tangential flow of transport gas outside vane separator 750 removes heavier particles, while lighter particles and the transport gas move to the interior of vane separator 750 and then to impeller 708. The induction rod 724 is positioned in the interior of vane separator 750 in the second embodiment of blower assembly 70.

The powder transport system 32 in the present embodiment is configured as a closed loop system where excess particles and agglomerates are extracted from the recirculating gas loop to inhibit particle clogging of the powder aerator discharge nozzles 532. This is accomplished by the cyclone separator 702, the vane separator, or any other gas-particle separation device.

The powder transport system 32 is configured with a secondary process gas loop between the gas-particle separation device and the discharge port 712 of blower 700. This control loop can introduce secondary conditioned gas to regulate environmental parameters of the primary recirculating transport gas, such as temperature, pressure, relative humidity, electrostatic levels, ion charge concentrations, gas element mixtures, aerosol fine particle seeding, etc.

The closed-loop powder delivery system 32 is driven by blower assembly 70, which is a hybrid of an impulse impeller blower coupled to the outlet side of a cyclone separator or other gas-particle separation device. The blower assembly 70 forms the transport gas prime mover and includes a self-cleaning powder agglomerate filtration system. In addition, the transport gas is conditioned by the secondary process loop which controls the gas properties of the primary process loop. These two loops are nested together within the blower assembly 70. The blower assembly 70 includes impeller 708 which has a paddle wheel configuration with scroll curves between each impeller blade. The paddle wheel impeller configuration produces dynamic shock waves in the form of pressure pulses down tube 76 and into powder aerator 72. These shock waves assist in the breakup, aeration and dispersion of compressed drug powder.

The blower has a variable speed capability and is driven by blower motor 704. When the motor 704 is operated beyond normal operating speeds, the transport gas acts as a recirculating gas scrubber that assists in removing residual powder from the closed loop conduit channels.

Figure 41:
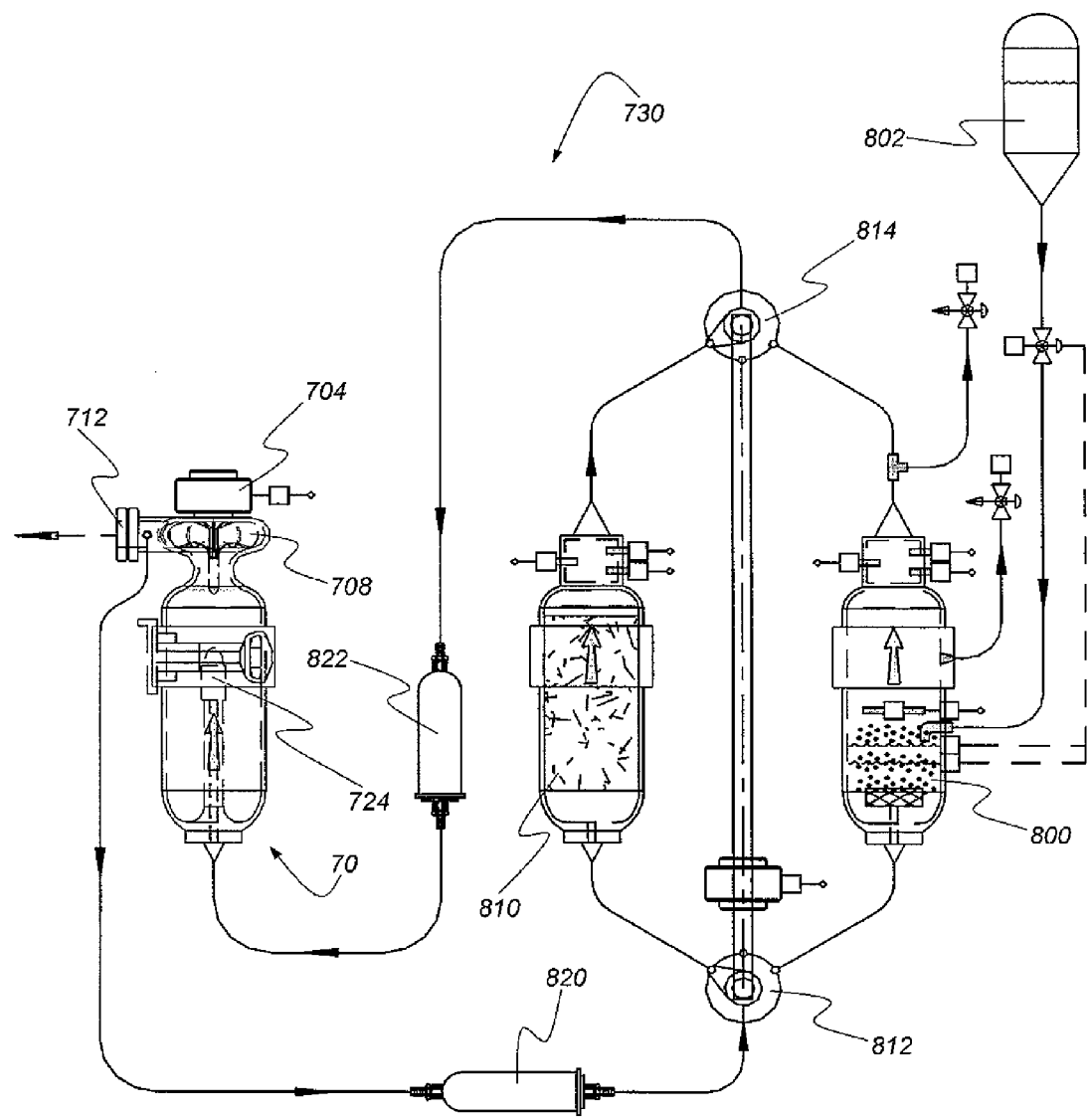
FIG. 41 is a schematic diagram of a gas conditioning system.

A schematic block diagram of gas conditioning system 730 is shown in FIG. 41. Gas conditioning system 730 includes a secondary gas treatment loop that is distinct from the closed loop system for recirculation of transport gas and delivery of powder to array block 50. A portion of the recirculating transport gas is diverted to the secondary gas treatment loop near discharge port 712 of blower assembly 70. The conditioned gas is reintroduced into the recirculating transport gas loop through induction rod 724. The gas conditioning system 730 includes a vapor generator 800, coupled to a water supply 802, for rapidly generating water vapor, a desiccator 810 for reducing the relative humidity of the transport gas, valves 812 and 814 for selecting vapor generator 800 or desiccator 810, and filters 820 and 822.

The relative humidity of the transport gas can be measured by a sensor, such as the sensor chamber described below, positioned to sense the transport gas. When the relative humidity of the transport gas is to be increased, valves 812 and 814 are connected to vapor generator 800. Vapor generator 800 includes a bubble generator and flash evaporator heaters for rapidly producing water vapor. The diverted transport gas in the secondary loop passes through filter 820, vapor generator 800 and filter 822, thus returning gas with increased relative humidity to induction rod 724. When the relative humidity of the transport gas is to be decreased, valves 812 and 814 are connected to desiccator 810. The diverted transport gas in the secondary loop passes through filter 820, desiccator 810 and filter 822, thus returning gas with reduced relative humidity to induction rod 724.

Transport gas conditioning is achieved by introducing a process treatment gas into the inner core of the cyclone vessel 720. The conditioned gas is introduced into the vessel at the end of induction rod 724. Induction rod 724 is fabricated from a sintered metal or a porous plastic polymer which allows the conditioned gas to evenly mix into the recirculating transport gas without producing water droplets or slug flow conditions. The process treatment gas loop is balanced by a return takeoff branch line on the discharge side of blower 700. A portion of the cyclone separator 720 or housing section 84a can be fabricated from glass for visual inspection of collected drug powders. If the collected powder is salvageable, it can be reintroduced into the hopper assembly 74, or it can be discarded.

The control of the humidification of powder during operation of the powder transport system is complicated by the fact that the exposed surface area of the powder changes during the transport process. The powder is initially prepared in the agglomerated state. However, as the powder breaks down and disperses during gas transport, its exposed surface area increases significantly, in turn causing rapid moisture uptake. In order for a humidification process to keep up with and control this rapid dehydration of the transport gas loop, the gas treatment system must be capable of rapid forced hydration.

The cyclone separator 702 has an integral tuned intake manifold that merges into the cyclone body with minimal hydraulic loss. The blower assembly has a large flow range and can serve as a system powder scrubber. The blower is equipped with a paddle wheel-like impeller having scrolled, curved surfaces between each paddle to efficiently transport fine powder aerosols and to inhibit powder reagglomeration and caking. The paddle wheel-like impeller directs dynamic shock waves into the powder aerator 72 to assist in the fluidization of drug powders. The blower assembly 70 includes a gas conditioning system where a secondary gas treatment loop is introduced into the unit through induction rod 724 within the cyclone vessel. The gas conditioning system can control many gas parameters, such as relative humidity and temperature, ion static control, fine particle seeding, trace element seeding, gas catalyst activation, gas/light sterilization control, etc.

Figure 42:
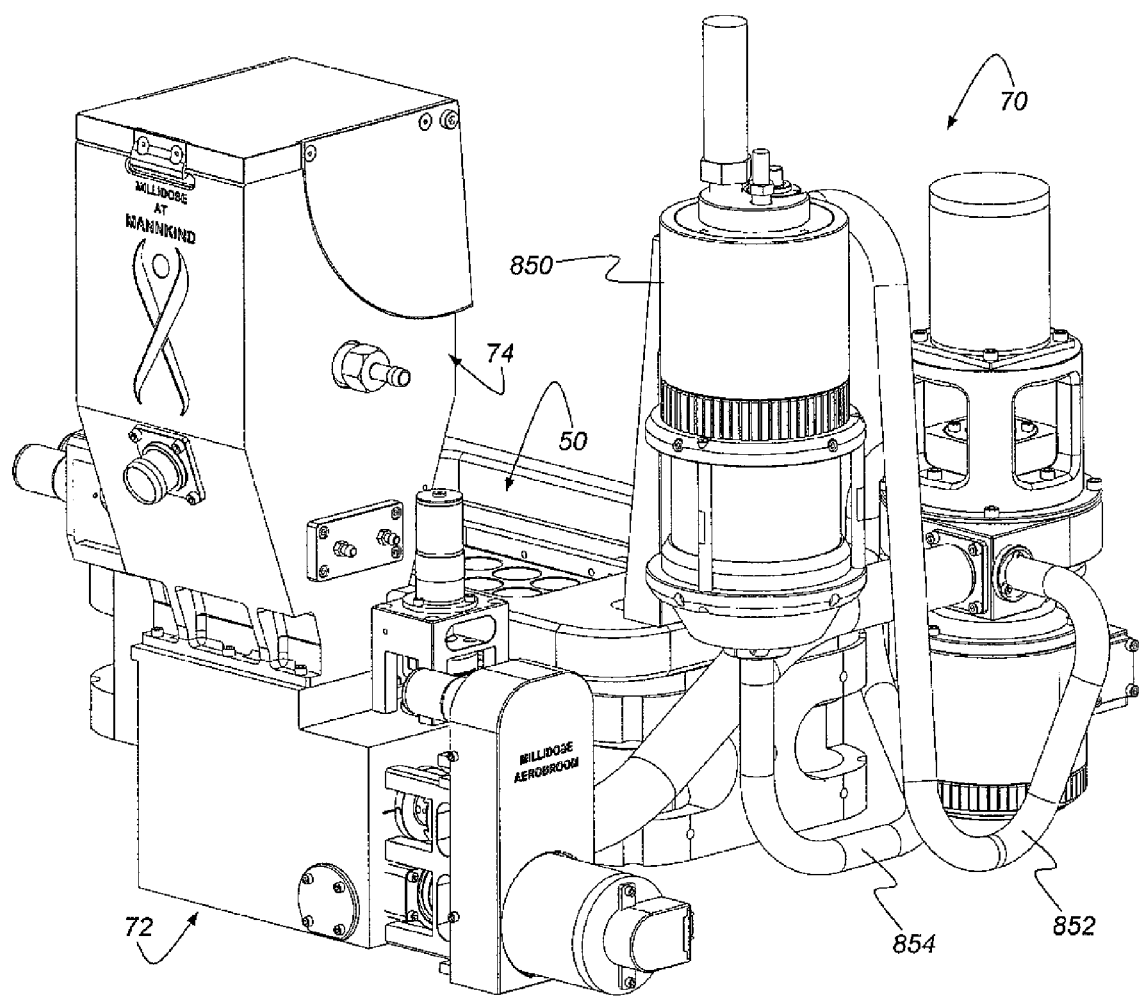
FIG. 42 is a perspective view of a powder delivery system incorporating a sensor chamber.
Figure 43:
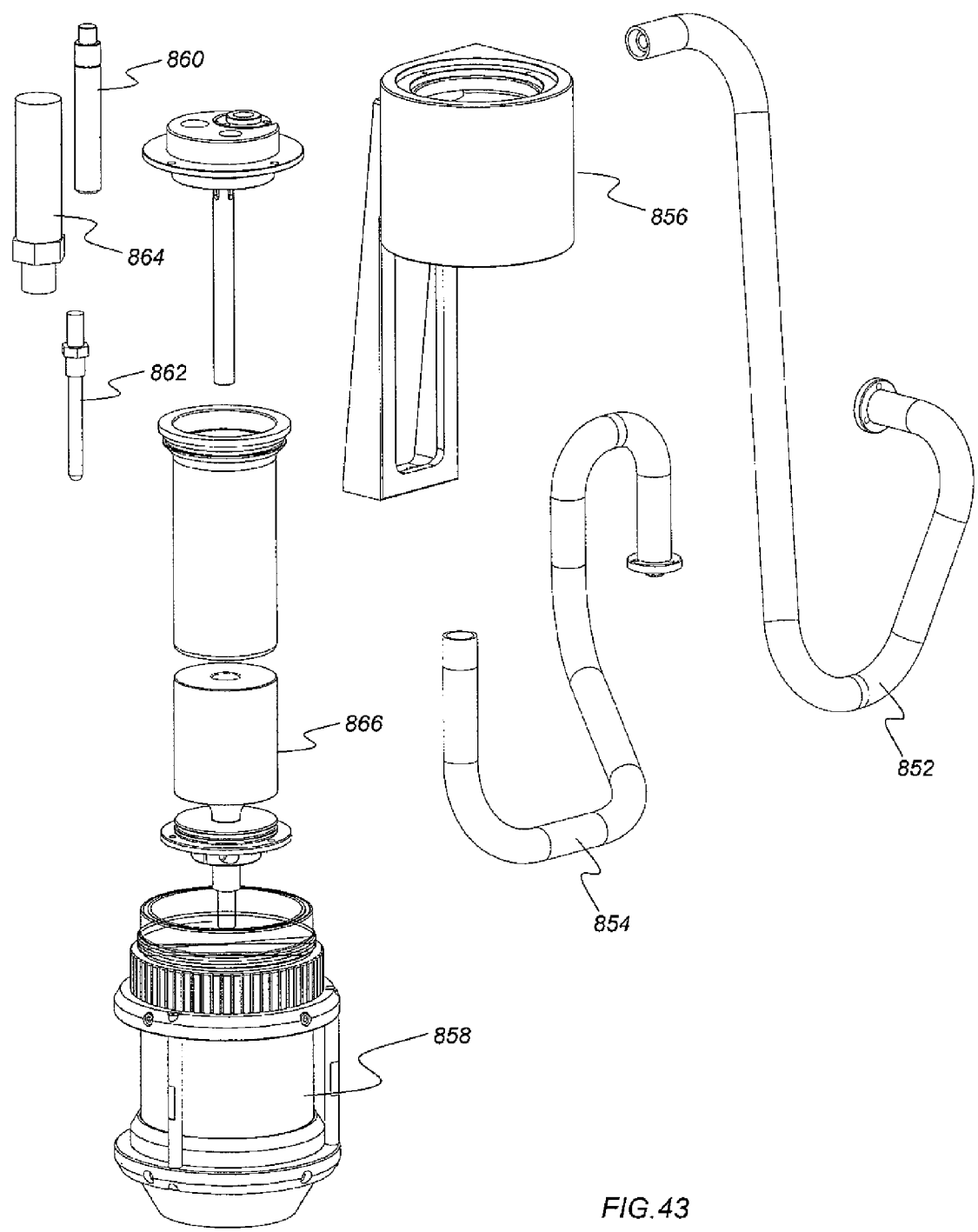
FIG. 43 is an exploded view of the sensor chamber shown in FIG. 42.

An embodiment of a sensor chamber 850 for sensing the condition of the transport gas in the powder transport system is shown in FIGS. 42 and 43. Transport gas, with powder removed to the extent that is practical, is circulated through sensor chamber 850 in parallel with the powder transport system. The sensor chamber 850 contains sensors for sensing transport gas parameters, such as relative humidity and temperature, to permit transport gas conditioning as described above.

Sensor chamber 850 receives transport gas through an inlet tube 852 connected to blower housing 710 of blower assembly 70 and outputs transport gas through an outlet tube 854 connected to suction manifold 84. Each of inlet tube 852 and outlet tube 854 is insulated and may be configured as inner and outer tubes separated by spaced-apart rings. Inlet tube 852 may be connected to blower housing 710 perpendicular to the direction of transport gas flow to limit intake of powder into sensor chamber 850.

As shown in FIG. 43, sensor chamber 850 may include an upper housing 856 and a lower housing 858 having an interior volume that is roughly equivalent to the interior volume of array block 50. The sensor chamber 850 may include a relative humidity sensor 860, a temperature sensor 862 and a pressure sensor 864. In the embodiment of FIGS. 42 and 43, relative humidity sensor 860 includes a temperature sensor, which permits cross-checking against the temperature values sensed by temperature sensor 862. A discrepancy in readings can indicate that the sensors are caked with powder and therefore not providing accurate sensing. An air baffle 866 is mounted in lower housing 858. The sensor chamber 850 provides accurate sensing of the conditions of the transport gas in the powder transport system.

Figure 44:
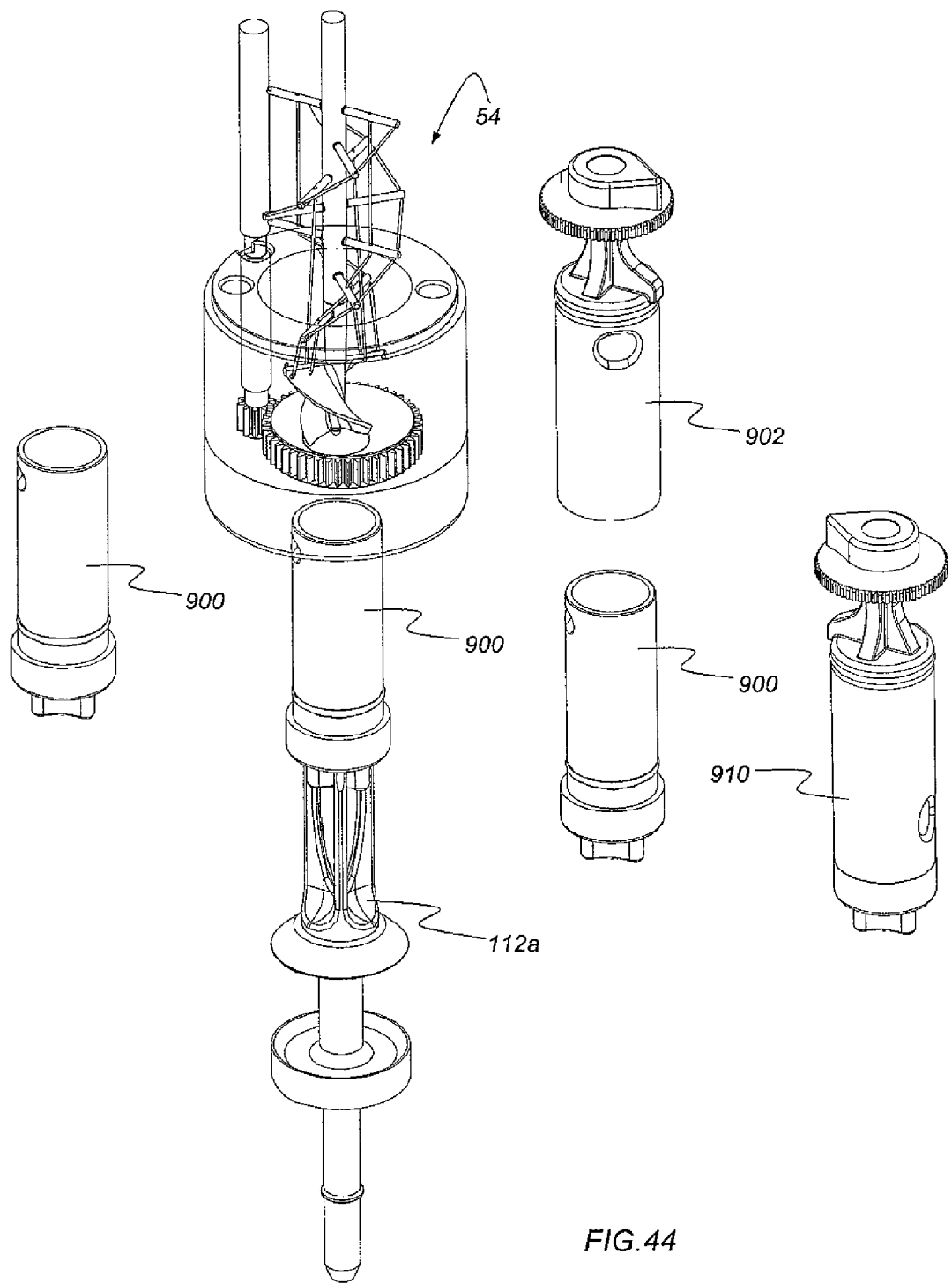
FIG. 44 is a pictorial representation of a fill process for an inhaler cartridge.

A pictorial representation of the powder fill and assembly process for an inhaler cartridge is shown in FIG. 44. A cartridge bottom 900 introduced into the system in a cartridge tray and is positioned on weight sensor probe 112a for filling. Cartridge bottom 900 is filled with drug powder by powder dispenser module 54 as described in detail above. After filling, a cartridge top 902 is snapped onto cartridge bottom 900 to provide a complete cartridge 910 ready for sealed packaging.

Figure 45:
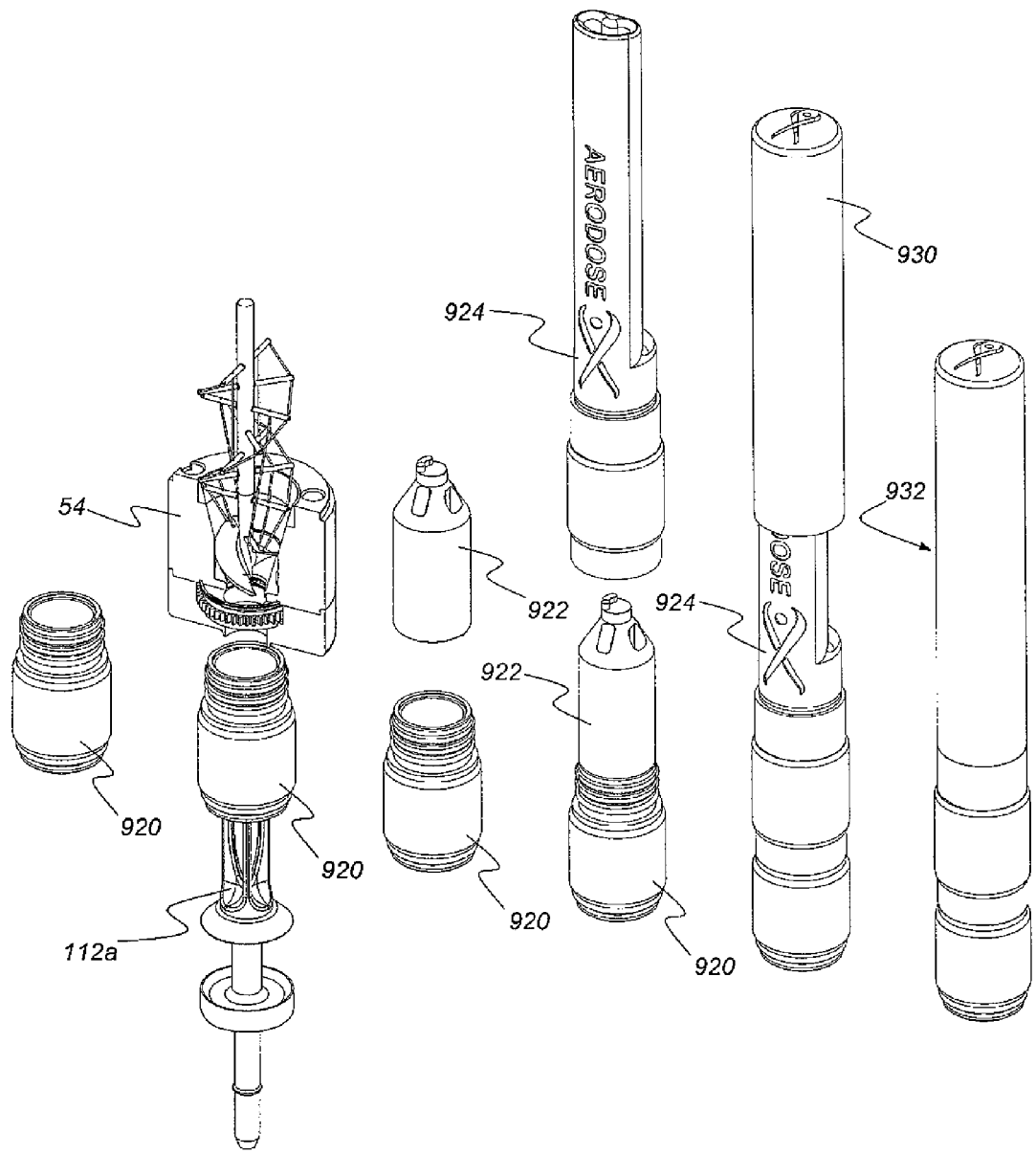
FIG. 45 is a pictorial representation of a fill process for a compact inhaler.

As noted above, the powder dispensing and sensing apparatus of the present invention can be utilized for filling different types of containers. In another embodiment, the powder dispensing and sensing apparatus is used for filling a compact inhaler as described in U.S. Pat. No. 6,923,175 issued Aug. 2, 2005 to Poole, et al. As illustrated in FIG. 45, a cartridge bottom 920 of the compact inhaler is positioned on weight sensor probe 112a for filling. Cartridge bottom 920 is filled with drug powder by powder dispenser module 54 as described above. Then, a cartridge top 922 is attached to cartridge bottom 920 and a mouthpiece housing 924 is fastened to the cartridge assembly. Finally, a dust cover 930 is snapped over the mouthpiece housing 924 to provide a complete compact inhaler 932 ready for sealed packaging.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A powder dispenser assembly comprising:
   an array block including an array of vertical ports and horizontal channels intersecting respective rows of the vertical ports; and
   powder dispenser modules mounted in respective vertical ports of the array block, each of the powder dispenser modules having a powder inlet communicating with the channel in the array block, wherein powder delivered to the channels in the array block is dispensed by each of the powder dispenser modules.

2. A powder dispenser assembly as defined in claim 1, wherein each channel in the array block passes through the array block.

3. A powder dispenser assembly as defined in claim 1, wherein the powder inlets of the powder dispenser modules are aligned with the channels in the array block so that powder delivered to the channels in the array block passes through powder inlets to downstream powder dispenser modules.

4. A powder dispenser assembly as defined in claim 1, wherein the channels in the array block have sufficient capacity to store powder for the powder dispenser modules.

5. A powder dispenser assembly as defined in claim 1, wherein the channels in the array block are slot shaped.

6. A powder dispenser assembly as defined in claim 1, wherein the channels in the array block and the powder inlets of the powder dispenser modules have cross sections of substantially equal size and shape.

7. A powder dispenser assembly as defined in claim 1, wherein each of the powder dispenser modules includes a housing that defines the powder inlet, a powder outlet, and a powder delivery conduit connecting the powder inlet and the powder outlet, and a feed mechanism to move powder through the conduit to the powder outlet.

* * * * *